(12) United States Patent
Johnson et al.

(10) Patent No.: US 12,129,786 B2
(45) Date of Patent: *Oct. 29, 2024

(54) EXPLOSION SAFE ELECTROLYSIS UNIT

(71) Applicant: HyTech Power, LLC, Redmond, WA (US)

(72) Inventors: Evan Charles Johnson, Lake Stevens, WA (US); William A. Woods, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,686

(22) Filed: Dec. 3, 2021

(65) Prior Publication Data
US 2022/0341361 A1 Oct. 27, 2022

Related U.S. Application Data

(63) Continuation of application No. 17/323,756, filed on May 18, 2021, now abandoned, which is a
(Continued)

(51) Int. Cl.
*F02B 43/10* (2006.01)
*B01D 46/84* (2022.01)
(Continued)

(52) U.S. Cl.
CPC ............ *F02B 43/10* (2013.01); *B01D 46/84* (2022.01); *C25B 1/04* (2013.01); *C25B 1/044* (2021.01); *C25B 9/05* (2021.01); *C25B 9/07* (2021.01); *C25B 9/17* (2021.01); *C25B 11/00* (2013.01); *C25B 15/02* (2013.01); *C25B 15/08* (2013.01); *F01N 3/0205* (2013.01); *F01N 3/023* (2013.01); *F01N 3/025* (2013.01); *F01N 3/0253* (2013.01); *F01N 3/0293* (2013.01); *F01N 3/035* (2013.01); *F01P 3/20* (2013.01); *F02B 43/00* (2013.01); *F02B 43/12* (2013.01); *F02B 51/00* (2013.01); *F02B 75/02* (2013.01); *F02D 19/0644* (2013.01); *F02D 19/0671* (2013.01); *F02D 19/08* (2013.01); *F02D 19/081* (2013.01); *F02D 41/0025* (2013.01); *F02D 41/0027* (2013.01); *F02D 41/345* (2013.01); *F02M 21/0206* (2013.01); *F02M 21/0221* (2013.01); *F02M 21/0239* (2013.01); *F02M 21/0248* (2013.01); *F02M 21/0278* (2013.01); *F02M 25/12* (2013.01); *B01D 2279/30* (2013.01); *F01N 2240/14* (2013.01); *F01N 2240/34* (2013.01); *F01N 2250/02* (2013.01); *F02B 2043/106* (2013.01); *F02B 2075/027* (2013.01); *F02D 41/009* (2013.01); *F02D 41/1446* (2013.01); *F02D 41/1498* (2013.01);
(Continued)

(58) Field of Classification Search
CPC ........................................................ C25B 1/10
USPC ............................................................ 123/3
See application file for complete search history.

(56) References Cited

U.S. PATENT DOCUMENTS 3,125,085 A * 3/1964 Kauffmann ........ F02M 21/0269
123/527
3,310,483 A * 3/1967 Rhodes ..................... C25B 9/70
204/278
(Continued)

*Primary Examiner* — Harry D Wilkins, III
(74) *Attorney, Agent, or Firm* — Powell IP Law, PLLC; Tracy Powell

(57) ABSTRACT

A dual-chamber electrolysis vessel safely stores HHO gas for use by an internal combustion engine.

28 Claims, 11 Drawing Sheets

Related U.S. Application Data continuation of application No. 17/092,889, filed on Nov. 9, 2020, now abandoned, which is a continuation of application No. 16/818,329, filed on Mar. 13, 2020, now abandoned, which is a continuation of application No. 16/101,178, filed on Aug. 10, 2018, now Pat. No. 10,619,562, which is a continuation of application No. 16/056,062, filed on Aug. 6, 2018.

(60) Provisional application No. 62/623,302, filed on Jan. 29, 2018.

(51) Int. Cl.
| | | |
|---|---|---|
| *C25B 1/04* | (2021.01) | |
| *C25B 1/044* | (2021.01) | |
| *C25B 9/05* | (2021.01) | |
| *C25B 9/07* | (2021.01) | |
| *C25B 9/17* | (2021.01) | |
| *C25B 11/00* | (2021.01) | |
| *C25B 15/02* | (2021.01) | |
| *C25B 15/08* | (2006.01) | |
| *F01N 3/02* | (2006.01) | |
| *F01N 3/023* | (2006.01) | |
| *F01N 3/025* | (2006.01) | |
| *F01N 3/029* | (2006.01) | |
| *F01N 3/035* | (2006.01) | |
| *F01P 3/20* | (2006.01) | |
| *F02B 43/00* | (2006.01) | |
| *F02B 43/12* | (2006.01) | |
| *F02B 51/00* | (2006.01) | |
| *F02B 75/02* | (2006.01) | |
| *F02D 19/06* | (2006.01) | |
| *F02D 19/08* | (2006.01) | |
| *F02D 41/00* | (2006.01) | |
| *F02D 41/34* | (2006.01) | |
| *F02M 21/02* | (2006.01) | |
| *F02M 25/12* | (2006.01) | |
| *F02D 41/14* | (2006.01) | |

(52) U.S. Cl.
CPC ................ *F02D 2200/021* (2013.01); *F02D 2200/0404* (2013.01); *F02D 2200/0406* (2013.01); *F02D 2200/0602* (2013.01); *F02D 2200/0606* (2013.01); *F02D 2200/0625* (2013.01); *F02D 2200/1002* (2013.01); *F02D 2200/101* (2013.01)

(56) References Cited

U.S. PATENT DOCUMENTS

| | | | | |
|---|---|---|---|---|
| 3,652,431 | A * | 3/1972 | Reynolds | C25B 1/04 205/628 |
| 3,854,494 | A * | 12/1974 | Zahorsky | F16K 17/0433 137/472 |
| 3,999,379 | A * | 12/1976 | LeFebvre | F02K 9/92 102/378 |
| 4,014,777 | A * | 3/1977 | Brown | C25B 15/00 204/268 |
| 4,209,303 | A * | 6/1980 | Ricks | C10J 3/18 392/458 |
| 5,012,945 | A * | 5/1991 | Keenan | F16K 17/16 137/71 |
| 5,037,518 | A * | 8/1991 | Young | C25B 1/04 204/266 |
| 5,231,954 | A * | 8/1993 | Stowe | F02B 43/10 204/278 |
| 5,452,688 | A * | 9/1995 | Rose | F02B 43/10 123/3 |
| 5,458,095 | A * | 10/1995 | Post | C25B 1/04 123/3 |
| 5,667,647 | A * | 9/1997 | Suga | C25B 1/04 204/266 |
| 5,858,185 | A * | 1/1999 | Christian | C25B 9/00 204/278 |
| 10,619,562 | B2 * | 4/2020 | Johnson | C25B 9/17 |
| 2003/0183179 | A1 * | 10/2003 | Lin | C25B 1/04 431/11 |
| 2004/0149591 | A1 * | 8/2004 | Klein | C01B 3/0094 205/628 |
| 2005/0217991 | A1 * | 10/2005 | Dahlquist, Jr. | C25B 15/00 204/267 |
| 2005/0229872 | A1 * | 10/2005 | Lange | F02D 19/0671 123/585 |
| 2011/0057455 | A1 * | 3/2011 | Russo | C25B 1/04 74/DIG. 9 |
| 2011/0174241 | A1 * | 7/2011 | McConahay | F02B 43/10 123/3 |
| 2012/0144982 | A1 * | 6/2012 | Ohlson | F42B 33/067 86/49 |
| 2012/0234265 | A1 * | 9/2012 | Ball | F02B 43/10 204/266 |
| 2014/0096728 | A1 * | 4/2014 | Ortenheim | C25B 9/65 123/3 |
| 2014/0202877 | A1 * | 7/2014 | Greenbaum | C25B 9/19 204/266 |
| 2014/0378745 | A1 * | 12/2014 | Lin | A61M 16/122 600/27 |
| 2015/0101926 | A1 * | 4/2015 | Burns | F02B 43/12 204/277 |
| 2017/0254259 | A1 * | 9/2017 | Johnson | F02M 21/0239 |
| 2023/0265833 | A1 * | 8/2023 | Soerensen | C25B 9/60 290/55 |

\* cited by examiner

EXPLOSION SAFE ELECTROLYSIS UNIT

CROSS-REFERENCE TO RELATED APPLICATIONS

This application is a continuation of U.S. application Ser. No. 17/323,756, filed May 18, 2021, now abandoned, which is further a continuation of U.S. application Ser. No. 17/092,889, filed Nov. 9, 2020, now abandoned, which is further a continuation of U.S. application Ser. No. 16/818,329, filed Mar. 13, 2020, now abandoned, which is further is a continuation of U.S. application Ser. No. 16/101,178, filed Aug. 10, 2018, now U.S. Pat. No. 10,619,562, which is further a continuation of U.S. application Ser. No. 16/056,062, filed Aug. 6, 2018, which claims the benefit of U.S. Provisional Application No. 62/623,302, filed Jan. 29, 2018. The foregoing related applications, in their entirety, are incorporated herein by reference.

FIELD OF THE INVENTION

This disclosure relates to systems and methods for a dual-chamber electrolysis vessel configured to safely store HHO gas for use by an internal combustion engine.

INCORPORATION BY REFERENCE

U.S. Patent Application Publ. No. 2013/0220240, published Aug. 29, 2013, U.S. Pat. No. 9,267,428, granted Feb. 23, 2016, U.S. Patent Application Publ. No. 2016/0138496, published May 19, 2016, and U.S. Patent Application Publ. No. 2017/0254259, published Sep. 7, 2017, (hereinafter referred to as the "REFERENCE APPLICATIONS") are hereby incorporated by reference in their entirety.

BACKGROUND OF THE INVENTION

Worldwide emissions, stemming primarily from the burning of fossil fuels, are reaching the highest levels ever recorded. By some measures, the emissions associated with burning fossil fuels have already reached nearly 5 metric tons/person/year. Internal combustion engines, including diesel engines, are a major contributor of fossil fuel emissions. In fact, by some measures, there are over 300 million diesel engines worldwide.

Internal combustion engines, and diesel engines in particular, emit particulate matter (PM) and governments around the world are realizing that these emissions are a cause for great concern. As a result, many countries/jurisdictions, including the United States, the European Union and China, are passing regulations which require significantly reduced emissions from internal combustion engines, including diesel engines.

Accordingly, more and more, businesses are forced to comply with these new air quality standards at their own expense. Sometimes, the costs for modifying a large internal combustion engine installation to meet new regulations can exceed US $30,000 per engine.

An attributable amount of emissions created by internal combustion engines is a result of the internal combustion engines failure to convert all of the energy available in the hydrocarbon fuel (e.g., gasoline and/or diesel fuel). This incomplete conversion is often a result of what is commonly referred to as incomplete combustion of the fuel. Incomplete combustion results in an unnecessary loss of fuel efficiency and an increase in pollution.

Accordingly, it is desirable to have a system and/or method for use with an internal combustion engine that aids in achieving more complete combustion of the hydrocarbon fuel, reduced emissions, and/or better fuel economy, or otherwise improves certain metrics of the internal combustion engine.

BRIEF SUMMARY OF THE INVENTION

Certain embodiments may provide, for example, a method for increasing fuel economy of an internal combustion engine. In certain embodiments, for example, the method may comprise introducing in the range of 1.25-30 liters (for example in the range of 2-5 liters) of HHO gas per hour per liter of displacement of the internal combustion engine. In certain embodiments, for example, the method may comprise combusting a quantity of carbonaceous fuel in the presence of the introduced HHO gas to increase fuel economy of the carbonaceous fuel by at least 5% (for example at least 10% or at least 20%).

In certain embodiments, for example, the method may further comprise electrolyzing an aqueous electrolyte solution at an average (or maximum) current draw of less than 20 amps (for example less than 15 amps or in the range of 9-15 amps, in the range of 9-12 amps, or in the range of 10-15 amps) to form the HHO gas. In certain embodiments, for example, the aqueous electrolyte solution may comprise no more than 3 wt. % of any salt (for example no more than 3 wt. % potassium carbonate such as in the range of 1.5-3 wt. % potassium carbonate). In certain embodiments, for example, the electrolyzing may be performed with a total electrical resistance of less than 20 ohm (for example less than 10 ohm or less than 3 ohm). In certain embodiments, for example, the internal combustion engine may power a vehicle. In certain embodiments, for example, the electrolyzing may occur onboard the vehicle. In certain embodiments, for example, the electrolyzing may consume electrolysis of up to 20 ounces (for example in the range of 4-10 ounces or up to 4-10 ounces) of the aqueous electrolyte per liter displacement of the internal combustion engine per 10,000 miles traveling distance of the vehicle. In certain embodiments, for example, the vehicle may be a class 8 truck.

In certain embodiments, for example, the internal combustion engine may be a gasoline engine. In certain embodiments, for example, the internal combustion engine may be a diesel engine. In certain embodiments, for example, the diesel engine may be a heavy duty diesel engine sized to produce in the range of 430-500 hp. In certain embodiments, for example, the internal combustion engine may have a displacement in the range of 11-16 liters. In certain embodiments, for example, the internal combustion engine may be sized to produce in the range of 200-250 hp. In certain embodiments, for example, the internal combustion engine may have a displacement in the range of 6-11 liters. In certain embodiments, for example, the internal combustion engine may be a generator set engine. In certain embodiments, for example, the generator set engine may have a displacement in the range of 6-60 liters. In certain embodiments, for example, the generator set engine may have a displacement in the range of 2-6 liters per cylinder. In certain embodiments, for example, the generator set engine may be sized to produce more than 1000 hp. In certain embodiments, for example, the generator set engine may be sized to produce 1000-2000 hp. In certain embodiments, for example, the internal combustion engine may be a biofuel engine.

In certain embodiments, for example, the introducing may comprise depositing air-free portions of the HHO gas (for example portions of the HHO gas comprising less than 5 wt. % air, less than 1 wt. % air, less than 1000 ppm air, less than 500 ppm air, less than 250 ppm air, or less than 100 ppm air) into an air stream supply for a particular combustion chamber, within 3 inches (for example within 1½ inches or within 1 inch) of at least one combustion chamber inlet orifice (for example an air intake orifice) of the internal combustion engine.

In certain embodiments, for example, the method may reduce one or more engine-out emissions (for example a nitrogen oxide (NOx) emission) by at least 10%. The improvement in reduced emissions may be relative to an internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

In certain embodiments, for example, the introduced HHO gas may be no more than 500 ppm (for example in the range of 1-500 ppm, no more than 250 ppm, in the range of 1-250 ppm, in the range of 1-100 ppm, in the range of 25-100 ppm, or in the range of 50-100 ppm) relative to the weight of the combusted quantity of carbonaceous fuel.

In certain embodiments, for example, the method may reduce exhaust temperature by at least 10° F. (for example at least 20° F. or at least 30° F.).

In certain embodiments, for example, the HHO gas may be substantially hydrogen.

In certain embodiments, for example, the method may further comprise delivering HHO gas to a diesel particulate filter (DPF) regenerator system.

In certain embodiments, for example, at least a portion of the in the range of 1.25-30 liters of the HHO gas stream per hour per liter of displacement of the internal combustion engine may be passed through a heat exchanger prior to the introducing. In certain embodiments, for example, the heat exchanger may receive an engine exhaust stream. In certain embodiments, for example, the engine exhaust stream may be used in the heat exchanger to heat the HHO gas stream. In certain embodiments, for example, the heat exchanger may receive an engine coolant stream. In certain embodiments, for example, the engine coolant stream may be used in the heat exchanger to adjust the temperature (for example, cooling and/or heating) of the HHO gas stream.

In certain embodiments, for example, a portion of the introduced HHO gas may be introduced to a first combustion chamber of the internal combustion engine during a portion of an intake stroke of a combustion cylinder, the combustion cylinder comprising the combustion chamber. In certain embodiments, for example, the portion of an intake stroke may be less than 50% of the intake stroke. In certain embodiments, for example, the during a portion of an intake stroke is when the intake stroke may be at an angle in the range of 0-40° from top-dead-center.

Certain embodiments may provide, for example, a method for increasing fuel economy of an internal combustion engine (for example by at least 3%, at least 4%, at least 5%, at least 6%, at least 8%, or by at least 10%). The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may comprise combusting a quantity of carbonaceous fuel in at least one combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas during cold start (for example during the first 60 seconds of starting the internal combustion engine, during the first 120 seconds of starting the internal combustion engine, or during the first 180 seconds of starting the internal combustion engine). In certain embodiments, for example, the combusting may achieve at least 97% complete combustion of the quantity of carbonaceous fuel.

Certain embodiments may provide, for example, a method for increasing fuel economy of an internal combustion engine. In certain embodiments, for example, the method may comprise introducing in the range of 2-5 liters of HHO gas per hour per liter of displacement of the internal combustion engine. In certain embodiments, for example, the introducing may comprise depositing a first portion of the HHO gas in a first air stream within 3 inches of a first combustion chamber inlet orifice of the internal combustion engine. In certain embodiments, for example, the introducing may comprise depositing a second portion of the HHO gas in a second air stream within 3 inches of a second combustion chamber inlet orifice of the internal combustion engine. In certain embodiments, for example, the introducing may comprise depositing at least a third portion of the HHO gas in at least a third air stream within 3 inches of at least a third combustion chamber inlet orifice of the internal combustion engine. In certain embodiments, for example, the method may comprise combusting a quantity of carbonaceous fuel in the presence of at least one of the deposited first portion of the HHO gas, the deposited second portion of the HHO gas, and the deposited at least a third portion of the HHO gas to increase fuel economy of the carbonaceous fuel by at least 5%.

Certain embodiments may provide, for example, a method for increasing fuel economy of an internal combustion engine during cold start to achieve at least 85% (for example at least 90%, at least 93%, at least 95%, at least 97%, at least 99%, at least 99.5%, or at least 99.9%) complete combustion of the quantity of carbonaceous fuel during the first 60 seconds (or 120 seconds or 180 seconds) of starting the internal combustion engine. In certain embodiments, for example, the method may comprise combusting a first quantity of carbonaceous fuel in a first combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel. In certain embodiments, for example, the method may comprise combusting a second quantity of the carbonaceous fuel in a second combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel. In certain embodiments, for example, the method may comprise combusting at least a third quantity of carbonaceous fuel in at least a third combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel.

Certain embodiments may provide, for example, a method for increasing fuel economy of an internal combustion engine during cold start to achieve at least 85% (for example at least 90%, at least 93%, at least 95%, at least 97%, at least 99%, at least 99.5%, or at least 99.9%) complete combustion of the quantity of carbonaceous fuel before the internal combustion engine reaches 50% of a steady state operating temperature of the internal combustion engine after starting the internal combustion engine. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may comprise combusting a first quantity of carbonaceous fuel in a first combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel. In certain embodiments, for example, the method may comprise combusting a second quantity of the carbonaceous fuel in a second combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel. In certain embodiments, for example, the method may comprise combusting at least a third quantity of carbonaceous fuel in at least a third combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas, relative to the quantity of carbonaceous fuel.

Certain embodiments may provide, for example, a method for increasing fuel economy of an internal combustion engine, comprising: i) introducing in the range of 2-5 liters of HHO gas per hour per liter of displacement of the internal combustion engine; and ii) combusting a quantity of carbonaceous fuel in the presence of the introduced HHO gas to increase fuel economy of the carbonaceous fuel by at least 5%. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. Certain embodiments may provide, for example, a method for increasing fuel economy of an internal combustion engine, comprising: combusting a quantity of carbonaceous fuel in at least one combustion chamber of the internal combustion engine in the presence of no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas during cold start, relative to the quantity of carbonaceous fuel.

Certain embodiments may provide, for example, a method for increasing fuel economy of an internal combustion engine, comprising: i) introducing in the range of 2-5 liters of HHO gas per hour per liter of displacement of the internal combustion engine, the introducing comprising: a) depositing a first portion of the HHO gas in a first air stream within 3 inches of a first combustion chamber inlet orifice of the internal combustion engine; b) depositing a second portion of the HHO gas in a second air stream within 3 inches of a second combustion chamber inlet orifice of the internal combustion engine; and c) depositing at least a third portion of the HHO gas in at least a third air stream within 3 inches of at least a third combustion chamber inlet orifice of the internal combustion engine; and ii) combusting a quantity of carbonaceous fuel in the presence of the introduced HHO gas to increase fuel economy of the carbonaceous fuel by at least 5%. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

Certain embodiments may provide, for example, a method for increasing fuel economy of an internal combustion engine during cold start to achieve at least 97% complete combustion of the quantity of carbonaceous fuel during the first 60 seconds (or 120 seconds or 180 seconds) of starting the internal combustion engine, comprising: i) combusting a first quantity of carbonaceous fuel in a first combustion chamber of the internal combustion engine in the presence of less than 500 ppm HHO gas, relative to the quantity of carbonaceous fuel; ii) combusting a second quantity of the carbonaceous fuel in a second combustion chamber of the internal combustion engine in the presence of less than 500 ppm HHO gas, relative to the quantity of carbonaceous fuel; and iii) combusting at least a third quantity of carbonaceous fuel in at least a third combustion chamber of the internal combustion engine in the presence of less than 500 ppm HHO gas, relative to the quantity of carbonaceous fuel. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

Certain embodiments may provide, for example, a diesel particulate filter (DPF) burner configured to combust a fuel to provide a heated gas stream to a DPF system. In certain embodiments, for example, the DPF burner may comprise an HHO gas injector configured to provide a supply of HHO gas proximate the DPF burner. In certain embodiments, for example, the DPF burner may be retrofitted with an HHO gas injector configured to provide a supply of HHO gas proximate the DPF burner.

Certain embodiments may provide, for example, a diesel particulate filter (DPF) regenerator system. In certain embodiments, for example, the system may comprise a DPF burner configured to combust a fuel (for example a petroleum-based fuel such as gasoline or diesel). In certain embodiments, for example, the system may comprise an HHO gas injector configured to provide a supply of HHO gas proximate the DPF burner.

In certain embodiments, for example, the DPF may be a wall-flow DPF. In certain embodiments, for example, the DPF may be cooperatively coupled to at least one exhaust pipe.

In certain embodiments, for example, the DPF burner may atomize the fuel and aim the atomized fuel in the direction of a combustion zone, the combustion zone configured to combust the atomized fuel in the presence of the supply of HHO gas to form a heated gas stream. In certain embodiments, for example, the DPF burner may comprise an evaporation zone and a combustion zone, the evaporation zone configured to atomize the fuel, the combustion zone configured to combust the atomized fuel in the presence of the supply of HHO gas to form a heated gas stream.

In certain embodiments, for example, the system may further comprise a heat transfer element in thermal communication with the DPF burner and at least one exhaust pipe upstream of the DPF.

In certain embodiments, for example, the fuel may be a diesel fuel.

In certain embodiments, for example, the DPF regenerator may be adapted for use onboard a vehicle. In certain embodiments, for example, the DPF regenerator may be adapted for use with a generator set engine.

In certain embodiments, for example, the DPF regenerator system may further comprise a lance cooperatively coupled to the HHO injector, the lance having an outlet distal from the injector, the outlet positioned within 3 inches of the DPF burner, for example within 3 inches of the combustion zone of the DPF burner.

In certain embodiments, for example, the DPF regenerator system may further comprise an HHO gas supply system or be retrofitted to comprise an HHO gas supply system. In certain embodiments, for example, the HHO gas supply system may comprise an electrolysis unit. In certain embodiments, for example, the electrolysis unit may be adapted for use onboard a vehicle. In certain embodiments, for example, the HHO gas supply system may be configured for in situ generation of the supply of HHO gas. In certain embodiments, for example, the DPF regenerator system may be exclusive of a device (for example a scrubber) for reducing moisture in an HHO gas stream produced by the electrolysis unit. In certain embodiments, for example, the HHO gas supply system may be configured to provide moisture-free HHO gas. In certain embodiments, for example, the HHO gas supply system may be configured to provide HHO gas having no more than 0.062 g/cm$^3$ (for example no more than 0.06 g/cm$^3$, no more than 0.05 g/cm$^3$, or no more than 0.04 g/cm$^3$) water. In certain embodiments, for example, the HHO gas supply system may be configured to provide HHO gas that is at or below a saturation point with water at a temperature of no more than 120° F. (for example no more than 110° F. or no more than 100° F.).

In certain embodiments, for example, the DPF regenerator may be adapted for use with a nonroad engine or non-over-the-road engine. In certain embodiments, for example, DPF regenerator may be adapted for use with an off-road vehicle. In certain embodiments, for example, the DPF regenerator may be adapted for use with a stationary engine. In certain embodiments, for example, the DPF regenerator may be adapted for use with for use with a locomotive engine. In certain embodiments, for example, the DPF regenerator may be adapted for use with for use with a marine engine.

In certain embodiments, for example, the DPF regenerator system may further comprise a heat exchanger configured to receive the controlled supply of HHO gas, the heat exchanger disposed upstream of the DPF burner. In certain embodiments, for example, the heat exchanger may be in thermal communication with an internal combustion engine and/or the DPF regenerator system. In certain embodiments, for example, the heat exchanger may be configured to receive an engine exhaust stream. In certain embodiments, for example, the heat exchanger may be configured to receive an engine coolant stream. In certain embodiments, for example, the heat exchanger may be configured to receive a DPF regenerator system exhaust stream.

In certain embodiments, for example, the DPF regenerator system may further comprise a plurality of further HHO gas injectors configured to deliver a further supply of HHO gas supply at multiple locations about an internal combustion engine. In certain embodiments, for example, the plurality of further HHO gas injectors may comprise: a) a first injector of the plurality of further HHO gas injectors configured to deliver a first portion of the further supply of HHO gas to a first location about a first combustion chamber inlet of the internal combustion engine; b) a second injector of the plurality of further HHO gas injectors configured to deliver a second portion of the further supply of HHO gas to a second location about a second combustion chamber inlet of the internal combustion engine; and c) at least a third injector of the plurality of further HHO gas injectors configured to deliver at least a third portion of the further supply of HHO gas to at least a third location about at least a third combustion chamber inlet of the internal combustion engine.

In certain embodiments, for example, the first injector may be configured to deliver the first portion of the further supply of HHO gas to the first combustion chamber during a portion of an intake stroke of a combustion cylinder, the combustion cylinder comprising the first combustion chamber. In certain embodiments, for example, the portion of an intake stroke may be less than 50% of the intake stroke. In certain embodiments, for example, the during a portion of an intake stroke is when the intake stroke may be at an angle in the range of 0-40° from top-dead-center.

Certain embodiments may provide, for example, a method to regenerate a diesel particulate filter (DPF). In certain embodiments, for example, the method may comprise combusting a fuel in the presence of an injected quantity of HHO gas to form a heated gas stream. In certain embodiments, for example, the method may comprise transferring heat from the heated gas stream directly and/or indirectly through the DPF.

In certain embodiments, for example, the injected quantity of HHO gas may be air-free and/or moisture-free prior to being injected. In certain embodiments, for example, the transferring heat may heat the at least one exhaust stream to a temperature above 600° C. (for example to a temperature above 650° C.). In certain embodiments, for example, the injected quantity of HHO gas may be generated in real time.

Certain embodiments may provide, for example, a diesel particulate filter (DPF) regenerator system, comprising: i) a DPF burner configured to combust a fuel; and ii) an HHO gas injector configured to provide a controlled supply of HHO gas proximate the DPF burner.

Certain embodiments may provide, for example, a method to regenerate a diesel particulate filter (DPF), comprising: i) combusting a fuel in the presence of an injected quantity of HHO gas to form a heated gas stream; and ii) transferring heat from the heated gas stream directly and/or indirectly to the DPF.

Certain embodiments may provide, for example, a system to provide HHO gas to a diesel engine. In certain embodiments, for example, the system may comprise a multi-point gas distribution system adapted to receive an HHO gas supply. In certain embodiments, for example, the multi-point gas distribution system may comprise a plurality of injectors configured to deliver portions of the received HHO gas supply at multiple locations about a diesel engine. In certain embodiments, for example, the multi-point gas distribution system may comprise at least one further injector configured to deliver a further portion of the received HHO gas supply to a diesel particulate filter (DPF) regenerator system.

In certain embodiments, for example, at least one injector of the plurality of injectors may be coupled to an HHO gas outlet, the at least one injector cooperatively configured with the diesel engine to be fixedly positioned at a predetermined location about the diesel engine, whereby the HHO gas outlet is within 3 inches of at least one combustion chamber inlet of the diesel engine. In certain embodiments, for example, the at least one injector may be configured to be fixedly positioned at a retrofitted attachment point of the diesel engine. In certain embodiments, for example, the combustion chamber inlet may be an air intake orifice.

In certain embodiments, for example, the system to provide HHO gas to a diesel engine may further comprise a control system, the control system configured to control timing and/or duration for the delivering a portion of HHO gas and for the delivering a further portion of HHO gas. In certain embodiments, for example, the timing and duration of the further delivering may be different from the timing and/or duration of the delivering. In certain embodiments, for example, the control system may be configured to process intake stroke timing data for at least one air intake orifice of the diesel engine.

In certain embodiments, for example, the control system for providing HHO gas to a diesel engine may be adapted to provide HHO gas to a diesel engine coupled to a vehicle. In certain embodiments, for example, the control system to provide HHO gas to a diesel engine may be adapted to connect to an HHO gas supply system. In certain embodiments, for example, the control system may be adapted to connect to a multi-point gas distribution system adapted to connect to an HHO gas supply system. In certain embodiments, for example, the multi-point gas distribution system may be adapted to connect to an outlet of an electrolysis unit. In certain embodiments, for example, the electrolysis unit may be onboard the vehicle.

In certain embodiments, for example, the control system to provide HHO gas to a diesel engine may be adapted to provide HHO gas to a generator set engine.

In certain embodiments, for example, the control system to provide HHO gas to a diesel engine may further comprise a gas pressure regulator. In certain embodiments, for example, the gas pressure regulator may be configured to at least partially control a pressure of HHO gas in the multi-point gas distribution system relative to a combustion air intake pressure of the diesel engine.

In certain embodiments, for example, the multi-point gas distribution system may be configured to receive the HHO gas supply at a pressure in the range of 30-60 psig (for example in the range of 40-55 psig, in the range of 44-50 psig, or in the range of 45-50 psig).

In certain embodiments, for example, the system to provide HHO gas to a diesel engine may further comprise a heat exchanger, the heat exchanger having a first inlet adapted to connect to an engine coolant line, the heat exchanger having a second inlet adapted to connect to the multi-point gas distribution system.

Certain embodiments may provide, for example, a method of improving the operation and emissions of a diesel engine equipped with a DPF. In certain embodiments, for example, the method may comprise delivering a first quantity of HHO gas to multiple air intake locations about a diesel engine. In certain embodiments, for example, the method may comprise further delivering a second quantity of HHO gas upstream of the diesel particulate filter (DPF).

In certain embodiments, for example, the first quantity of HHO gas and the second quantity of HHO gas may be air-free prior to the delivering and the further delivering.

In certain embodiments, for example, the method may further comprise exchanging heat between the first quantity of HHO gas and an engine coolant stream. In certain embodiments, for example, the method may further comprise exchanging heat between the first quantity of HHO gas and a diesel engine exhaust stream.

In certain embodiments, for example, the method may further comprise generating the first quantity of HHO gas on demand.

Certain embodiments may provide, for example, a system to provide HHO gas to a diesel engine. In certain embodiments, for example, the system may comprise a multi-point gas distribution system for controlled delivery of an HHO gas supply. In certain embodiments, for example, the multi-point gas distribution system may comprise a plurality of injectors configured to deliver portions of the HHO gas supply at multiple locations about a diesel engine. In certain embodiments, for example, the multi-point gas distribution system may comprise a first injector of the plurality of injectors configured to deliver a first portion of HHO gas of the portions of the HHO gas supply to a first location about a first combustion chamber inlet of the diesel engine. In certain embodiments, for example, the multi-point gas distribution system may comprise a second injector of the plurality of injectors configured to deliver a second portion of HHO gas of the portions of the HHO gas supply to a second location about a second combustion chamber inlet of the diesel engine. In certain embodiments, for example, the multi-point gas distribution system may comprise at least a third injector of the plurality of injectors configured to deliver at least a third portion of HHO gas of the portions of the HHO gas supply to at least a third location about at least a third combustion chamber inlet of the diesel engine. In certain embodiments, for example, the multi-point gas distribution system may comprise at least one further injector configured to deliver a further portion of the HHO gas supply to a diesel particulate filter (DPF) regenerator system.

In certain embodiments, for example, the multi-point gas distribution system may further comprise a first lance cooperatively coupled to the first injector. In certain embodiments, for example, the first lance may define an outlet distal from the injector, the outlet for positioning within 3 inches of the first combustion chamber inlet.

In certain embodiments, for example, the system to provide HHO gas to a diesel engine may further comprise a heat exchanger, the heat exchanger configured to receive the HHO gas supply, the heat exchanger disposed upstream of the diesel engine and/or the DPF regenerator system. In certain embodiments, for example, the heat exchanger may be in thermal communication with an internal combustion engine and/or the DPF regenerator system. In certain embodiments, for example, the heat exchanger may be configured to receive an engine exhaust stream. In certain embodiments, for example, the heat exchanger may be configured to receive an engine coolant stream. In certain embodiments, for example, the heat exchanger may be configured to receive a DPF regenerator system exhaust stream.

In certain embodiments, for example, a first injector of the plurality of injectors may be configured to deliver HHO gas to a first combustion chamber of the diesel engine during a portion of an intake stroke of a first combustion cylinder, the first combustion cylinder comprising the first combustion chamber. In certain embodiments, for example, the portion of the intake stroke may be less than 50% of the intake stroke. In certain embodiments, for example, the during a portion of an intake stroke may be when the intake stroke is at an angle in the range of 0-40° from top-dead-center.

Certain embodiments may provide, for example, a system to provide HHO gas to a diesel engine, comprising: a multi-point gas distribution system adapted to receive an HHO gas supply, comprising: i) a plurality of injectors configured to actuate to deliver a portion of the received HHO gas supply at multiple locations about a diesel engine; and ii) at least one further injector configured to deliver a further portion of the received HHO gas supply to a diesel particulate filter (DPF) regenerator system.

Certain embodiments may provide, for example, a method of improving the operation and emissions of a diesel engine equipped with a DPF, comprising: i) delivering a first quantity of HHO gas to multiple air intake locations about a diesel engine; and ii) further delivering a second quantity of HHO gas upstream of the diesel particulate filter (DPF).

Certain embodiments may provide, for example, a system to provide HHO gas to a diesel engine, comprising: a multi-point gas distribution system for controlled delivery of an HHO gas supply, comprising: a plurality of injectors configured to deliver a portion of the HHO gas supply at multiple locations about a diesel engine, comprising: a) a first injector of the plurality of injectors configured to deliver a first portion of the HHO gas supply to a first location about a first combustion chamber inlet of the diesel engine; b) a second injector of the plurality of injectors configured to deliver a second portion of the HHO gas supply to a second location about a second combustion chamber inlet of the diesel engine; c) at least a third injector of the plurality of injectors configured to deliver at least a third portion of the HHO gas supply to at least a third location about at least a third combustion chamber inlet of the diesel engine; and d) at least one further injector configured to deliver a further portion of the HHO gas supply to a diesel particulate filter (DPF) regenerator system.

Certain embodiments may provide, for example, a method for increasing carbonaceous fuel economy of an internal combustion engine. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may comprise delivering a quantity of HHO gas in a stream of oxygen-containing gas to at least one combustion chamber of the internal combustion engine during a portion of an intake stroke of at least one combustion cylinder of the internal combustion engine. In certain embodiments, for example, the portion may be less than 70% (for example less than 50%, less than 25%, or in the range of 20-25% of the intake stroke). In certain embodiments, for example, the portion may be in the range of 70-100% of the intake stroke. In certain embodiments, for example, the portion may be less than the whole intake stroke. In certain embodiments, for example, the during a portion of an intake stroke may be when the intake stroke is at an angle in the range of 0-40° (or 40-180°) from top-dead-center. In certain embodiments, for example, the during a portion of an intake stroke may be when the intake stroke is at an angle of at least 10° from top-dead-center.

In certain embodiments, for example, the internal combustion engine may be a 4-stroke engine.

In certain embodiments, for example, the HHO gas may be air-free prior to introduction to the stream of oxygen-containing gas.

In certain embodiments, for example, the method may improve fuel economy by at least 10% (for example at least 20% or at least 30%). The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

In certain embodiments, for example, the primary fuel may comprise a biofuel.

In certain embodiments, for example, the method may further comprise introducing the quantity of HHO gas to the stream of oxygen-containing gas within 3 inches of at least one combustion chamber inlet orifice of the internal combustion engine.

In certain embodiments, for example, the at least one combustion chamber inlet orifice may comprise an air intake valve or port.

In certain embodiments, for example, the delivered quantity of HHO gas may be in the range of 2-5 liters of HHO gas per hour per liter of displacement of the internal combustion engine.

In certain embodiments, for example, the method may reduce engine-out emissions by at least 10% (for example by at least 20% or at least 30%). The improvement in engine-out emissions may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may reduce particulate emissions by at least 10% (for example by at least 20% or by at least 30%). In certain embodiments, for example, the method may reduce soot emissions by at least 10% (for example by at least 20% or by at least 30%). In certain embodiments, for example, the method may reduce a combustion exhaust temperature by at least 10° F. (for example by at least 20° F. or by least 30° F.).

In certain embodiments, for example, the delivered quantity of HHO gas may be no more than 500 ppm (for example in the range of 1-500 ppm, no more than 250 ppm, in the range of 1-250 ppm, in the range of 1-100 ppm, in the range of 25-100 ppm, or in the range of 50-100 ppm) HHO gas relative to the weight of combusted carbonaceous fuel.

In certain embodiments, for example, the method may further comprise delivering a further quantity of HHO gas to a diesel particulate filter (DPF) regenerator system. In certain embodiments, for example, the quantity of HHO gas may be passed through a heat exchanger prior to the delivering. In certain embodiments, for example, the heat exchanger may receive an engine exhaust stream. In certain embodiments, for example, the heat exchanger may receive an engine coolant stream. In certain embodiments, for example, the delivered quantity of HHO gas may be fresh (for example the quantity of HHO gas may be delivered within 5 hours of generation (for example generation by electrolysis of an electrolyte solution).

Certain embodiments may provide, for example, a method for delivering precision quantities of in-situ generated HHO gas about an internal combustion engine. In certain embodiments, for example, the method may comprise delivering separate independent quantities of HHO gas during independent portions of at least two air intake strokes to at least two out-of-phase combustion cylinders of the internal combustion engine. In certain embodiments, for example, the portions of the at least two air intake strokes may be less than 70% of the complete air intake strokes for either of the air intake strokes.

In certain embodiments, for example, the delivering the separate independent quantities of HHO gas may comprise: delivering a first quantity of HHO gas during a portion of an intake stroke of a first combustion cylinder, the portion of the intake stroke of the first combustion cylinder may be less than 70% (for example, less than 60%, less than 50%, or less than 40%) of the complete air intake stroke; and delivering a second quantity of HHO gas during a portion of an intake stroke of a second combustion cylinder, the portion of the intake stroke of the second combustion cylinder may be less than 70% (for example, less than 60%, less than 50%, or less than 40%) of the complete air intake stroke; the intake stroke of the first combustion cylinder being out of phase with the intake stroke of the second combustion cylinder.

In certain embodiments, for example, the delivering the separate quantities of HHO gas may comprise: delivering a first quantity of HHO gas during an intake stroke of a first combustion cylinder at a crankshaft angle in the range of 0-40° from top-dead-center of the first combustion cylinder; and delivering a second quantity of HHO gas during an intake stroke of a second combustion cylinder at a crankshaft angle in the range of 0-40° from top-dead-center of the second combustion cylinder, the intake stroke of the first combustion cylinder out of phase with the intake stroke of the second combustion cylinder.

Certain embodiments may provide, for example, a method for increasing carbonaceous fuel economy of an internal combustion engine. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may comprise delivering a first quantity of HHO gas in a first stream of oxygen-containing gas to within 3 inches of a first combustion chamber inlet orifice of a first combustion chamber of the internal combustion engine during a portion of an intake stroke of a first combustion cylinder at an angle in the range of 0-40° from top-dead-center of the first combustion cylinder, the first combustion cylinder comprising the first combustion chamber. In certain embodiments, for example, the method may comprise delivering a second quantity of HHO gas in a second stream of oxygen-containing gas to within 3 inches of a second combustion chamber inlet orifice of a second combustion chamber of the internal combustion engine during a portion of an intake stroke of a second combustion cylinder at an angle in the range of 0-40° from top-dead-center of the second combustion cylinder, the second combustion cylinder comprising the second combustion chamber. In certain embodiments, for example, the method may comprise delivering at least a third quantity of HHO gas in at least a third stream of oxygen-containing gas to at least a third combustion chamber inlet orifice of at least a third combustion chamber of the internal combustion engine.

Certain embodiments may provide, for example, a method for increasing carbonaceous fuel economy of an internal combustion engine, comprising: delivering a quantity of HHO gas in a stream of oxygen-containing gas to at least one combustion cylinder of the internal combustion engine during a portion of an intake stroke (for example less than a full intake stroke) of the at least one combustion cylinder.

Certain embodiments may provide, for example, a method for delivering precision quantities of in-situ generated HHO gas about an internal combustion engine, comprising: delivering separate quantities of HHO gas during portions of at least two air intake strokes to at least two out-of-phase combustion cylinders of the internal combustion engine.

Certain embodiments may provide, for example, a method for increasing carbonaceous fuel economy of an internal combustion engine, comprising: i) delivering a first quantity of HHO gas in a first stream of oxygen-containing gas to within 3 inches of a first combustion chamber inlet orifice of a first combustion chamber of the internal combustion engine during a portion of an intake stroke of a first combustion cylinder at an angle in the range of 0-40° from top-dead-center of the first combustion cylinder, the first combustion cylinder comprising the first combustion chamber; ii) delivering a second quantity of HHO gas in a second stream of oxygen-containing gas to within 3 inches of a second combustion chamber inlet orifice of a second combustion chamber of the internal combustion engine during a portion of an intake stroke of a second combustion cylinder at an angle in the range of 0-40° from top-dead-center of the second combustion cylinder, the second combustion cylinder comprising the second combustion chamber; and iii) delivering at least a third quantity of HHO gas in at least a third stream of oxygen-containing gas to at least a third combustion chamber inlet orifice of at least a third combustion chamber of the internal combustion engine. The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

Certain embodiments may provide, for example, a system to distribute an HHO gas supply to an internal combustion engine having a plurality of combustion chambers. In certain embodiments, for example, the system may comprise at least one injector among a plurality of injectors, the at least one injector configured to introduce at least a portion of the HHO gas supply to within 3 inches of at least one combustion chamber inlet of at least one combustion chamber of the plurality of combustion chambers. In certain embodiments, for example, the system may comprise a control system configured to control the at least one injector based on timing parameters for the at least one combustion chamber.

In certain embodiments, for example, the control system may be configured to adjust timing and/or duration of the at least one injector in response to intake stroke timing of the at least one combustion cylinder or a change in the intake stroke timing. In certain embodiments, for example, the control system may be configured to control the at least one injector. In certain embodiments, for example, the control system may be configured to adjust timing and/or duration of the at least one injector in response to engine speed or a change in engine speed. In certain embodiments, for example, the control system may be configured to adjust timing and/or duration of actuation of the at least one injector in response to engine load or a change in engine load. In certain embodiments, for example, the control system may be configured to adjust timing and/or duration of actuation of the at least one injector in response to fuel consumption or a change in fuel consumption. In certain embodiments, for example, the control system may be configured to adjust timing and/or duration of actuation of the at least one injector when an exhaust temperature of the internal combustion engine exceeds a predicted temperature.

In certain embodiments, for example, the control system may comprise a processor, the processor configured to compute an HHO gas quantity required to reduce one or more engine-out emissions to a predetermined level. The improvement in engine-out emissions may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

In certain embodiments, for example, the control system may be configured to adjust timing and/or duration of actuation of the at least one injector of the plurality of injectors when an HHO gas temperature reading input from a temperature sensor exceeds a predetermined level. In certain embodiments, for example, the control system may be configured to adjust timing and/or duration of actuation of the at least one injector of the plurality of injectors when an HHO gas pressure reading input from a pressure sensor exceeds a predetermined level. In certain embodiments, for example, the control system may be configured to actuate the plurality of injectors in a sequence whether an air intake valve is open.

In certain embodiments, for example, the control system may be configured to actuate the plurality of injectors in response to at least the camshaft rotation of an internal combustion engine and/or at least one predetermined position of the camshaft. In certain embodiments, for example, the control system may be further configured to actuate the plurality of injectors in response to an engine temperature measurement. In certain embodiments, for example, the control system may be configured to prevent actuation of the plurality of injectors until an engine temperature is measured having at least a minimum predetermined value.

In certain embodiments, for example, the control system may be configured to actuate the plurality of injectors simultaneously. In certain embodiments, for example, the control system may be configured to actuate the at least one injector at a first time and a second injector of the plurality of injectors at a second time, the first time different from the second time.

In certain embodiments, for example, the system to distribute an HHO gas supply may be configured to introduce the at least a portion of the HHO gas supply at a controlled temperature and pressure. In certain embodiments, for example, the system to distribute HHO gas may further comprise a heat exchanger, the heat exchanger configured to receive at least a portion of the HHO gas supply. In certain embodiments, for example, the pressure of the introduced at least a portion of the HHO gas supply may be controlled relative to a gas intake pressure of the internal combustion engine.

In certain embodiments, for example, the control system may be configured to adjust timing and/or duration of actuation of the at least one injector in response to throttle position or a change in throttle position. In certain embodiments, for example, the control system may be configured to adjust timing and/or duration of the at least one injector in response to intake manifold pressure or a change in intake manifold pressure. In certain embodiments, for example, the control system may be configured to adjust timing and/or duration of actuation of the at least one injector based on inputs from a knock sensor. In certain embodiments, for example, the control system may be configured to adjust timing and/or duration of actuation of the at least one injector in response to exhaust temperature or a change in exhaust temperature. In certain embodiments, for example, the control system may be configured to adjust timing and/or duration of actuation of the at least one injector in response to input from a fuel injector sensor or a change in input from a fuel injector sensor. In certain embodiments, for example, the control system may be configured to adjust timing and/or duration of actuation of the at least one injector in response to input from an RPM sensor or a change in input from an RPM sensor.

In certain embodiments, for example, the at least one injector may be equipped with a metal tube to carry air-free HHO gas to within 3 inches of a first combustion chamber inlet of the at least one combustion chamber inlet. In certain embodiments, for example, the metal tube may have a soldered end with an orifice drilled therethrough. In certain embodiments, for example, the orifice may have an orifice diameter in the range of 10-50 thousandths of an inch. In certain embodiments, for example, the system may be cooperatively configured with the internal combustion engine whereby a distal end of the metal tube is free-floating inside an air intake manifold.

In certain embodiments, for example, the plurality of injectors may be connected together in a daisy chain to receive power for actuation in a predetermined sequence.

In certain embodiments, for example, each injector of the plurality of injectors may comprise an injector solenoid. In certain embodiments, for example, each injector of the plurality of injectors may be actuated by 1-20 milliamps of electric current. In certain embodiments, for example, the plurality of injectors may be actuated for 1-3 milliseconds per engine cylinder cycle (for example per engine cylinder cycle of a 4-stroke engine cycle).

In certain embodiments, for example, the system to distribute an HHO gas supply may further comprise at least one further injector, the at least one further injector configured to deliver a further portion of the received HHO gas supply to a diesel particulate filter (DPF) regenerator system.

In certain embodiments, for example, a first injector of the at least one injector may be configured to deliver the at least a portion of the HHO gas during a portion of an intake stroke of a first combustion cylinder. In certain embodiments, for example, the portion of an intake stroke is less than 50% of the intake stroke. In certain embodiments, for example, the during a portion of an intake stroke is when the intake stroke is at an angle in the range of 0-40° from top-dead-center.

Certain embodiments may provide, for example, a system to distribute an HHO gas supply to an internal combustion engine. In certain embodiments, for example, the system may comprise a first injector configured to deliver a first portion of the HHO gas supply to within 3 inches of a first combustion chamber inlet of the internal combustion engine. In certain embodiments, for example, the system may comprise a second injector configured to deliver a second portion of the HHO gas supply to within 3 inches of a second combustion chamber inlet of the internal combustion engine.

In certain embodiments, for example, the system may comprise at least a third injector configured to deliver at least a third portion of the HHO gas supply to within 3 inches of at least a third combustion chamber inlet of the internal combustion engine. In certain embodiments, for example, the system may comprise a control system configured to control the actuation of each injector among the plurality of injectors based on parameters for the corresponding combustion chamber in the internal combustion engine.

Certain embodiments may provide, for example, a system to distribute an HHO gas supply to an internal combustion engine having a plurality of combustion chambers, comprising: i) at least one injector among a plurality of injectors, the at least one injector configured to introduce at least a portion of the HHO gas supply to within 3 inches of at least one combustion chamber inlet of at least one combustion chamber of the plurality of combustion chambers; and ii) a control system configured to control the at least one injector based on timing parameters for the at least one combustion chamber.

Certain embodiments may provide, for example, a system to distribute an HHO gas supply to an internal combustion engine, comprising: i) a first injector configured to deliver a first portion of the HHO gas supply to within 3 inches of a first combustion chamber inlet of the internal combustion engine; ii) a second injector configured to deliver a second portion of the HHO gas supply to within 3 inches of a second combustion chamber inlet of the internal combustion engine; iii) at least a third injector configured to deliver at least a third portion of the HHO gas supply to within 3 inches of at least a third combustion chamber inlet of the internal combustion engine; and iv) a control system configured to control the actuation of each injector among the plurality of injectors based on parameters for the corresponding combustion chamber in the internal combustion engine.

Certain embodiments may provide, for example, an onboard HHO generator for an over-the-road heavy duty truck powered by a heavy duty diesel engine. In certain embodiments, for example, the onboard HHO generator may comprise a dual-chamber vessel in communication with an internal combustion engine powering the heavy duty truck. In certain embodiments, for example, the dual-chamber vessel may comprise an electrolysis cell in a first chamber of the dual-chamber vessel, the first chamber containing a quantity of electrolyte solution, the quantity of electrolyte solution sufficient to produce a supply of HHO gas for 60,000,000 crankshaft rotations of the internal combustion engine. In certain embodiments, for example, the dual-chamber vessel may comprise a second chamber containing HHO gas and a quantity of replacement electrolyte solution, the contained HHO gas and the quantity of replacement electrolyte solution sharing a free surface, the first chamber and the second chamber in continuous liquid communication, the second chamber disposed between the first chamber and the internal combustion engine.

In certain embodiments, for example, the onboard generator may be in communication (for example fluid communication) with at least one combustion chamber of the heavy duty diesel engine. In certain embodiments, for example, a first injector may be configured to deliver the at least a portion of the HHO gas during a portion of an intake stroke of a first combustion cylinder, the first combustion cylinder comprising a first combustion chamber of the at least one combustion chamber. In certain embodiments, for example, the portion of the intake stroke may be less than 50% of the intake stroke. In certain embodiments, for example, the during a portion of an intake stroke may be when the intake stroke is at an angle in the range of 0-40° from top-dead-center.

In certain embodiments, for example, the heavy duty diesel engine may have a displacement in the range of 11-16 liters.

In certain embodiments, for example, the heaving duty diesel engine may be sized for an engine speed of at least 1800 rpm. In certain embodiments, for example, the heavy duty diesel engine may provide in the range of 1600-2000 ft-lb peak torque. In certain embodiments, for example, the heavy duty diesel engine may be sized to produce in the range of 400-700 hp (for example 430-500 hp).

In certain embodiments, for example, the over-the-road heavy duty truck may be a Class 8 vehicle. In certain embodiments, for example, the over-the-road heavy duty truck may be a Class 9 vehicle.

In certain embodiments, for example, the quantity of electrolyte solution may be sufficient for at least 5,000 miles (for example at least 10,000 miles, at least 20,000 miles, at least 30,000 miles, or at least 40,000 miles) of driving.

In certain embodiments, for example, the first chamber may be configured to contain at least ¼ gallon (for example at least ½ gallon, at least 1 gallon, at least 2 gallons, at least 5 gallons, or at least 10 gallons) of the electrolyte.

In certain embodiments, for example, the onboard HHO generator may further comprise a controller, the controller configured to control at least a power supply to the electrolysis cell. In certain embodiments, for example, the controller may be configured to control the power supply to maintain the quantity of the electrolyte solution at a temperature in the range of 80-150° F. (for example a temperature in the range of 90-120° F., in the range of 95-115° F., in the range of 100-115° F., or a temperature in the range of 100-110° F.). In certain embodiments, for example, the controller may be configured to control the power supply to maintain the second chamber at a pressure in the range of 30-60 psig (for example in the range of 40-55 psig, in the range of 44-50 psig, or in the range of 45-50 psig).

In certain embodiments, for example, the second chamber may be cooperatively configured with the first chamber to receive the supply of HHO gas from the first chamber and to store a portion of the supply of HHO gas. In certain embodiments, for example, the second chamber may be configured to store at least a 10 minute supply (for example at least a 20 minute supply, at least a 30 minute supply, or at least a 1 hour supply) of HHO gas for use by the internal combustion engine based on an average load of 200 hp, the internal combustion engine having a displacement of at least 10 liters. In certain embodiments, for example, the second chamber may have a volume at least as large as the volume of the first chamber.

In certain embodiments, for example, the first chamber may be cooled by engine coolant.

In certain embodiments, for example, the electrolysis cell may comprise electrodes, the electrodes comprising iridium coated on titanium.

In certain embodiments, for example, the HHO generator may be configured to provide HHO gas for at least 50 hours (for example at least 100 hours, at least 200 hours, or at least 500 hours) operation of the truck based on the quantity of electrolyte. In certain embodiments, for example, the HHO generator may be configured to provide HHO gas for at least 5,000 miles (for example at least 10,000 miles, 20,000 miles, 30,000 miles, or at least 50,000 miles) operation of the truck based on the quantity of electrolyte.

In certain embodiments, for example, the controller may be configured to control the power supply to cause the electrolysis cell to produce HHO gas intermittently to maintain a temperature of the electrolyte and a pressure in the second chamber. In certain embodiments, for example, the maintained temperature may be in the range of 80-150° F. (for example a temperature in the range of 90-120° F., in the range of 95-115° F., in the range of 100-115° F., or a temperature in the range of 100-110° F.). In certain embodiments, for example, the maintained pressure may be in the range of 30-60 psig (for example in the range of 40-55 psig, in the range of 44-50 psig, or in the range of 45-50 psig).

In certain embodiments, for example, the first chamber and the second chamber may be in continuous liquid communication, the second chamber disposed between the first chamber and the internal combustion engine.

In certain embodiments, for example, the onboard HHO generator may be in communication with at least one injector, the at least one injector configured to deliver at least a portion of the supply of HHO gas to a diesel particulate filter (DPF) regenerator system. In certain embodiments, for example, the onboard HHO generator may be in communication with a plurality of injectors, the plurality of injectors configured to introduce at least a portion of the HHO gas to at least one combustion chamber inlet of the diesel engine.

In certain embodiments, for example, the plurality of injectors may comprise: i) a first injector configured to deliver a first portion of the HHO gas to within 3 inches of a first combustion chamber inlet of the diesel engine; ii) a second injector configured to deliver a second portion of the HHO gas to a second combustion chamber inlet of the diesel engine; and iii) at least a third injector configured to deliver at least a third portion of the HHO gas to at least a third combustion chamber inlet of the diesel engine.

In certain embodiments, for example, the onboard HHO generator may be in communication with a heat exchanger, the heat exchanger configured to receive at least a portion of the HHO gas. In certain embodiments, for example, the heat exchanger may be configured to receive an engine exhaust stream. In certain embodiments, for example, the heat exchanger may be configured to receive an engine coolant stream.

In certain embodiments, for example, the first chamber and the second chamber may be in continuous communication via a small size orifice (for example less than 5% of the surface area of the free surface). In certain embodiments, for example, the first chamber and the second chamber may be in restricted fluid communication.

In certain embodiments, for example, the quantity of electrolyte solution may be sufficient to produce a supply of HHO gas for 60,000,000 crankshaft rotations of the internal combustion engine at an average load of 200 hp.

Certain embodiments may provide, for example, an onboard HHO generator for an over-the-road heavy duty truck powered by a heavy duty diesel engine, comprising: a dual-chamber vessel in communication with an internal combustion engine powering the heavy duty truck, comprising: i) an electrolysis cell in a first chamber of the dual-chamber vessel, the first chamber containing a quantity of electrolyte solution, the quantity of electrolyte solution sufficient to produce a supply of HHO gas for 60,000,000 crankshaft rotations of the internal combustion engine; and ii) a second chamber containing HHO gas and a quantity of replacement electrolyte solution, the contained HHO gas and the quantity of replacement electrolyte solution sharing a free surface, the first chamber and the second chamber in continuous liquid communication, the second chamber disposed between the first chamber and the internal combustion engine.

Certain embodiments may provide, for example, a dual-chamber electrolysis vessel configured for safe generation and storage of HHO gas for use by an internal combustion engine. In certain embodiments, for example, the vessel may comprise reusable container components, at least one of the reusable container components dividing an interior of the vessel into a first chamber and a second chamber, the first chamber containing an electrolysis cell, the electrolysis cell configured to produce HHO gas. In certain embodiments, for example, the vessel may comprise a replaceable pressure retaining and relief system, the replaceable pressure retaining and relief system configured to—a) retain the reusable container components in a fixed configuration when the contents of the vessel are below a relief pressure; and b) allow reuse of the reusable container components without repair by releasing contents of the vessel at the relief pressure.

In certain embodiments, for example, the replaceable pressure retaining and relief system may operate to relieve the relief pressure within 50 ms (for example in less than 10 ms, less than 5 ms, less than 1 ms, or less than 0.1 ms).

In certain embodiments, for example, the replaceable pressure retaining and relief system may be configured to open the vessel at least 1% (for example in the range of 1-3%, at least 2%, at least 3%, at least 5%, or at least 10%), relative to a surface area of the vessel, in less than 50 ms (for example in less than 10 ms, less than 5 ms, less than 1 ms, or less than 0.1 ms) of contents of the vessel reaching the pre-designed relief pressure. In certain embodiments, for example, the replaceable pressure retaining and relief system may be configured to retain HHO gas within a storage pressure range.

In certain embodiments, for example, the second chamber may be in continuous fluid communication with the first chamber, the second chamber configured to store at least a portion of the produced HHO gas. In certain embodiments, for example, the vessel may be configured for passive transport of HHO gas from the first chamber to the second chamber. In certain embodiments, for example, the second chamber may be configured to contain less than a 5 hour supply (for example in the range of a 10-30 minute supply, less than a 2 hour supply, less than a 1 hour supply, less than a 30 minute supply, or less than a 10 minute supply) hour supply of HHO gas.

In certain embodiments, for example, a controller may be configured to control an electricity supply to the electrolysis cell to maintain a volume of HHO gas in the second chamber within the storage pressure rage.

In certain embodiments, for example, the replaceable pressure retaining and relief system may comprise a pressure release member, the pressure release member sized to release at least a portion of the contents of the vessel when the vessel pressure reaches the relief pressure. In certain embodiments, for example, the pressure release member may be non-reclosing. In certain embodiments, for example, the pressure release member may be configured to open the second chamber. In certain embodiments, for example, the relief pressure may be less than the lowest failure point of the vessel components.

In certain embodiments, for example, the replaceable pressure retaining and relief system may comprise at least one elongated retaining member. In certain embodiments, for example, the at least one elongated retaining member may comprise a tie rod. In certain embodiments, for example, the at least one elongated retaining member may comprise an all-thread rod. In certain embodiments, for example, the at least one elongated retaining member may stretch by at least 3/16 inch at the relief pressure. In certain embodiments, for example, the replaceable pressure retaining and relief system may be configured to open the vessel when the at least one elongated retaining member yields.

In certain embodiments, for example, the reusable container components may comprise: a first endplate, a first hollow outer casing, a second hollow outer casing, and a middle plate disposed between the first hollow outer casing and the second hollow outer casing.

In certain embodiments, for example, first and second cylindrical members may be pressed against a circular middle plate disposed there between via plural elongated retaining members symmetrically distributed about the first and second cylindrical members, a first portion of the plural elongated retaining members passing through first apertures of a flange member of the first cylindrical member and first apertures of the middle plate, a second portion of the plural elongated retaining members passing through second apertures of the middle plate and apertures of a top plate, the top plate pressed against the second cylindrical member. In certain embodiments, for example, the vessel may comprise a pressure release member, wherein the pressure release member is the top plate of the second chamber. In certain embodiments, for example, the first and second cylindrical members may each have a diameter in the range of 4-12 inches. In certain embodiments, for example, the non-reclosing pressure release member may be sized to form a vent area of at least 20 cm2 within 0.1 milliseconds at the third pressure. In certain embodiments, for example, the top plate may be constructed of 3/8 inch stainless steel. In certain embodiments, for example, the middle plate may be constructed of a polyoxymethylene material. In certain embodiments, for example, the elongated retaining members may be all-thread rods fastened with lock nuts. In certain embodiments, for example, the lock nuts may be tightened to a torque in the range of 50-100 lb-in.

In certain embodiments, for example, the pressure relief system may be configured to open the vessel upon detonation of HHO gas in the first chamber and/or the second chamber.

In certain embodiments, for example, the vessel may be adapted for installation onboard a vehicle. In certain embodiments, for example, the vessel may be adapted for safe storage of HHO when the vehicle is moving.

In certain embodiments, for example, the replaceable pressure retaining and relief system may be configured to form a vent area at the top of the second chamber.

In certain embodiments, for example, the vessel may contain cooling coils in the first chamber.

In certain embodiments, for example, the electrolysis cell may comprise electrodes, wherein a controller is configured to control an electricity supply to the to the electrolysis cell to provide a current density to the electrodes of 25-100 mA/cm$^2$. In certain embodiments, for example, a controller may be configured to control an electricity supply to the to the electrolysis cell to provide a voltage in the range of 11-15 VDC.

In certain embodiments, for example, a controller may be configured to control an electricity supply to the to the electrolysis cell to maintain a temperature in the first chamber of less than 65° C.

In certain embodiments, for example, the relief pressure may be 1500 psig or more.

In certain embodiments, for example, the vessel may be in communication with at least one injector, the at least one injector configured to deliver at least a portion of the HHO gas to an internal combustion particulate filter (DPF) regenerator system.

In certain embodiments, for example, the vessel may be in communication with a plurality of injectors, the plurality of injectors configured to introduce at least a portion of the HHO gas to at least one combustion chamber inlet of the internal combustion engine. In certain embodiments, for example, the plurality of injectors may comprise: i) a first injector configured to deliver a first portion of the HHO gas to within 3 inches of a first combustion chamber inlet of a first combustion chamber of the internal combustion engine; ii) a second injector configured to deliver a second portion of the HHO gas to a second combustion chamber inlet of a second combustion chamber of the internal combustion engine; and iii) at least a third injector configured to deliver at least a third portion of the HHO gas to at least a third combustion chamber inlet of at least a third combustion chamber of the internal combustion engine.

In certain embodiments, for example, the vessel may be in communication with a heat exchanger, the heat exchanger configured to receive at least a portion of the HHO gas. In certain embodiments, for example, the heat exchanger may be configured to receive an engine exhaust stream. In certain embodiments, for example, the heat exchanger may be configured to receive an engine coolant stream.

In certain embodiments, for example, the first injector may be configured to deliver the first portion of the HHO gas during a portion of an intake stroke of a first combustion cylinder, the first combustion cylinder comprising the first combustion chamber. In certain embodiments, for example, the portion of an intake stroke may be less than 50% of the intake stroke. In certain embodiments, for example, the during a portion of an intake stroke may be when the intake stroke is at an angle in the range of 0-40° from top-dead-center.

Certain embodiments may provide, for example, a dual-chamber electrolysis vessel configured for safe storage of HHO gas for use by an internal combustion engine. In certain embodiments, for example, the vessel may comprise an electrolysis cell in a first chamber of the dual-chamber vessel, the electrolysis cell configured to produce HHO gas. In certain embodiments, for example, the vessel may comprise a pressure release member, the pressure release member configured to form an opening in communication with a pressure relief space when a pressure inside the vessel exceeds a predetermined pressure, the opening having a surface area of at least 2% (for example at least 3%, at least 5%, or at least 10%) the surface area of the vessel, the opening effective to bring the pressure of the vessel to a pressure of the relief space in less than 50 ms (for example in less than 10 ms, less than 5 ms, less than 1 ms, or less than 0.1 ms).

In certain embodiments, for example, the electrolysis cell may be configured to produce HHO gas at a first pressure or within a range of pressures, for example the electrolysis cell may be in communication with a control system which controls a supply of electricity to the electrolysis cell based on a pressure in a vapor space of the second chamber, whereby a supply of electricity for generation of HHO gas is provided only when the pressure in the vapor space falls in below said first pressure or said range of pressures. In certain embodiments, for example, the vessel may comprise a second chamber, the second chamber in continuous fluid communication with the first chamber, the second chamber configured to store at least a portion of the produced HHO gas. In certain embodiments, for example, the vessel may be configured for passive transport of HHO gas from the first chamber to the second chamber. In certain embodiments, for example, the second chamber may be configured to contain a less than 5 hour supply (for example less than a 2 hour supply, less than a 1 hour supply, less than a 30 minute supply, or less than a 10 minute supply) of HHO gas. In certain embodiments, for example, a controller may be configured to control an electricity supply to the to the electrolysis cell to maintain a pressure and an amount HHO gas in the second chamber. In certain embodiments, for example, the vessel may comprise a relief valve, the relief valve sized to release at least a portion of the contents of the second chamber at a second pressure, the second pressure greater than the first pressure. In certain embodiments, for example, the pressure relief member may be non-reclosing. In certain embodiments, for example, the pressure release member may be configured to open the second chamber. In certain embodiments, for example, the predetermined pressure may be less than the failure point of the other components of the vessel. In certain embodiments, for example, the first chamber and the second chamber may be secured to one another by at least one elongated retaining member. In certain embodiments, for example, the at least one elongated retaining member may comprise a tie rod. In certain embodiments, for example, the at least one elongated retaining member may comprise an all-thread rod. In certain embodiments, for example, the at least one elongated retaining member may stretch by at least $3/16$ inch at the predetermined pressure. In certain embodiments, for example, the non-reclosing pressure release member may be configured to open when the at least one elongated retaining member yields. In certain embodiments, for example, the first and second chambers may be cylindrical. In certain embodiments, for example, the first and second chambers may each be pressed against a circular middle plate via plural elongated retaining members symmetrically distributed about the first and second chambers, a first portion of the plural elongated retaining members passing through first apertures of a flange member of the first chamber and first apertures of the middle plate, a second portion of the plural elongated retaining members passing through second apertures of the middle plate and apertures of a top plate of the second chamber. In certain embodiments, for example, the top plate of the second chamber may be the pressure release member. In certain embodiments, for example, the first and second chambers may each have a diameter in the range of 4-12 inches. In certain embodiments, for example, the non-reclosing pressure release member may be sized to form a vent area of at least 20 cm$^2$ within 0.1 milliseconds at the third pressure. In certain embodiments, for example, the top plate may be constructed of $3/8$ inch stainless steel. In certain embodiments, for example, the middle plate may be constructed of Delrin®. In certain embodiments, for example, the elongated retaining members may be all-thread rods fastened with lock nuts. In certain embodiments, for example, the lock nuts may be tightened to a torque in the range of 50-100 lb-in.

In certain embodiments, for example, the pressure release member may be configured to open upon detonation of HHO gas in the first chamber and/or the second chamber.

In certain embodiments, for example, the vessel may be adapted for installation onboard a vehicle. In certain embodiments, for example, the vessel may be adapted for safe storage of HHO when the vehicle is moving.

In certain embodiments, for example, the pressure release member may be configured to form a vent area at the top of the second chamber.

In certain embodiments, for example, the vessel may contain cooling coils in the first chamber.

In certain embodiments, for example, the electrolysis cell may comprise electrodes, wherein a controller is configured to control an electricity supply to the to the electrolysis cell to provide a current density to the electrodes of 25-100 mA/cm$^2$.

In certain embodiments, for example, a controller may be configured to control an electricity supply to the to the electrolysis cell to provide a voltage in the range of 11-15 VDC.

In certain embodiments, for example, a controller may be configured to control an electricity supply to the to the electrolysis cell to maintain a temperature in the first chamber of less than 65° C.

In certain embodiments, for example, the predetermined or pre-designed pressure may be 1500 psig or more.

In certain embodiments, for example, the pressure release member may comprise a top endcap of the second chamber.

Certain embodiments may provide, for example, a dual-chamber electrolysis vessel configured for safe storage of HHO gas for use by an internal combustion engine, comprising: i) reusable container components, at least one of the reusable container components dividing an interior of the vessel into a first chamber and a second chamber, the first chamber containing an electrolysis cell, the electrolysis cell configured to produce HHO gas; and ii) a replaceable pressure retaining and relief system, the replaceable pressure retaining and relief system configured to—a) retain the reusable container components in a fixed configuration when the contents of the vessel are below a relief pressure; and b) allow reuse of the reusable container components without repair by releasing contents of the vessel at the relief pressure.

Certain embodiments may provide, for example, a method for providing HHO gas to an internal combustion engine. In certain embodiments, for example, the method may comprise controlling a delivery temperature of the HHO gas by exchanging heat between the HHO gas and an exhaust gas stream of the internal combustion engine. In certain embodiments, for example, the method may comprise delivering the HHO gas at the delivery temperature to at least one combustion chamber of the internal combustion engine.

In certain embodiments, for example, the method may further comprise powering a vehicle with the internal combustion engine.

In certain embodiments, for example, the HHO gas may be produced by an onboard electrolysis unit.

In certain embodiments, for example, the controlling may comprise passing HHO gas from a gas outlet of the onboard electrolysis unit to a heat exchanger. In certain embodiments, for example, the exhaust gas stream may be passed through the heat exchanger. In certain embodiments, for example, the temperature of the exhaust gas stream may be reduced by at least 30° F.

In certain embodiments, for example, the controlling may increase the temperature of the HHO gas stream by at least 150° F.

In certain embodiments, for example, the heated HHO gas may be delivered to the combustion chamber at a controlled temperature. In certain embodiments, for example, the delivery temperature may be based on a predetermined set point. In certain embodiments, for example, the heated HHO gas stream may be delivered to the combustion chamber at a temperature and a pressure to deliver a predetermined amount of HHO gas. In certain embodiments, for example, the heat may be exchanged in a shell and tube heat exchanger. In certain embodiments, for example, the HHO gas may pass through a tube portion of the heat exchanger and the exhaust gas stream may pass through a shell portion of the heat exchanger. In certain embodiments, for example, the tube portion may comprise a single straight tube. In certain embodiments, for example, the HHO gas may have a pressure drop of less than 0.05 psi in the heat exchanger.

Certain embodiments may provide, for example, a method for providing HHO gas to an internal combustion engine. In certain embodiments, for example, the method may comprise controlling a delivery temperature of the HHO gas by exchanging heat between the HHO gas and an exhaust gas stream of the internal combustion engine. In certain embodiments, for example, the method may comprise delivering a first portion of the HHO gas at the delivery temperature to a first combustion chamber of the internal combustion engine, a second portion of the HHO gas at the delivery temperature to a second combustion chamber of the internal combustion engine, and at least a third portion of the HHO gas at the delivery temperature to at least a third combustion chamber of the internal combustion engine.

In certain embodiments, for example, the HHO gas may be further delivered to a diesel particulate filter (DPF) regenerator system.

In certain embodiments, for example, the HHO gas may be introduced to a first combustion chamber of the at least one combustion chamber during a portion of an intake stroke of a first combustion cylinder, the first combustion cylinder comprising the first combustion chamber. In certain embodiments, for example, the portion of the intake stroke is less than 50% of the intake stroke. In certain embodiments, for example, the during a portion of an intake stroke may be when the intake stroke is at an angle in the range of 0-40° from top-dead-center.

Certain embodiments may provide, for example, a method for providing HHO gas to an internal combustion engine. In certain embodiments, for example, the method may comprise exchanging heat with exhaust of the internal combustion engine to control the temperature of the HHO gas delivered to at least one combustion chamber of the internal combustion engine.

In certain embodiments, for example, the method may further comprise powering a vehicle with the internal combustion engine. In certain embodiments, for example, the HHO gas stream may be produced by an onboard electrolysis unit. In certain embodiments, for example, the indirectly exchanging heat may comprise the exhaust exchanging heat with a heat exchanger connected to a gas outlet of the onboard electrolysis unit.

In certain embodiments, for example, the indirectly exchanging heat may comprise the exhaust exchanging heat with a heat exchanger connected to a gas outlet of the onboard electrolysis unit.

In certain embodiments, for example, the temperature of the exhaust may be reduced by at least 10° F. (for example at least 20° F., at least 30° F., or at least 40° F.) relative to an internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas.

In certain embodiments, for example, the temperature of the heated HHO gas stream may be at least 125° F. (for example at least 150° F.).

In certain embodiments, for example, the heated HHO gas may be delivered to the combustion chamber at a controlled temperature. In certain embodiments, for example, the heated HHO gas stream may be delivered to the combustion chamber at a predetermined temperature or proximate the predetermined temperature or within a predetermined temperature range (for example at a temperature in the range of 100-175° F.)

In certain embodiments, for example, the heated HHO gas stream may be delivered to the combustion chamber at a temperature and a pressure (for example at a temperature in the range of 100-175° F. and a pressure in the range of 20-150 psig) to deliver a predetermined amount of HHO gas.

In certain embodiments, for example, the heat may be exchanged in a shell and tube heat exchanger. In certain embodiments, for example, the HHO gas may pass through a tube portion of the heat exchanger and the exhaust passes through a shell portion of the heat exchanger. In certain embodiments, for example, the tube portion may comprise a single straight tube. In certain embodiments, for example, the HHO gas has a pressure drop of less than 1 psi (for example less than 0.25 psi, less than 0.1 psi, or less than 0.05 psi) in the heat exchanger.

Certain embodiments may provide, for example, a method for providing HHO gas to an internal combustion engine. In certain embodiments, for example, the method may comprise exchanging heat with exhaust of the internal combustion engine to control the temperature of the HHO gas delivered to a first combustion chamber of the internal combustion engine, a second combustion chamber of the internal combustion engine, and at least a third combustion chamber of the internal combustion engine.

Certain embodiments may provide, for example, a method for providing HHO gas to an internal combustion engine, comprising: i) controlling a delivery temperature of the HHO gas by exchanging heat between the HHO gas and an exhaust gas stream of the internal combustion engine; and ii) delivering the HHO gas at the delivery temperature to at least one combustion chamber of the internal combustion engine.

Certain embodiments may provide, for example, a method for providing HHO gas to an internal combustion engine, comprising: i) controlling a delivery temperature of the HHO gas by exchanging heat between the HHO gas and an exhaust gas stream of the internal combustion engine; and ii) delivering a first portion of the HHO gas at the delivery temperature to a first combustion chamber of the internal combustion engine, a second portion of the HHO gas at the delivery temperature to a second combustion chamber of the internal combustion engine, and at least a third portion of the HHO gas at the delivery temperature to at least a third combustion chamber of the internal combustion engine.

Certain embodiments may provide, for example, an abatement system for an electrolysis unit onboard a vehicle, comprising: a container having a partition between an electrolysis chamber and an HHO gas collection chamber, the partition comprising a valve-free orifice, the electrolysis chamber configured to house a plurality of electrodes. In certain embodiments, for example, the system may be effective to maintain the plurality of electrodes immersed in a liquid electrolyte throughout all orientations of the container when a liquid level is filled to at least the indicated minimum liquid level.

Certain embodiments may provide, for example, an electrolysis system container for a vehicle. In certain embodiments, for example, the electrolysis system container may comprise a first chamber of the container containing an electrolysis generator, the electrolysis generator configured to produce HHO gas. In certain embodiments, for example, the electrolysis system container may comprise a second chamber of the container in fluid communication with the first chamber, the second chamber configured to receive and store HHO gas from the first chamber. In certain embodiments, for example, the electrolysis system container may comprise a rollover abatement system configured to seal off HHO gas from returning to the first chamber from the second chamber under any orientation of the container.

In certain embodiments, for example, the rollover abatement system may have no moving parts. In certain embodiments, for example, the container may have terminals for a power supply. In certain embodiments, for example, the container may be coupled to a control system for the power supply.

In certain embodiments, for example, the electrolysis system container may further comprise a pressure retaining and relief system, the pressure retaining and relief system configured to—i) prevent the container from leaking under pressure up to a relief pressure; and ii) releasing contents of the container at the relief pressure.

In certain embodiments, for example, the second chamber may have a liquid storage space provisioned to contain a quantity of a liquid electrolyte and a vapor space provisioned to contain a portion of the on-demand supply of HHO gas. In certain embodiments, for example, the rollover abatement system may comprise a nozzle, the nozzle providing fluid communication between the first chamber and a second chamber, the nozzle configured to maintain a liquid seal over the first chamber under any orientation of the first chamber and/or the second chamber. In certain embodiments, for example, the nozzle may be in fixed relation with the first and second chambers. In certain embodiments, for example, the nozzle may be an elongated dual-purpose nozzle configured to passively communicate liquid electrolyte and HHO gas between the first chamber and the second chamber. In certain embodiments, for example, the elongated dual-purpose nozzle may define an outlet disposed within the second chamber. In certain embodiments, for example, the nozzle may be in fixed relation with the first and second chambers. In certain embodiments, for example, the nozzle may be a gooseneck nozzle. In certain embodiments, for example, the nozzle may be integral with a middle plate, the middle plate separating the first and second chambers. In certain embodiments, for example, the liquid seal may prevent transfer of vapor from second chamber to the first chamber under any orientation of the first and/or second chamber. In certain embodiments, for example, the liquid seal may prevent transfer of gas from the second chamber into the first chamber under ordinary operation of the vehicle. In certain embodiments, for example, the liquid seal may prevent transfer of gas from the second chamber into the first chamber if the vehicle rolls over.

In certain embodiments, for example, the rollover abatement system may be passive. In certain embodiments, for example, the rollover abatement system may be unpowered.

In certain embodiments, for example, the first chamber and the second chamber may be in fixed relation. In certain embodiments, for example, the first chamber and the second chamber may be defined by a dual-chamber pressure-resistant vessel.

In certain embodiments, for example, the vehicle may be powered by an internal combustion engine.

In certain embodiments, for example, the electrolysis system container may have a volume of sufficient to contain at least 1 gallon of liquid electrolyte. In certain embodiments, for example, the volume of the second chamber may be greater than the volume of the first chamber. In certain embodiments, for example, the electrolysis system container may be adapted to be mounted in a fixed upright orientation onboard the vehicle.

Certain embodiments may provide, for example, an electrolysis system. In certain embodiments, for example, the electrolysis system may comprise a first chamber containing plural electrolysis electrodes. In certain embodiments, for example, the electrolysis system may comprise a second chamber having a height H and a diameter D, the height H greater than the diameter D, the second chamber in fluid communication with the first chamber. In certain embodiments, for example, the electrolysis system may comprise an elongated dual-purpose nozzle configured to passively communicate (for example fluidly communication via buoyancy forces) liquid electrolyte and HHO gas between the first chamber and the second chamber, the elongated dual-purpose nozzle defining an outlet disposed within the second chamber, the outlet characterized by a diameter d, the dual-purpose nozzle positioned to provide a liquid seal between the second chamber and the outlet under any orientation of the second chamber when the second chamber contains liquid electrolyte to a height of at least ½ H plus d.

In certain embodiments, for example, the diameter D may be in the range of 4-12 inches. In certain embodiments, for example, the diameter d may be in the range of ⅜-1⅞ inches. In certain embodiments, for example, the second chamber may contain a vapor space having a height less than ½ H minus d; and the distance from the outlet to a free surface of the liquid electrolyte may be less than at least d.

In certain embodiments, for example, the elongated dual-purpose nozzle may be cylindrical. In certain embodiments, for example, the elongated dual-purpose nozzle may be centrally positioned relative to a centerline of the first and second chambers. In certain embodiments, for example, the electrolysis system may be configured for passive transport of HHO gas from the first chamber to the second chamber via the elongated dual-purpose nozzle.

In certain embodiments, for example, the electrolysis system may comprise a float switch in the second chamber. In certain embodiments, for example, the electrolysis system may be configured to prevent flow of electricity to the plural electrolysis electrodes when the float switch is in a triggered position, for example closed.

In certain embodiments, for example, the vapor space may have a volume of less than 30% (for example in the range of 5-25%, in the range of 5-15%, less than 25%, or less than 15%) of the volume of the second chamber.

In certain embodiments, for example, the electrolysis system may be in communication with at least one injector, the at least one injector configured to deliver at least a portion of the supply of HHO gas to a diesel particulate filter (DPF) regenerator system.

In certain embodiments, for example, the electrolysis system may be in communication with a plurality of injectors, the plurality of injectors configured to introduce at least a portion of the supply of HHO gas to at least one combustion chamber inlet of the internal combustion engine. In certain embodiments, for example, the plurality of injectors may comprise: i) a first injector configured to deliver a first portion of the supply of HHO gas to within 3 inches of a first combustion chamber inlet of a first combustion chamber of the internal combustion engine; ii) a second injector configured to deliver a second portion of the supply of HHO gas to a second combustion chamber inlet of a second combustion chamber of the internal combustion engine; and iii) at least a third injector configured to deliver at least a third portion of the supply of HHO gas to at least a third combustion chamber inlet of at least a third combustion chamber of the internal combustion engine.

In certain embodiments, for example, a first injector may be configured to deliver a first portion of the HHO gas during a portion of an intake stroke of a first combustion cylinder, the first combustion cylinder comprising the first combustion chamber. In certain embodiments, for example, the portion of the intake stroke may be less than 50% of the intake stroke. In certain embodiments, for example, the during a portion of an intake stroke may be when the intake stroke is at an angle in the range of 0-40° from top-dead-center.

In certain embodiments, for example, the electrolysis system may be in communication with a heat exchanger, the heat exchanger configured to receive at least a portion of the HHO gas. In certain embodiments, for example, the heat exchanger may be configured to receive an engine exhaust stream. In certain embodiments, for example, the heat exchanger may be configured to receive an engine coolant stream.

Certain embodiments may provide, for example, an electrolysis system for a vehicle. In certain embodiments, for example, the electrolysis system may comprise a first chamber containing an electrolysis generator, the electrolysis generator adapted to provide an on-demand supply of HHO gas to an internal combustion engine, the internal combustion engine positioned on the vehicle. In certain embodiments, for example, the electrolysis system may comprise a second chamber in fluid communication with the first chamber, the second chamber configured to receive the supply of HHO gas from the first chamber. In certain embodiments, for example, the electrolysis system may comprise a rollover abatement system configured to seal off the HHO vapor from returning to the first chamber from the second chamber in any orientation.

In certain embodiments, for example, the second chamber may have a liquid storage space provisioned to contain a quantity of a liquid electrolyte and a vapor space provisioned to contain a portion of the on-demand supply of HHO gas. In certain embodiments, for example, the rollover abatement system may comprise a nozzle, the nozzle providing fluid communication between the first chamber and a second chamber, the nozzle configured to maintain a liquid seal over the first chamber under any orientation of the first chamber and/or the second chamber. In certain embodiments, for example, the nozzle may be in fixed relation with the first and second chambers. In certain embodiments, for example, the nozzle may be an elongated dual-purpose nozzle configured to passively communicate liquid electrolyte and HHO gas between the first chamber and the second chamber. In certain embodiments, for example, the elongated dual-purpose nozzle may define an outlet disposed within the second chamber. In certain embodiments, for example, the nozzle may be in fixed relation with the first and second chambers. In certain embodiments, for example, the nozzle may be a gooseneck nozzle. In certain embodiments, for example, the nozzle may be integral with a middle plate, the middle plate separating the first and second chambers. In certain embodiments, for example, the liquid seal may prevent transfer of vapor from second chamber to the first chamber under any orientation of the first and/or second chamber. In certain embodiments, for example, the liquid seal may prevent transfer of gas from the second chamber into the first chamber under ordinary operation of the vehicle. In certain embodiments, for example, the liquid seal may prevent transfer of gas from the second chamber into the first chamber if the vehicle rolls over.

In certain embodiments, for example, the rollover abatement system may be passive (for example may have no moving parts, or may have no mechanically actuated parts). In certain embodiments, for example, the rollover abatement system may be unpowered.

In certain embodiments, for example, the first chamber and the second chamber may be in fixed relation. In certain embodiments, for example, the first chamber and the second chamber may be defined by a dual-chamber pressure-resistant vessel. In certain embodiments, for example, the volume of the second chamber may be greater than the volume of the first chamber.

In certain embodiments, for example, the internal combustion engine may be adapted to power the vehicle.

In certain embodiments, for example, the electrolysis system may have a volume of sufficient to contain at least 1 gallon of liquid electrolyte. In certain embodiments, for example, the electrolysis system may be adapted to be mounted in a fixed upright orientation onboard the vehicle.

Certain embodiments may provide, for example, an electrolysis system. In certain embodiments, for example, the electrolysis system may comprise a first chamber containing plural electrolysis electrodes. In certain embodiments, for example, the electrolysis system may comprise a second chamber having a height H and a diameter D, the height H greater than the diameter D, the second chamber in fluid communication with the first chamber. In certain embodiments, for example, the electrolysis system may comprise an elongated dual-purpose nozzle configured to passively communicate (for example fluidly communication via buoyancy forces) (or continuously communicate) liquid electrolyte and HHO gas between the first chamber and the second chamber, the elongated dual-purpose nozzle defining an outlet disposed within the second chamber, the outlet characterized by a diameter d, the dual-purpose nozzle positioned to provide a liquid seal between the second chamber and the outlet under any orientation of the second chamber when the second chamber contains liquid electrolyte to a height of at least % H plus d.

In certain embodiments, for example, the diameter D may be in the range of 4-12 inches. In certain embodiments, for example, the diameter d may be in the range of $3/8$-1% inches. In certain embodiments, for example, the second chamber may contain a vapor space having a height less than % H minus d; and the distance from the outlet to a free surface of the liquid electrolyte is less than at least d. In certain embodiments, for example, the ratio of H to D may be in the range of 1-3, in the range of 1-2, in the range of 1-1.5, in the range of 1-1.4, in the range of 1.2-1.75, in the range of 1.2-1.4, or the ratio of H to D may be in the range of 1.25-1.35. In certain embodiments, for example, the ratio of d to D may be in the range of $1/16$-$1/3$, in the range of $1/8$-$1/4$, or the ratio of d to D may be in the range of $1/7$-$1/5$.

In certain embodiments, for example, the elongated dual-purpose nozzle may be cylindrical. In certain embodiments, for example, the elongated dual-purpose nozzle may be centrally positioned relative to a centerline of the first and second chambers.

In certain embodiments, for example the electrolysis system may be configured for passive transport of HHO gas from the first chamber to the second chamber via the elongated dual-purpose nozzle.

In certain embodiments, for example, the electrolysis system may further comprise a float switch in the second chamber. In certain embodiments, for example, the electrolysis system may be configured to prevent flow of electricity to the plural electrolysis electrodes when the float switch is in a triggered position.

In certain embodiments, for example, the vapor space may have a volume of less than 50% (for example less than 40%, less than 30%, or less than 15%) of the volume of the second chamber.

Certain embodiments may provide, for example, an electrolysis system for a vehicle, comprising: i) a first chamber containing an electrolysis generator, the electrolysis generator adapted to provide an on-demand supply of HHO gas to an internal combustion engine, the internal combustion engine positioned on the vehicle; ii) a second chamber in fluid communication with the first chamber, the second chamber configured to receive the supply of HHO gas from the first chamber; and iii) a rollover abatement system configured to seal off the HHO vapor from returning to the first chamber from the second chamber in any orientation.

Certain embodiments may provide, for example, an electrolysis system comprising: i) a first chamber containing plural electrolysis electrodes; ii) a second chamber having a height H and a diameter D, the height H greater than the diameter D, the second chamber in fluid communication with the first chamber; and iii) an elongated dual-purpose nozzle configured to passively communicate (for example fluidly communication via buoyancy forces) liquid electrolyte and HHO gas between the first chamber and the second chamber, the elongated dual-purpose nozzle defining an outlet disposed within the second chamber, the outlet characterized by a diameter d, the dual-purpose nozzle positioned to provide a liquid seal between the second chamber and the outlet under any orientation of the second chamber when the second chamber contains liquid electrolyte to a height of at least ½ H plus d.

Certain embodiments may provide, for example, an abatement system for an electrolysis unit onboard a vehicle, comprising: a container having a partition between an electrolysis chamber and an HHO gas collection chamber, the partition comprising a valve-free orifice, the electrolysis chamber configured to house a plurality of electrodes, the system effective to maintain the plurality of electrodes immersed in a liquid electrolyte throughout all orientations of the container when a liquid level is filled to at least the indicated minimum liquid level.

Certain embodiments may provide, for example, an electrolysis system container for a vehicle, comprising: i) a first chamber of the container containing an electrolysis generator, the electrolysis generator configured to produce HHO gas; ii) a second chamber of the container in fluid communication with the first chamber, the second chamber configured to receive and store HHO gas from the first chamber; and iii) a rollover abatement system configured to seal off HHO gas from returning to the first chamber from the second chamber under any orientation of the container.

Certain embodiments may provide, for example, an electrolysis system. In certain embodiments, for example, the electrolysis system may comprise: i) a first chamber containing plural electrolysis electrodes; ii) a second chamber having a height H and a diameter D, the height H greater than the diameter D, the second chamber in fluid communication with the first chamber; and iii) an elongated dual-purpose nozzle configured to passively communicate (for example fluidly communication via buoyancy forces) liquid electrolyte and HHO gas between the first chamber and the second chamber, the elongated dual-purpose nozzle defining an outlet disposed within the second chamber, the outlet characterized by a diameter d, the dual-purpose nozzle positioned to provide a liquid seal between the second chamber and the outlet under any orientation of the second chamber when the second chamber contains liquid electrolyte to a height of at least % H plus d.

Certain embodiments may provide, for example, a method for increasing carbonaceous fuel economy of an internal combustion engine, the method comprising combusting (or configuring the internal combustion engine to combust) a quantity of carbonaceous fuel in at least one combustion chamber of the internal combustion engine in the presence of an ultra low quantity of HHO gas.

In certain embodiments, for example, the increased carbonaceous fuel economy may be measured as a percentage increase in work performed per unit of carbonaceous fuel (for example when an internal combustion engine is used to power an automobile the increased carbonaceous fuel economy may be measured as a percentage increase in the miles traveled per gallon of carbonaceous fuel combusted (for example gasoline fuel, diesel fuel, or bio to fuel)). The improvement in fuel economy may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. According to such a measure, for example, the method may increase carbonaceous fuel economy by at least 1% (for example increase the miles per gallon by at least 1%) compared to combusting the quantity of carbonaceous fuel without the presence of the ultra low quantity of HHO gas, for example by at least 2%, at least 3%, at least 4%, at least 5%, at least 10%, at least 15%, at least 18%, at least 20%, at least 25%, at least 28%, at least 30%, at least 35%, or the method may increase carbonaceous fuel economy by at least 40% compared to combusting the quantity of carbonaceous fuel without the presence of the ultra low quantity of HHO gas. In certain embodiments, for example, the method may increase carbonaceous fuel economy by in the range of 1 to 50% compared to combusting the quantity of carbonaceous fuel without the presence of the ultra low quantity of HHO gas, for example by in the range of 5 to 25%, in the range of 5 to 20%, in the range of 5 to 15%, in the range of 10 to 20%, in the range of 15 to 25%, in the range of 1 to 5%, in the range of 5 to 10%, in the range of 5 to 25%, in the range of 7 to 12%, in the range of 10 to 20%, in the range of 18 to 28%, in the range of 20 to 25%, in the range of 20 to 30%, in the range of 20 to 50%, in the range of 30 to 35%, in the range of 30 to 38%, in the range of 40 to 50%, in the range of 40 to 45%, in the range of 44 to 50%, or the method may increase carbonaceous fuel economy by in the range of 20 to 30% compared to combusting the quantity of carbonaceous fuel without the presence of the ultra low quantity of HHO gas.

Other measures of carbonaceous fuel economy are contemplated herein. In certain embodiments, for example, the internal combustion engine may be used in an electric generator. In certain further embodiments, for example, the carbonaceous fuel economy may be measured as a percentage reduction in the carbonaceous fuel consumption per unit of work performed by the generator, for example the percentage reduction in the gallons of carbonaceous fuel consumed per kilowatt to hour. According to such a measure, for example, the method may reduce carbonaceous fuel consumption per unit of work performed by at least 1% (for example reduce the gallons of carbonaceous fuel consumed per kilowatt to hour by at least 1%) compared to combusting the quantity of carbonaceous fuel without the presence of the ultra low quantity of HHO gas, for example by at least 2%, at least 3%, at least 4%, at least 5%, at least 10%, at least 15%, at least 20%, at least 25%, at least 30%, at least 35%, at least 40%, at least 45%, or the method may reduce carbonaceous fuel consumption per unit of work performed by at least 50% compared to combusting the quantity of carbonaceous fuel without the presence of the ultra low quantity of HHO gas. In certain embodiments, for example, the method may reduce carbonaceous fuel consumption per unit of work performed by in the range of 1 to 50% compared to combusting the quantity of carbonaceous fuel without the presence of the ultra low quantity of HHO gas, for example by in the range of 5 to 25%, in the range of 5 to 20%, in the range of 5 to 15%, in the range of 10 to 20%, in the range of 15 to 25%, or the method may reduce carbonaceous fuel consumption per unit of work performed by in the range of 20 to 30% compared to combusting the quantity of carbonaceous fuel without the presence of the ultra low quantity of HHO gas.

In certain embodiments, for example, the method may reduce particulate emissions from the internal combustion engine by at least 1 wt. % compared to combusting the quantity of carbonaceous fuel without the presence of the ultra low quantity of HHO gas, for example by at least 2%, at least 3%, at least 4%, at least 5%, at least 10%, at least 15%, at least 20%, at least 25%, at least 30%, at least 35%, at least 40%, at least 45%, or the method may reduce particulate emissions from the internal combustion engine by at least 50 wt. % compared to combusting the quantity of carbonaceous fuel without the presence of the ultra low quantity of HHO gas. In certain embodiments, for example, the method may reduce particulate emissions from the internal combustion engine by in the range of 1 to 50 wt. % compared to combusting the quantity of carbonaceous fuel without the presence of the ultra low quantity of HHO gas, for example by in the range of 5 to 25%, in the range of 5 to 20%, in the range of 5 to 15%, in the range of 10 to 20%, in the range of 15 to 25%, in the range of 1 to 5%, in the range of 5 to 10%, in the range of 5 to 25%, in the range of 7 to 12%, in the range of 10 to 20%, in the range of 15 to 25%, in the range of 20 to 25%, in the range of 20 to 30%, in the range of 20 to 50%, in the range of 30 to 35%, in the range of 30 to 38%, in the range of 40 to 50%, in the range of 40 to 45%, in the range of 44 to 50%, or the method may reduce particulate emissions from the internal combustion engine by in the range of 20 to 30 wt. % compared to combusting the quantity of carbonaceous fuel without the presence of the ultra low quantity of HHO gas. In certain embodiments, for example, the method may reduce soot emissions from the internal combustion engine by at least 1 wt. % compared to combusting the quantity of carbonaceous fuel without the presence of the ultra low quantity of HHO gas, for example by at least 2%, at least 3%, at least 4%, at least 5%, at least 10%, at least 15%, at least 20%, at least 25%, at least 30%, at least 35%, at least 40%, at least 45%, or the method may reduce soot emissions from the internal combustion engine by at least 50 wt. % compared to combusting the quantity of carbonaceous fuel without the presence of the ultra low quantity of HHO gas. In certain embodiments, for example, the method may reduce soot emissions from the internal combustion engine by in the range of 1 to 50 wt. % compared to combusting the quantity of carbonaceous fuel without the presence of the ultra low quantity of HHO gas, for example by in the range of 5 to 25%, in the range of 5 to 20%, in the range of 5 to 15%, in the range of 10 to 20%, in the range of 15 to 25%, in the range of 1 to 5%, in the range of 5 to 10%, in the range of 5 to 25%, in the range of 7 to 12%, in the range of 10 to 20%, in the range of 15 to 25%, in the range of 20 to 25%, in the range of 20 to 30%, in the range of 20 to 50%, in the range of 30 to 35%, in the range of 30 to 38%, in the range of 40 to 50%, in the range of 40 to 45%, in the range of 44 to 50%, or the method may reduce soot emissions from the internal combustion engine by in the range of 20 to 30 wt. % compared to combusting the quantity of carbonaceous fuel without the presence of the ultra low quantity of HHO gas.

In certain embodiments, for example, the method may reduce the temperature of exhaust gases produced by the internal combustion engine by at least 10° F. compared to combusting the quantity of carbonaceous fuel without the presence of the ultra low quantity of HHO gas, for example by at least 20° F., at least 30° F., at least 40° F., at least 50° F., at least 80° F., or the method may reduce the temperature of exhaust gases produced by the internal combustion engine by at least 100° F. compared to combusting the quantity of carbonaceous fuel without the presence of the ultra low quantity of HHO gas. The lower temperature may be relative to the internal combustion engine running under identical or substantially identical conditions (for example, taking into account engine load, average engine load, run-time, average run-time, temperature, average temperature, speed, average speed, rpm's, average rpm's, acceleration, average acceleration and/or type of primary fuel) without HHO gas. In certain embodiments, for example, the method may reduce the temperature of exhaust gases produced by the internal combustion engine by in the range of 10 to 100° F. compared to combusting the quantity of carbonaceous fuel without the presence of the ultra low quantity of HHO gas, for example by in the range of 30 to 80° F., in the range of 40 to 80° F., in the range of 50 to 100° F., in the range of 50 to 80° F., or the method may reduce particulate emissions produced by the internal combustion engine by in the range of 80 to 100° F. compared to combusting the quantity of carbonaceous fuel without the presence of the ultra low quantity of HHO gas.

In certain embodiments, for example, the internal combustion engine may be a gasoline engine. In certain embodiments, for example, the internal combustion engine may be a diesel engine. In certain embodiments, for example, the internal combustion engine may be a hybrid engine. In certain embodiments, for example, the internal combustion engine may be a biofuel engine. In certain embodiments, for example, the fuel combusted by the internal combustion engine may comprise a biofuel. In certain embodiments, for example, the internal combustion engine may be a flex fuel engine. In certain embodiments, for example, the internal combustion engine may be a hydrogen fuel engine. In certain embodiments, for example, the internal combustion engine may be a compressed natural gas (CNG) engine. In certain embodiments, for example, the internal combustion engine may be a liquefied natural gas (LNG) engine. In certain embodiments, for example, the internal combustion engine may be an engine that consumes ethanol, methanol, ethanol blends or mixtures thereof. In certain embodiments, for example, the internal combustion engine may be a Sterling engine. In certain embodiments, for example, the internal combustion engine may be a rotary engine. In certain embodiments, for example, the internal combustion engine may be an opposed-piston engine. In certain embodiments, for example, the internal combustion engine may be an engine on a bus, a commercial truck, an off-road construction vehicle, an off-road heavy duty vehicle, a delivery vehicle, a line haul vehicle, construction and industrial equipment, auxiliary power equipment, refrigeration equipment, an airplane, a residential generator, a commercial generator. In certain embodiments, for example, the internal combustion engine may be a marine engine or a mine haul engine. In certain embodiments, for example, the internal combustion engine may be a turbine engine or a jet engine. In certain embodiments, for example, the internal combustion engine may have in the range of 1 to 200 liters of displacement, for example, in the range of 80 to 130 liters of displacement, in the range of 4 to 30 liters of displacement, in the range of 8 to 32 liters of displacement, in the range of 10 to 24 liters of displacement, in the range of 8 to 18 liters of displacement, or the internal combustion engine may have in the range of 12 to 16 liters of displacement.

In certain embodiments, for example, the ultra low quantity of HHO gas may be no more than a catalytic quantity of HHO gas. In certain embodiments, for example, the ultra low quantity of HHO gas may be the quantity of the HHO gas formed by electrolysis of less than 2 ounces of an aqueous electrolyte solution per 10,000,000 crankshaft revolutions of the internal combustion engine per liter of displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 10,000,000 crankshaft revolutions of the internal combustion engine per liter displacement of the at least one combustion chamber. In certain embodiments, for example, the ultra low quantity of HHO gas may be the quantity of the HHO gas formed by electrolysis of less than 2 ounces of an aqueous electrolyte solution per 20,000,000 crankshaft revolutions of the internal combustion engine per liter displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 20,000,000 crankshaft revolutions of the internal combustion engine per liter displacement of the at least one combustion chamber. In certain embodiments, for example, the ultra low quantity of HHO gas may be the quantity of the HHO gas formed by electrolysis of less than 2 ounces of an aqueous electrolyte solution per 30,000,000 crankshaft revolutions of the internal combustion engine per liter displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 30,000,000 crankshaft revolutions of the internal combustion engine per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 10,000,000 crankshaft revolutions of the internal combustion engine per liter displacement (of the total combustion chambers being treated with the HHO gas), for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 10,000,000 crankshaft revolutions of the internal combustion engine per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 20,000,000 crankshaft revolutions of the internal combustion engine per liter displacement (of the total combustion chambers being treated with the HHO gas), for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 20,000,000 crankshaft revolutions of the internal combustion engine per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 30,000,000 crankshaft revolutions of the internal combustion engine per liter displacement (of the total combustion chambers being treated with the HHO gas), for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 30,000,000 crankshaft revolutions of the internal combustion engine per liter displacement of the at least one combustion chamber. In certain embodiments, for example, the ounces of aqueous electrolyte solution electrolyzed may be computed based on operation of the internal combustion engine under simulated driving conditions. In certain embodiments, for example, the ounces of aqueous electrolyte solution electrolyzed may be computed based operation of the internal combustion engine under controlled test conditions. In certain embodiments, for example, the ounces of aqueous electrolyte solution electrolyzed may be computed based on ordinary operation of the internal combustion engine. In certain embodiments, for example, the ounces of aqueous electrolyte solution electrolyzed may an average value determined from one or more of the foregoing operating conditions.

In certain embodiments, for example, the ultra low quantity of HHO gas may be the quantity of the HHO gas formed by electrolysis of in the range of 2 to 10 ounces of an aqueous electrolyte solution per 20,000,000 crankshaft revolutions of the internal combustion engine per liter displacement (of the total combustion chambers being treated with the HHO gas), for example in the range of 2 to 6 ounces, in the range of 4 to 10 ounces, in the range of 2.75 to 4 ounces, in the range of 3 to 4 ounces, or the ultra low quantity of HHO gas may be the quantity of the HHO gas formed by electrolysis of in the range of 3 to 3.5 ounces of an aqueous electrolyte solution per 20,000,000 crankshaft revolutions of the internal combustion engine per liter displacement of the at least one combustion chamber. In certain embodiments, for example, the ounces of aqueous electrolyte solution electrolyzed may be computed based on operation of the internal combustion engine under simulated driving conditions. In certain embodiments, for example, the ounces of aqueous electrolyte solution electrolyzed may be computed based operation of the internal combustion engine under controlled test conditions. In certain embodiments, for example, the ounces of aqueous electrolyte solution electrolyzed may be computed based on ordinary operation of the internal combustion engine. In certain embodiments, for example, the ounces of aqueous electrolyte solution electrolyzed may an average value determined from one or more of the foregoing operating conditions.

In certain embodiments, for example, the ultra low quantity of HHO gas may be the quantity of the HHO gas formed by electrolysis of in the range of 2 to 10 ounces of an aqueous electrolyte solution per 10,000 miles driving distance of a vehicle powered by an internal combustion engine per liter displacement (of the total combustion chambers being treated with the HHO gas), for example in the range of 2 to 6 ounces, in the range of 4 to 10 ounces, in the range of 2.75 to 4 ounces, in the range of 3 to 4 ounces, or the ultra low quantity of HHO gas may be the quantity of the HHO gas formed by electrolysis of in the range of 3 to 3.5 ounces of an aqueous electrolyte solution per 10,000 miles driving distance of a vehicle powered by an internal combustion engine per liter displacement (of the total combustion chambers being treated with the HHO gas). In certain embodiments, for example, the ounces of aqueous electrolyte solution electrolyzed may be computed based on operation of the internal combustion engine under simulated driving conditions. In certain embodiments, for example, the ounces of aqueous electrolyte solution electrolyzed may be computed based operation of the internal combustion engine under controlled test conditions. In certain embodiments, for example, the ounces of aqueous electrolyte solution electrolyzed may be computed based on ordinary operation of the internal combustion engine. In certain embodiments, for example, the ounces of aqueous electrolyte solution electrolyzed may an average value determined from one or more of the foregoing operating conditions.

In certain embodiments, for example, the quantity of HHO formed by electrolysis and/or consumed by an internal combustion engine having 13 liters of displacement may be the quantity formed by electrolysis of in the range of 0.5-1 gallons of an aqueous electrolyte solution per 100 hours of operation at full load. In certain embodiments, for example, the quantity of HHO formed by electrolysis and/or consumed by an internal combustion engine powering a vehicle and having 13 liters of displacement may be the quantity formed by electrolysis of in the range of 0.25-0.75 gallons of an aqueous electrolyte solution per 10,000 miles traveling distance of the vehicle.

In certain embodiments, for example, the quantity of HHO formed by electrolysis and/or consumed by an internal combustion engine may be the quantity formed by electrolysis of in the range of 2-25 ounces (for example in the range of 5-9 ounces) of an aqueous electrolyte solution per liter of engine displacement per 100 hours of operation at full load (or 20% of rated maximum load or 50% of rated maximum load). In certain embodiments, for example, the quantity of HHO formed by electrolysis and/or consumed by an internal combustion engine powering a vehicle and having 13 liters of displacement may be the quantity formed by electrolysis of in the range of 0.25-0.75 gallons of an aqueous electrolyte solution per 10,000 miles traveling distance of the vehicle.

Certain embodiments may provide, for example, a method for increasing vehicle carbonaceous fuel economy, the vehicle powered by an internal combustion engine, comprising combusting (or configuring the vehicle to combust) a quantity carbonaceous fuel in at least one combustion chamber of the internal combustion engine in the presence of an ultra low quantity of HHO gas.

In certain embodiments, for example, the ultra low quantity of HHO gas may be no more than a catalytic quantity of HHO gas. In certain embodiments, for example, the ultra low quantity of HHO gas may be the quantity of the HHO gas formed by electrolysis of less than 2 ounces of an aqueous electrolyte solution per 5,000 miles of driving per liter displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 5,000 miles of driving per liter displacement of the at least one combustion chamber. In certain embodiments, for example, the ultra low quantity of HHO gas may be the quantity of the HHO gas formed by electrolysis of less than 2 ounces of an aqueous electrolyte solution per 10,000 miles of driving per liter displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 10,000 miles of driving per liter displacement of the at least one combustion chamber. In certain embodiments, for example, the ultra low quantity of HHO gas may be the quantity of the HHO gas formed by electrolysis of less than 2 ounces of an aqueous electrolyte solution per 15,000 miles of driving per liter displacement (of the total combustion chambers being treated with the HHO gas), for example less than 1.75 ounces, less than 1.5 ounces, less than 1.25 ounces, less than 1 ounce, less than 0.75 ounces, less than 0.5 ounces, or the ultra low quantity of HHO gas may be the quantity of the HHO gas formed by electrolysis of less than 0.25 ounces of an aqueous electrolyte solution per 15,000 miles of driving per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 5,000 miles of driving per liter displacement (of the total combustion chambers being treated with the HHO gas), for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 5,000 miles of driving per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 10,000 miles of driving per liter displacement (of the total combustion chambers being treated with the HHO gas), for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 10,000 miles of driving per liter displacement of the at least one combustion chamber. In certain embodiments, for example, the ultra low quantity of HHO gas may be the quantity of the HHO gas formed by electrolysis of in the range of 0.5 to 2 ounces of an aqueous electrolyte solution per 15,000 miles of driving per liter displacement of the at least one combustion chamber, for example in the range of 0.5 to 1.75 ounces, in the range of 0.5 to 1.5 ounces, in the range of 0.75 to 1.25 ounces, in the range of 0.8 to 1.2 ounces, in the range of 1 to 1.5 ounces, in the range of 1 to 1.25 ounces, or the ultra low quantity of HHO gas may be the quantity of the HHO gas formed by electrolysis of in the range of 0.9 to 1 ounces of an aqueous electrolyte solution per 15,000 miles of driving per liter displacement (of the total combustion chambers being treated with the HHO gas). In certain embodiments, for example, the ounces of aqueous electrolyte solution electrolyzed may be computed based on simulated driving data (for example simulated highway driving data). In certain embodiments, for example, the ounces of aqueous electrolyte solution electrolyzed may be computed based on driving under controlled test conditions. In certain embodiments, for example, the ounces of aqueous electrolyte solution electrolyzed may be computed based on monitored driving data. In certain embodiments, for example, the ounces of aqueous electrolyte solution electrolyzed may an average value determined from one or more of the foregoing types of driving data.

Certain embodiments may provide, for example, a method for increasing carbonaceous fuel economy of an internal combustion engine, comprising combusting (or configuring the internal combustion engine to combust) a quantity of carbonaceous fuel in the presence of less than 250 ppm HHO gas relative to the weight of the carbonaceous fuel combusted, for example less than 200 ppm, less than 150 ppm, less than 125 ppm, less than 100 ppm, less than 90 ppm, less than 80 ppm, less than 75 ppm, less than 70 ppm, less than 65 ppm, less than 60 ppm, less than 58 ppm, less than 57 ppm, less than 50 ppm, less than 40 ppm, less than 30 ppm, less than 25 ppm, less than 20 ppm, less than 15 ppm, less than 10 ppm, or combusting (or configuring the internal combustion engine to combust) a quantity of carbonaceous fuel in the presence of less than 6 ppm HHO gas relative to the weight of the carbonaceous fuel combusted. In certain embodiments, for example, the quantity of HHO gas may be in the range of 10-150 ppm relative to the weight of the carbonaceous fuel, for example in the range of 20-100 ppm, in the range of 25-75 ppm, in the range of 30-60 ppm, or the quantity of HHO gas may be in the range of 50-60 ppm relative to the weight of the carbonaceous fuel combusted.

Certain embodiments may provide, for example, a method for producing HHO gas for use by an internal combustion engine, the method comprising: forming HHO gas from an aqueous electrolyte solution in an electrolysis unit, passively transporting the formed HHO gas to a vapor space in an aqueous electrolyte solution replenishment reservoir contained in the electrolysis unit, and storing a supply of the HHO gas in the vapor space. In certain embodiments, for example, the pressure of the vapor space may be 80 psig or less, 60 psig or less, for example 55 psig or less, 50 psig or less, 48 psig or less, 45 psig or less, or the pressure may be 40 psig or less. In certain embodiments, for example, the pressure may be in the range of (for example may have a fixed value in the range or may fluctuate in the range of) 25-100 psig, for example, in the range of 40-80 psig, in the range of 40-60 psig, in the range of 45-55 psig, or the pressure may be in the range of 48-50 psig. In certain embodiments, for example, the vapor space may have a temperature of less than 180° F. and a pressure in the range of 40-80 psig, for example a temperature of less than 150° F. and a pressure in the range of 45-70 psig, a temperature of less than 125° F. and a pressure in the range of 45-55 psig, a temperature of less than 125° F. and a pressure in the range of 48-50 psig, a temperature of less than 125° F. and a pressure in the range of 45-55 psig or the vapor space may have a temperature of less than 100° F. and a pressure in the range of 45-55 psig or 48-50 psig.

In certain embodiments, for example, the aqueous electrolyte may be maintained and/or controlled at a temperature in the range of 90-120° F., for example at a temperature in the range of 95-120° F., at a temperature in the range of 100-115° F., or the aqueous electrolyte may be maintained and/or controlled at a temperature in the range of 100-110° F. In certain embodiments, for example, a power supply to the electrolysis unit may be adjusted (for example, interrupted or resumed) to control the temperature of the aqueous electrolyte at a temperature in the range of 90-120° F., for example at a temperature in the range of 95-120° F., at a temperature in the range of 100-115° F., or a power supply to the electrolysis unit may be adjusted (for example, interrupted or resumed) to control the temperature of the aqueous electrolyte at a temperature in the range of 100-110° F. In certain embodiments, for example, a power supply to the electrolysis unit may be adjusted (for example, interrupted or resumed) to control the temperature of the aqueous electrolyte at a temperature in the range of 100-110° F. and a pressure in the vapor space in in the range of 45-50 psig.

In certain embodiments, for example, the vapor space may store less than a 1 hour supply of the formed HHO gas for use by the internal combustion engine, for example less than a 45 minute supply, less than a 30 minute supply, less than a 20 minute supply, less than a 10 minute supply, less than a 5 minute supply, less than a 4 minute supply, less than a 3 minute supply, less than a 2 minute supply, less than a 1 minute supply, less than a 45 second supply, less than a 30 second supply, less than a 15 second supply, or the vapor space may store less than a 10 second supply of the formed HHO gas. In certain embodiments, for example, the vapor space may store at least a 1 second supply of the formed HHO gas for use by the internal combustion engine, for example at least a 5 second supply, at least a 5 second supply, at least a 10 second supply, at least a 30 second supply, at least a 1 minute supply, at least a 2 minute supply, at least a 3 minute supply, at least a 5 minute supply, at least a 7 minute supply, at least a 10 minute supply, at least a 20 minute supply, at least a 30 minute supply, or the vapor space may store at least a 1 hour supply of the formed HHO gas.

In certain embodiments, for example, the vapor space may store in the range of a 1 second-3 hour supply of the formed HHO gas for use by the internal combustion engine, for example in the range of a 1-5 second supply, in the range of a 5-10 second supply, in the range of a 10-30 second supply, in the range of a 30-60 second supply, in the range of a 1-2 minute supply, in the range of a 2-4 minute supply, in the range of a 4-5 minute supply, in the range of a 5-10 minute supply, in the range of a 10-20 minute supply, in the range of a 20-30 minute supply, in the range of a 30-45 minute supply, in the range of a 45-60 minute supply, or the vapor space may store in the range of a 1-3 hour supply of the formed HHO gas.

In certain embodiments, for example, the vapor space may store less than a 48,000 crankshaft revolutions supply of the formed HHO gas for use by the internal combustion engine, for example less than a 36,000 crankshaft revolutions supply, less than a 24,000 crankshaft revolutions supply, less than a 16,000 crankshaft revolutions supply, less than a 10 minute crankshaft revolutions supply, less than a 4,000 crankshaft revolutions supply, less than a 3,200 crankshaft revolutions supply, less than a 2,400 crankshaft revolutions supply, less than a 1,600 crankshaft revolutions supply, less than a 800 crankshaft revolutions supply, less than a 700 crankshaft revolutions supply, less than a 400 crankshaft revolutions supply, less than a 200 crankshaft revolutions supply, or the vapor space may store less than a 134 crankshaft revolutions supply of the formed HHO gas. In certain embodiments, for example, the vapor space may store at least a 13 crankshaft revolutions supply of the formed HHO gas for use by the internal combustion engine, for example at least a 66 crankshaft revolutions supply, at least a 133 crankshaft revolutions supply, at least a 400 crankshaft revolutions supply, at least a 800 crankshaft revolutions supply, at least a 1,600 crankshaft revolutions supply, at least a 2,400 crankshaft revolutions supply, at least a 4,000 crankshaft revolutions supply, at least a 5,600 crankshaft revolutions supply, at least a 8,000 crankshaft revolutions supply, at least a 16,000 crankshaft revolutions supply, at least a 24,000 crankshaft revolutions supply, or the vapor space may store at least a 48,000 crankshaft revolutions supply of the formed HHO gas. In certain embodiments, for example, the vapor space may store in the range of a 13-144,000 crankshaft revolutions supply of the formed HHO gas for use by the internal combustion engine, for example in the range of a 13-67 crankshaft revolutions supply, in the range of a 66-133 crankshaft revolutions supply, in the range of a 133-400 crankshaft revolutions supply, in the range of a 400-800 crankshaft revolutions supply, in the range of a 800-1,600 crankshaft revolutions supply, in the range of a 1,600-3,200 crankshaft revolutions supply, in the range of a 3,200-4,000 crankshaft revolutions supply, in the range of a 4,000-8,000 crankshaft revolutions supply, in the range of a 8,000-16,000 crankshaft revolutions supply, in the range of a 16,000-24,000 crankshaft revolutions supply, in the range of a 24,000-36,000 crankshaft revolutions supply, in the range of a 36,000-48,000 crankshaft revolutions supply, or the vapor space may store in the range of a 48,000-144,000 crankshaft revolutions supply of the formed HHO gas.

In certain embodiments, for example, the vapor space may comprise less than 40% of the volume of the aqueous electrolyte solution replacement reservoir, for example less than 35%, less than 30%, less than 25%, less than 20%, less than 15%, less than 10%, less than 5%, or the vapor space may comprise less than 2% of the volume of the aqueous electrolyte solution replacement reservoir. In certain embodiments, for example, the vapor space may comprise at least 2% of the volume of the aqueous electrolyte solution replacement reservoir, for example at least 5%, at least 10%, at least 15%, at least 20%, at least 25%, at least 30%, at least 35%, or the vapor space may comprise at least 40% of the volume of the aqueous electrolyte solution replacement reservoir. In certain embodiments, for example, the vapor space may comprise in the range of 2-40% of the volume of the aqueous electrolyte solution replacement reservoir, for example in the range of 2-10%, in the range of 10-30%, in the range of 10-20%, in the range of 20-25%, in the range of 25-30%, in the range of 30-35%, in the range of 35.40%, or the vapor space may comprise in the range of 2-15% of the volume of the aqueous electrolyte solution replacement reservoir.

Certain embodiments may provide, for example, an electrolysis cell comprising: a pressure-resistant container comprising a first defined space for holding an aqueous electrolyte solution, a plurality of electrolysis plates (also referred to as electrode plates) retained within the first defined space, and a second defined space for holding a gas. In certain embodiments, for example, the volume of the second defined space may be equal to or greater than (for example the same as) the volume of the first defined space. In certain embodiments, for example, the volume of the second defined space may be equal to or slightly less (for example, at least 35%) of the volume of the first defined space. In certain embodiments, for example steady state applications, the volume of the second defined space may be a fraction (for example, less than 15%) of the volume of the first defined space. In certain embodiments, one or more than one (including for instance all) of the following embodiments may comprise each of the other embodiments or parts thereof. In certain embodiments, for example, the pressure-resistant container may be capable of maintaining a pressure in excess of 100 psi (for example in excess of 150 psi or in excess of 200 psi). In certain embodiments, for example, the electrolysis cell may further comprise a pressure relief valve configured to open when a pressure of gas inside the container exceeds 80 psi (for example when the pressure of the gas exceeds 125 psi or in excess of 150 psi).

In certain embodiments, for example, the pressure-resistant container may further comprise a positive terminal, a negative terminal, a gas outlet, an electrolyte solution fill port and/or a drain port and optionally sensor, switch and/or safety device ports. In certain embodiments, for example, the positive terminal may be connected to at least one of the plurality of electrolysis plates, and the negative terminal may be connected to at least another one (or at least one plate different than any of the at least one plates that the positive terminal is connected to) of the plurality of electrolysis plates. In certain embodiments, for example, the positive terminal may provide an electrical connection to one of the plurality of plates from a connection point outside the container. In certain embodiments, for example, the negative terminal may provide a electrical connection to one of the plurality of plates from a connection point outside the container. In certain embodiments, for example, the positive terminal and the negative terminal may be in electrical and/or electrochemical communication predominately (for example, greater than 85%, greater than 90%, greater than 95%, or greater than 98% of the current flowing between the terminals) flows through the plurality of plates. In certain embodiments, for example, the plurality of plates may be configured as a stack of approximately parallel plates in fixed relation comprising two end plates and remaining plates spaced an approximately equal distance between adjacent plates. In certain further embodiments, for example, the positive terminal may be attached to one of the end plates and the negative terminal may be attached to the other of the end plates. In certain further embodiments, for example, the positive terminal may be attached to at least one interior plate and the negative terminal may be attached to at least one or two exterior plates, and vice versa. In certain further embodiments, for example, the positive terminal may be attached to several plates, for example every other plate, and the negative terminal may be attached to several other plates, for example every other of the other plates, in an alternating fashion (for example, +/−/+/−/+/− fashion). In certain embodiments, for example, the plurality of electrolysis plates may be fully immersed (or at least 50% immersed) in the electrolyte solution. In certain embodiments, for example, the plurality of plates may be at least partially insulated to reduce (for example by at least 50% or at least 95%) or prevent direct electrochemical communication expressed as Watts of energy transferred between non-adjacent plates without first undergoing electrochemical communication with at least one adjacent plate.

In certain embodiments, for example, the pressure-resistant container may contain sufficient aqueous electrolyte solution to provide an internal combustion engine with sufficient HHO gas for at least 500 hours of operation, for example at least 680 hours, at least at least 1300 hours, at least 2000 hours, at least 2500 hours, or the pressure-resistant container may contain sufficient aqueous electrolyte solution to provide an internal combustion engine with sufficient HHO gas for at least 5000 hours.

In certain embodiments, for example, the electrolysis cell may be installed onboard an automotive vehicle. In certain further embodiments, for example, the pressure-resistant container may contain sufficient aqueous electrolyte solution to provide an internal combustion engine with sufficient HHO gas for at least 10,000 miles of operation of the automotive vehicle, for example at least 25,000 miles, at least 50,000 miles, at least 100,000 miles, at least 250,000 miles, at least 500,000 files, at least 750,000 miles, or the pressure-resistant container may contain sufficient aqueous electrolyte solution to provide an internal combustion engine with sufficient HHO gas for at least 1,000,000 miles.

In certain embodiments, for example, the electrolysis plates may comprise between 5 and 15 plates (for example 7-12 plates). In certain embodiments, for example, the plurality of electrolysis plates may have a thickness of 0.5-4 mm, for example 1-2 mm. In certain embodiments, for example, the plurality of electrolysis plates may be separated by a distance in the range of 0.5-8 mm from one another (for example 0.5-1.5 mm of separation). In certain embodiments, for example, at least two of the plurality of electrolysis plates may comprise a point for attaching to at least one electrode. In certain embodiments, for example, the electrolysis cell may further comprise a slot for securing at least one of the plurality of electrodes. In certain embodiments, for example, at least a portion of at least one surface of at least one of the plurality of electrolysis plates may comprise (for example be coated with) a high conductivity material, for example platinum or a platinum-containing alloy. In certain embodiments, for example, at least a portion of at least one surface of at least one of the plurality of electrolysis plates may be coated with titanium or a titanium-containing alloy. In certain embodiments, for example, at least a portion of at least one surface of at least one of the plurality of electrolysis plates may be coated with iridium or an iridium-containing alloy. In certain embodiments, for example, at least one of the plurality of electrolysis plates (for example inclusive of all of the electrolysis plates) may comprise at least one hole. In certain embodiments, for example, the plurality of electrolysis plates may be arranged such that the holes of each pair of adjacent plates are not aligned. In certain embodiments, for example, the plurality of electrolysis plates may be arranged such that the holes of each pair of adjacent plates may be located in opposite corners. In certain embodiments, for example, the electrolysis cell may further comprise an electrical isolator between each pair of adjacent plates of the plurality of electrolysis plates.

In certain embodiments, for example, the plurality of electrolysis plates may be electrically insulated from the pressure-resistant container. In certain embodiments, for example, the interior of the pressure-resistant container may comprise an electric insulator (for example, and electrically insulating coating). In certain embodiments, for example, an inner lining of the pressure-resistant container may comprise an electric insulator.

In certain embodiments, for example, the second defined space may have a volume of at least one quart (for example at least 1 gallon). In certain embodiments, for example, the second defined space may have a volume of no more than 10 gallons (for example no more than 5 gallons). In certain embodiments, for example, the second defined space may be in direct fluid communication with the pressure relief valve.

In certain embodiments, for example, the electrolysis cell may further comprise a heat exchanger in communication with, integral to, or connected to the gas outlet. In certain embodiments, for example, the pressure-resistant container may further comprise a housing. In certain embodiments, for example, the pressure-resistant container may further comprise a seal capable of preventing leakage of the electrolyte solution and the gas from the container.

In certain embodiments, for example, the first defined space may be configured to hold a volume of electrolyte solution to supply a sufficient amount of HHO gas for at least 1 month (for example at least 2 months) of operation of the host engine (i.e., the engine or engines it is supplying second fuel to). In certain embodiments, for example, the first defined space may be configured to hold a volume of electrolyte solution to supply HHO gas to a truck for at least 30,000 miles of driving or 60,000,000 crankshaft rotations. In certain embodiments, for example, the first defined space may be configured to hold at least 1-quart, ½-gallon, or 1-gallon of electrolyte solution. In certain embodiments, for example, the electrolyte solution may comprise an aqueous electrolyte solution with a concentration of electrolyte of less than 2 percent by volume.

Certain embodiments may provide, for example, an apparatus for providing HHO gas for an internal combustion engine, comprising: an electrolysis cell for generating the HHO gas, and a plurality of HHO gas control valves (for example a plurality of injectors) configured to deliver the HHO gas to a plurality of intake ports of the internal combustion engine. In certain embodiments, one or more than one (including for instance all) of the following embodiments may comprise each of the other embodiments or parts thereof. In certain embodiments, for example, the plurality of injectors may comprise a number of injectors at least equal to a number of a plurality of engine cylinders. In certain embodiments, for example, the plurality of injectors may be designed to deliver the HHO gas within an intake manifold of the engine (i.e. the HHO gas is not mixed or does not come into contact with intake air until it is released from the tube (or lance) connected to the respective injector). In certain embodiments, for example, the plurality of injectors may deliver HHO gas within 3 inches (for example within 0.5 inches) from each intake port (or orifice of the intake valve) of a plurality of cylinders. In certain embodiments, for example, the plurality of injectors may be positioned, configured, equipped, and/or designed to directly inject into the combustion chamber (in a fashion similar or the same as the primary fuel is injected into the combustion chamber in some applications). In certain embodiments, for example, at least one of the plurality of injectors may be positioned adjacent to at least one of the plurality of engine cylinders, at least a second injector of the plurality of injectors may be positioned adjacent to at least a second cylinder of the plurality of engine cylinders, and at least a third injector of the plurality of injectors may be positioned adjacent to at least a third cylinder of the plurality of engine cylinders In certain embodiments, for example, each of the plurality of injectors may be equipped with a lance that extends from the outlet end of the respective injector to a position proximate an intake port of a cylinder. The lances serve to deliver the HHO gas deep into the intake port near (for example, within 3 inches, or within 2 inches or between 0.5 to 2 inches or less than 1 inch from) an orifice of the intake valve. In certain embodiments, for example, the lance may deliver air-free HHO gas into the intake port. In certain further embodiments, for example, the HHO gas present in the lance may be air-free (or at least substantially air-free). In certain embodiments, for example, air-free (or substantially air-free) HHO gas provided by an injector may mix with air inside a portion of the lance.

Certain embodiments may provide, for example, a method to increasing carbonaceous fuel economy of an internal combustion engine, comprising: introducing a quantity of HHO gas into an intake port of a combustion chamber of the internal combustion engine at an angle in the range of −75 to 75° relative to a centerline of the combustion chamber, for example in the range of −5 to 5°, 5 to 10°, in the range of 10 to 20°, in the range of 20 to 30°, in the range of 30 to 40°, in the range of 40 to 50°, in the range of 50 to 60°, in the range of 60 to 75°, in the range of 20 to 60°, in the range of 25 to 50°, in the range of 30 to 45°, in the range of 35 to 6°°, −5 to −10°, in the range of −10 to −20°, in the range of −20 to −30°, in the range of −30 to −40°, in the range of −40 to −50°, in the range of −50 to −60°, in the range of −60 to −75°, in the range of −20 to −60°, in the range of −25 to −50°, in the range of −30 to −45°, in the range of −35 to −60°, in the range of −35 to −55°, or introducing a quantity of HHO gas into an intake port of a combustion chamber of the internal combustion engine at an angle in the range of 35 to 55° relative to a centerline of the combustion chamber. In certain embodiments, for example, the method may further comprise: introducing a quantity of HHO gas into an intake port of a combustion chamber of the internal combustion engine at an angle in the range of −75 to 75° relative to a centerline of the intake port, for example in the range of −5 to 5°, 5 to 10°, in the range of 10 to 20°, in the range of 20 to 30°, in the range of 30 to 40°, in the range of 40 to 50°, in the range of 50 to 60°, in the range of 60 to 75°, in the range of 20 to 60°, in the range of 25 to 50°, in the range of 30 to 45°, in the range of 35 to 60°, −5 to −10°, in the range of −10 to −20°, in the range of −20 to −30°, in the range of −30 to −40°, in the range of −40 to −50°, in the range of −50 to −60°, in the range of −60 to −75°, in the range of −20 to −60°, in the range of −25 to −50°, in the range of −30 to −45°, in the range of −35 to −60°, in the range of −35 to −55°, or introducing a quantity of HHO gas into an intake port of a combustion chamber of the internal combustion engine at an angle in the range of 35 to 55° relative to a centerline of the intake port. In certain embodiments, for example, one or more of the lances may be configured to provide the foregoing angle of introduction.

Certain embodiments may provide, for example, a method for increasing carbonaceous fuel economy of an internal combustion engine, comprising: delivering a quantity of HHO gas in a stream of oxygen-containing gas to a combustion cylinder of the internal combustion engine at an angle in the range of 5 to 35° from top-dead-center, for example at an angle in the range of 5 to 8°, in the range of 8 to 10°, in the range of 10 to 12°, in the range of 12 to 14°, in the range of 14-20°, in the range of 20-30°, or delivering a quantity of HHO gas in a stream of oxygen-containing gas to a combustion cylinder of the internal combustion engine at an angle in the range of 30 to 35°.

In certain embodiments, for example, the engine may have for example from 6 to 20 cylinders and the HHO gas distribution system may have a corresponding number of injectors to service each of the cylinders (for example, an 8 cylinder engine may be fitted with 8 HHO gas injectors (one positioned to feed HHO gas into the respective intake port for each cylinder) or 16 HHO gas injectors (two positioned to feed HHO gas into the respective intake port for each injector).

Certain embodiments may provide, for example, a method for increasing carbonaceous fuel economy of an internal combustion engine, comprising: delivering a quantity of HHO gas in a stream of oxygen-containing gas to a combustion cylinder of the internal combustion engine at an angle in the range of 90 to 180° from top-dead-center, for example at an angle in the range of 120 to 180°, in the range of 150 to 180°, in the range of 150 to 178°, in the range of 160 to 178°, in the range of 100-160°, in the range of 170-180°, or delivering a quantity of HHO gas in a stream of oxygen-containing gas to a combustion cylinder of the internal combustion engine at an angle in the range of 175 to 180° from top-dead-center.

In certain embodiments, for example, the engine may have for example from 6 to 20 cylinders and the HHO gas distribution system may have a corresponding number of injectors to service each of the cylinders (for example, an 8 cylinder engine may be fitted with 8 HHO gas injectors (one positioned to feed HHO gas into the respective intake port for each cylinder) or 16 HHO gas injectors (two positioned to feed HHO gas into the respective intake port for each injector).

Certain embodiments may provide, for example, a method for increasing carbonaceous fuel economy of an internal combustion engine, comprising: delivering a quantity of HHO gas in a stream of oxygen-containing gas to a combustion cylinder of the internal combustion engine at an angle of at least 90° from top-dead-center, for example at an angle of at least 125°, at least 150°, or delivering a quantity of HHO gas in a stream of oxygen-containing gas to a combustion cylinder of the internal combustion engine at an angle of at least 170°.

In certain embodiments, for example, the engine may have for example from 6 to 20 cylinders and the HHO gas distribution system may have a corresponding number of injectors to service each of the cylinders (for example, an 8 cylinder engine may be fitted with 8 HHO gas injectors (one positioned to feed HHO gas into the respective intake port for each cylinder) or 16 HHO gas injectors (two positioned to feed HHO gas into the respective intake port for each injector).

Certain embodiments may provide, for example, an apparatus for providing HHO gas for an internal combustion engine, comprising: an electrolysis cell for generating the HHO gas, and a flow regulator configured to start and stop a flow of the HHO gas from the electrolysis cell to a plurality of injectors of the internal combustion engine. In certain embodiments, one or more than one (including for instance all) of the following embodiments may comprise each of the other embodiments or parts thereof. In certain embodiments, for example, the apparatus may further comprise a gas pressure regulator. In certain embodiments, for example, the gas pressure regulator may control the gas pressure at an outlet port. In certain embodiments, for example, the apparatus may further comprise a heat exchanger. In certain embodiments, for example, the heat exchanger may provide at least two separate fluid paths, wherein the at least two separate fluid paths may be in thermal communication. In certain further embodiments, for example, at least one of the at least two separate fluid paths may be configured to receive an engine coolant. In certain embodiments, for example, at least one of the at least two separate fluid paths may be configured to receive at least a portion of the gas generated from the electrolysis cell. In certain embodiments, for example, the heat exchanger may control the outlet temperature of gas exiting an outlet port. In certain embodiments, for example, the gas pressure regulator may be equipped with a heat exchanger (for example the foregoing heat exchanger). In certain further embodiments, for example, the gas pressure regulator may control the outlet pressure and outlet temperature of gas exiting an outlet port of the gas pressure regulator. In certain further embodiments, for example, the gas exiting the gas pressure regulator may be controlled to have a temperature greater than 35° C. (for example greater than 45° C.). In certain embodiments, for example, the HHO gas passing through the regulator may be cooled and/or heated by exchanging heat through the heat exchanger with engine coolant and therefore have a regulator exit temperature with plus or minus 10 degrees, for example ±5° C., of the engine coolant temperature. In certain embodiments, for example, use of the engine coolant to control the temperature of the HHO gas and/or use of the pressure regulator to control the pressure of the HHO gas may allow pre-determined amounts of the HHO gas to be introduced to at least one combustion chamber of a plurality of combustion chambers of the internal combustion engine. In certain embodiments, for example, the aforesaid temperature and pressure control may provide more precise control over the amount of HHO gas introduced into the internal combustion engine in comparison to a system lacking said controls (for example a traditional system for introducing electrolysis gases into an internal combustion engine).

In certain embodiments, for example, the gas pressure regulator pressure may be at least partially controlled relative to an intake manifold pressure (for example, 5-25 psi, or 10-15 psi higher than the air pressure in the intake manifold, downstream of a turbocharger) of the internal combustion engine. In certain embodiments, for example, the gas pressure regulator may be at least partially controlled by pressure communicated from an intake manifold pressure of the internal combustion engine. In certain embodiments, for example, the gas pressure regulator may be characterized by an opening pressure. In certain further embodiments, for example, the opening pressure may be configured based on the intake manifold pressure of the internal combustion engine. In certain embodiments, for example, the gas pressure regulator pressure may be at least partially controlled relative to an intake manifold pressure (for example, 5-25 psi, or 5-15 psi, or 5-8 psi, or 10-15 psi higher than the air pressure in the intake manifold, downstream of a turbocharger). In certain further embodiments, for example, the intake manifold pressure may vary based on and/or during the operation of the internal combustion engine.

Certain embodiments may provide, for example, an apparatus for providing HHO gas for an internal combustion engine, comprising: an electrolysis cell for generating the HHO gas, and a gas distribution harness comprising a plurality of tubes (or lances) configured to deliver the HHO gas to a plurality of intake ports of the internal combustion engine, for example a multi-point injection system. In certain embodiments, one or more than one (including for instance all) of the following embodiments may comprise each of the other embodiments or parts thereof. In certain embodiments, for example, the number of the plurality of lances may be equal to a number of a plurality of injectors or at least one injector, including all the injectors, may be fitted with multiple lances, for example, two or more lances configured to provide two or more points or injection for a single cylinder and/or provide multi-points of injection for multiple cylinders (for example, four injectors could each be fitted with, for example, two lances each and the first injector could serve to inject HHO gas within the intake port of the first and fourth cylinders of the host engine and, similarly, the second and third injectors could serve to inject HHO gas within the intake ports of the second and fifth cylinders, and the third and sixth cylinders, respectively. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 inches (for example between 0.5 and 1.5 inches) of an air flow port of at least one cylinder of a plurality of cylinders of the internal combustion engine, the at least a second outlet may be positioned within 3 inches (for example between 0.5 and 1.5 inches) of an air flow port of at least a second cylinder of the plurality of cylinders, and at least a third outlet may be positioned within 3 inches (for example between 0.5 and 1.5 inches) of an air flow port of at least a third cylinder of the plurality of cylinders. In certain embodiments, for example, the at least one outlet may be positioned within 1 inch (for example within 0.25 inches) of an engine valve seat of a plurality of engine valve seats of the internal combustion engine, the at least a second outlet may be positioned within 1 inch (for example within 0.25 inches) of a second engine valve seat of the plurality of engine valve seats, and the at least a third outlet may be positioned within 1 inch (for example within 0.25 inches) of a third engine valve seat of the plurality of engine valve seats. In certain embodiments, for example, the at least one outlet may be positioned within 3 inches (for example between 0.5 and 1.5 inches) of an orifice of an air intake valve of at least one cylinder of the plurality of cylinders, the at least a second outlet may be positioned within 3 inches (for example between 0.5 and 1.5 inches) of an orifice of an air intake valve of at least a second cylinder of the plurality of cylinders, and the at least a third outlet may be positioned within 3 inches (for example between 0.5 and 1.5 inches) of an orifice of an air intake valve of at least a third cylinder of a plurality of cylinders.

Certain embodiments may provide, for example, a second fuel (for example an HHO gas) system for an internal combustion engine, comprising: a pressure-resistant container, a multi-point gas distribution system comprising a plurality of control valves to distribute separate portions of the second fuel to multiple locations about the internal combustion engine, and a multi-point gas distribution control system that controls the plurality of control valves to control the amount and timing of the delivery of the second fuel to the multiple locations about the internal combustion engine. In certain further embodiments, for example, the pressure resistant container may comprise an electrolysis cell configured to generate a second fuel from an electrolyte solution, and a storage volume to hold a volume of the second fuel at a pressure greater than 40 psia. In certain further embodiments, for example, the at least one of the multiple locations may comprise at least one air intake orifice. In certain further embodiments, for example, the multi-point gas distribution control system may be configured to deliver at least a portion of the second fuel in a timed sequence based on an intake stroke timing of the at least one air intake orifice. In certain further embodiments, for example, at least a second one of the at least one of the multiple locations may comprise at least one air intake orifice. In certain further embodiments, for example, the multi-point gas distribution control system may be further configured to deliver at least a second portion of the second fuel in a timed sequence based on an intake stroke timing of the at least one air intake orifice of the at least second one of the at least one of the multiple locations. In certain alternative embodiments, for example, the timed sequences may be batched (i.e., the second fuel may be delivered to groups of air intake orifices without regard to the timing of the air intake stroke of any one particular air intake orifice). In certain alternative embodiments, for example, the timing may be simultaneous (i.e., the second fuel may be delivered to all air intake orifices simultaneously). In certain embodiments, for example, the multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 100 hp average output of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 200 hp average output of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 400 hp average output of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 800 hp average output of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 1400 hp average output of the host engine. In certain embodiments, for example, multi-point gas distribution system may be configured to provide an average of less than 15 liters, for example less than 10 liters, for example between 0.1 and 5 liters, or for example between 0.1 and 2 liters (as measured at for example control temperature and pressure or standard temperature and pressure) of the second fuel per 120,000 crankshaft revolutions of the host engine per 2000 hp average output of the host engine.

In certain embodiments, for example, the method may comprise introducing in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine (for example in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) second fuel (for example HHO gas) per hour per liter of displacement of the internal combustion engine per 100 hp average output of the internal combustion engine, in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine per 200 hp average output of the internal combustion engine, in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine per 400 hp average output of the internal combustion engine, in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine per 800 hp average output of the internal combustion engine, in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine per 1400 hp average output of the internal combustion engine, or in the range of 1.25-30 liters (for example in the range of 1.5-10 liters, in the range of 1.5-6 liters, in the range of 2-5 liters, in the range of 2-3 liters, in the range of 3-4 liters, or in the range of 4-5 liters) of second fuel (for example HHO gas) per hour per liter of displacement of the internal combustion engine per 2000 hp average output of the internal combustion engine Certain embodiments may provide, for example, a dual-chamber vessel for use of an internal combustion engine, comprising: a first chamber of the dual-chamber vessel configured for electrolyzing an aqueous electrolyte solution, a port providing liquid communication between the first chamber and a second chamber of the dual-chamber vessel, the port comprising a liquid sealing member, the liquid sealing member effective to maintain a liquid seal of the first chamber under any orientation of the dual chamber vessel. In certain embodiments, for example, the liquid sealing member may comprise a flop tube. In certain embodiments, for example, the liquid sealing member may be a rigid nozzle having an outlet disposed in the second chamber. In certain embodiments, for example, the rigid nozzle may have an outlet in the second chamber, the outlet having a diameter D, and the outlet of the nozzle may be positioned in aqueous electrolyte solution at a depth of at least one diameter D from a top surface of the solution. In certain further embodiments, for example, the volume of the aqueous electrolyte solution is greater than half of the volume of the second chamber and the nozzle extends at least half the length of the chamber, allowing the outlet of the nozzle to maintain a liquid seal under any orientation of the second chamber.

Certain embodiments may provide, for example, a gas back-flow prevention element or system to prevent the HHO gas collected in the upper chamber of the dual-chamber vessel from passing to the lower chamber where the HHO generator cell is positioned. In certain embodiments, for example, the dual-chamber design may be equipped with a standpipe in the upper chamber to allow HHO gas generated in the lower chamber to travel into the upper chamber but prevent the HHO gas from back-flowing into the lower chamber. The distal end of the standpipe may have an opening for allowing the HHO gas received in the open end connected to the divider, and in communication with the lower chamber, between the upper and lower chambers to transfer into the upper chamber. The opening in the distal end will be positioned proximate the center point of the upper chamber, for example, the stand pipe may be positioned in the center of the divider and extend perpendicularly into the upper chamber (for example, vertically up into the upper chamber) and terminate at the midpoint, for example the geometric center, between the upper and lower surfaces defining the upper chamber. In operation, the electrolyte level in the upper chamber may be maintained above the opening in the distal end of the stand pipe, for example it may be maintained at a minimum height equal to the opening in the distal end plus the diameter of the opening in the distal end (by way of example, if the upper chamber is 7 inches tall and it is equipped with a 0.5 inch diameter stand pipe positioned in the geometric center of the divider plate and extending vertically upwardly to the geometric center of the upper chamber, i.e., 3.5 inches upwardly, the electrolyte level will be maintained at a height within the upper chamber of at least 4 inches (3.5 inches plus 0.5 inches). This should assure that the electrolyte covers or seals the opening in the distal end of the standpipe regardless of the orientation of the dual-chamber vessel and therefore prevent back flow of HHO gas from the upper chamber into the lower chamber, where the HHO generator cell is positioned.

Certain embodiments may provide, for example, a retrofitted internal combustion engine configured to use a second fuel (for example an HHO gas) according to the second fuel system. In certain embodiments, for example, the retrofitted internal combustion engine may power a vehicle.

Certain embodiments may provide, for example, a system for on-demand delivery of HHO gas for an internal combustion engine, comprising: an electrolysis cell for generating the HHO gas, a controller for determining an amount of the HHO gas sufficient to reduce engine-out emissions to a pre-determined level, and an HHO injection apparatus, in communication with the controller, for delivering the HHO gas to at least one intake valve of the internal combustion engine. In certain embodiments, one or more than one (including for instance all) of the following embodiments may comprise each of the other embodiments or parts thereof. In certain embodiments, for example, the system may further comprise a regulator for regulating a temperature and a pressure of the HHO gas to be injected in the engine. In certain embodiments, for example, the system may further comprise a knock sensor configured to detecting engine knock and to send a signal to the controller to adjust the HHO injection when engine knock is detected. In certain embodiments, for example, the controller may at least partially control the generation of the HHO gas. In certain embodiments, for example, the system may further comprise an exhaust temperature sensor connected to the controller. In certain embodiments, for example, the controller may adjust the HHO injection when the temperature of engine exhaust exceeds a pre-determined temperature level. In certain embodiments, for example, the HHO gas may be distributed individually to each intake valve of each cylinder via a multi-point HHO gas injection (also called port gas injection or MPI). In certain embodiments, for example, the multi-point injection may inject gas into the intake ports just upstream of each cylinder's intake valve, rather than at a central point within an intake manifold. In certain embodiments, for example, multi-point injection may be sequential, wherein injection of the HHO gas may be timed to coincide with each cylinder's intake stroke; batched, wherein HHO gas may be injected to the cylinders in groups, without precise synchronization to any particular cylinder's intake stroke; or simultaneous, wherein HHO gas may be injected at the same time to all the cylinders. In certain embodiments, for example, the multi-point injection may deliver the HHO gas directly into the cylinder, i.e., direct injection.

In certain embodiments, for example, the HHO gas may be delivered to the engine at a pressure in the range of 100-500 kPa (for example in the range of 100-400 kPa, or in the range of 40-60 psig or 45-55 psig). In certain embodiments, for example, the HHO gas may be delivered to the engine at temperature in the range of 35-120° C. (for example at a temperature in the range of 35-75° C.). In certain embodiments, for example, the HHO gas may be delivered to the intake port of at least one cylinder of the engine at a temperature in the range of 100-130° F. In certain embodiments, for example, the HHO gas may be delivered to the intake port of at least one cylinder of the engine at a pressure in the range of 100-500 kPa. In certain embodiments, for example, the controller may further control the volume of HHO gas injected based, at least in part on the engine demand, load, fuel consumption, and/or airflow. In certain embodiments, for example, a timing and duration of at least one HHO gas injector may be controlled at least in part based on the engine demand.

In certain embodiments, for example, the system may further comprise an HHO temperature sensor connected to the controller. In certain further embodiments, for example, the controller may adjust the HHO injection when the temperature of the HHO gas is outside a pre-determined temperature range. In certain embodiments, for example, the system may further comprise an HHO pressure sensor connected to the controller. In certain embodiments, for example, the controller may adjust the HHO injection when the pressure of the HHO gas exceeds a pre-determined pressure level. In certain embodiments, for example, the controller may comprise an anti-surge protector. In certain embodiments, for example, the controller may comprise a processor configured to calculate an amount of the HHO gas sufficient to reduce engine-out emissions to a pre-determined level based on engine operating parameters. In certain embodiments, for example, the controller may comprise a seal to prevent water intrusion.

In certain embodiments, for example, the electrolysis cell may include any of the electrolysis cell embodiments disclosed herein. In certain embodiments, for example, the electrolysis cell may comprise a pressure-resistant container comprising a first defined space for holding an electrolyte solution, a plurality of electrolysis plates retained within the first defined space, and a second defined space for holding a gas, wherein a volume of the second defined space may be greater than the volume of the first defined space. In certain embodiments, for example, the pressure-resistant container may further comprise a positive terminal, a negative terminal, a gas outlet, an electrolyte solution fill port and/or a drain port. In certain embodiments, for example, the electrolysis cell may further comprise a heat exchanger in communication with, integral to, or connected to the gas outlet.

Certain embodiments may provide, for example, a system for onboard, on-demand delivery of an HHO gas for an internal combustion engine (for example for a vehicle), comprising: an electrolysis cell configured to produce a required amount of HHO gas; and an HHO gas delivery system configured to deliver the HHO gas to the internal combustion engine. In certain embodiments, for example, delivery of the required amount of HHO gas may comprise delivering a portion of the required amount of HHO gas from the electrolysis cell to a position proximate an orifice (for example within 3 inches of the at least one orifice) of a combustion chamber intake valve, wherein said portion of the HHO gas does not contact combustion intake air until said portion reaches said position. In certain embodiments, for example, the HHO gas delivery system may deliver the portion of the HHO gas without causing any noticeable change in its chemical and/or performance properties to said position about the combustion chamber intake valve. In certain embodiments, for example, the internal combustion engine may provide power to a vehicle and the required amount of HHO gas may be generated by electrolyzing in the range of 4-16 ounces of water per 10,000 miles traveled by the host vehicle or in the range of 4-16 ounces of water per 20,000,000 crankshaft revolutions of the host engine. In certain embodiments, for example, the internal combustion engine may provide power to a vehicle and the required amount of HHO gas may be in the range of 300-1000 liters per 10,000 miles or per 20,000,000 crankshaft revolutions, based on a gas measured at a temperature of 25° C. and pressure of 1 atmosphere. In certain embodiments, for example, the HHO gas required may be in catalytic quantities.

In certain embodiments, for example, the required amount of HHO gas may be, on average, in the range of 1-10 liters per hour or per 120,000 crankshaft rotations, based on a gas temperature of 25° C. and pressure of 1 atmosphere. In certain embodiments, for example, the required amount of HHO gas may be in the range of, on average, 1-10 liters per hour or per 120,000 crankshaft rotations, based on a gas temperature of within 20° C. of the temperature of engine coolant and a pressure of in the range of 40-50 psia. In certain embodiments, for example, the internal combustion engine may be a 15-liter diesel engine for a freight vehicle. In certain further embodiments, for example, the required amount of HHO gas may be in the range of, on average, 5-30 liters per hour or per 120,000 crankshaft rotations, based on a gas temperature of within 20° C. of the temperature of engine coolant and a pressure of in the range of 40-50 psia. In certain embodiments, for example, a doubling of the engine volume (for example from a 3-liter engine to a 6-liter engine) may increase the required amount of HHO gas by in the range of 5-15% (for example by approximately 10%). In certain embodiments, for example, the system may further comprise an HHO gas storage system configured to store an excess amount of HHO gas for at least 1 week (for example at least 1 months). In certain embodiments, for example, the required amount of HHO gas may be at least 1 liter of HHO (for example at least 1.5 liters) gas per each liter of engine displacement for every 120,000 crankshaft revolutions of the engine at a pressure of at least 100 kPa relative to the air intake pressure of a combustion chamber of the engine. In certain embodiments, for example, the electrolysis cell may be configured to store a volume of HHO gas sufficient to deliver the required amount of HHO gas for at least 120,000 crankshaft revolutions of the engine. In certain embodiments, for example, the electrolysis cell may be configured to generate the required amount of HHO gas for extended operation of the internal combustion engine, wherein the temperature of the electrolysis cell does not exceed 80° C. (for example, does not exceed 65° C.). In certain embodiments, for example, the electrolysis cell may be powered by an 11-14 VDC power source. In certain further embodiments, for example, the electrolysis cell may comprise an electrolyte solution, wherein the concentration of one or more electrolytes present in the electrolyte solution may be selected, maintained, and/or adjusted to provide a current draw of less than 20 amps (for example less than 10 amps) at the operating voltage and temperature of the electrolysis cell. In certain embodiments, for example, the average (or maximum) current draw may be less than 20 amps, for example less than 15 amps, less than 12 amps, less than 10 amps, less than 5 amps, or the current draw may be less than 2 amps. In certain embodiments, for example, the current draw may be in the range of 5 to 20 amps, for example in the range of 7 to 15 amps, in the range of 8 to 12 amps, or the average (or maximum) current draw may be in the range of 9 to 11 amps. In certain embodiments, for example, the average (or maximum) current applied per square centimeter of electrolysis plate area of the electrolysis plates in the electrolysis cell (i.e., the current density) may be less than 500 mA/cm$^2$, less than 250 mA/cm$^2$, less than 100 mA/cm$^2$, less than 80 mA/cm$^2$, less than 75 mA/cm$^2$, less than 60 mA/cm$^2$, less than 50 mA/cm$^2$, less than 40 mA/cm$^2$, less than 30 mA/cm$^2$, less than 20 mA/cm$^2$, or the current applied per square centimeter of electrolysis plate area of the electrolysis plates in the electrolysis cell may be less than 10 mA/cm$^2$.

In certain embodiments, for example, the current applied per square centimeter of electrolysis plate area of the electrolysis plates in the electrolysis cell (i.e., the current density) may be in the range of 10 to 500 mA/cm$^2$, in the range of 100 to 250 mA/cm$^2$, for example in the range of 25 to 150 mA/cm$^2$, in the range of 25 to 100 mA/cm$^2$, in the range of 25 to 75 mA/cm$^2$, in the range of 40 to 60 mA/cm$^2$, or the current applied per square centimeter of electrolysis plate area of the electrolysis plates in the electrolysis cell may be in the range of 50 to 75 mA/cm$^2$.

In certain embodiments, for example, electrolysis cell plates may be made of stainless steel or titanium. In certain embodiments, for example, electrolysis cell plates may be coated with platinum or iridium. In certain embodiments, for example, electric current draw may increase when electrolyte solution heats up, for example, average (or maximum) electric current draw may increase from 5-15 Amps to 15-35 Amps, or from 10-11 Amps to 20-29 Amps. In certain embodiments, for example, one of the foregoing coatings may render the electric draw less sensitive to temperature, for example not temperature sensitive.

In certain further embodiments, for example, the electrolyte concentration may be lower than the concentration of electrolyte in a conventional electrolysis cell. In certain embodiments, for example, the electrolyte solution may be exclusive of sulfuric acid. In certain embodiments, for example, the electrolysis cell may be operated continuously (for example without pulsed width modulation) for a period of time (for example at least 10 minutes, at least 30 minutes, at least 1 hour, or indefinitely) without overheating, for example without heating to a temperature in excess of 65° C. In certain further embodiments, for example, an ability to operate the electrolysis cell continuously without overheating may be due at least in part to a low electrolyte concentration in the electrolyte solution (for example less than 2 vol. % of electrolyte, such as less than 0.5 vol. % of electrolyte) and/or an average (or maximum) current draw of less than 15 amps (for example less than 10 amps). In certain embodiments, for example, the electrolysis cell may be powered by a 20-28 VDC power source. In certain further embodiments, for example, the concentration of the one or more electrolytes may be selected, maintained, and/or adjusted to provide an average (or maximum) current draw of less than 10 amps at the operating temperature (for example an operating temperature of less than 80° C.) of the electrolysis cell. In certain embodiments, for example, the electrolysis cell may be configured to operate on less than 250 watts of DC power. In certain embodiments, for example, the electrolysis cell may be configured to have less than 3 ohm of resistance.

Certain embodiments may provide, for example, a vehicle comprising an internal combustion engine and an apparatus for providing HHO gas to the internal combustion engine. In certain embodiments, for example, the apparatus may comprise one of the HHO gas-providing apparatus described herein. In certain embodiments, for example, the vehicle may be a Class 8 truck comprising a heavy duty diesel engine. In certain further embodiments, for example, the heavy duty diesel engine may have a displacement in the range of 11-16 liters, for example in the range of 14-15 liters. In certain further embodiments, for example, the heavy duty diesel engine may have an engine speed of at least 1800 rpm, for example 2100 rpm. In certain further embodiments, for example, the heavy duty diesel engine may provide 1600-2000 ft-lb peak torque. In certain further embodiments, for example, the heavy duty diesel engine may be sized to produce 430-500 hp. In certain embodiments, for example, the vehicle may be a delivery truck comprising a medium duty diesel engine. In certain further embodiments, for example, the medium duty diesel engine may be a 6 cylinder inline engine. In certain embodiments, for example, the medium duty diesel engine may have a displacement in the range of 6-11 liters. In certain embodiments, for example, the vehicle (for example a Dodge Ram truck or a Ford F150 truck) may be a light truck comprising a light duty high speed diesel engine. In certain further embodiments, for example, the light duty high speed diesel engine may have a displacement in the range of 2-6 liters. In certain embodiments, for example, the light duty high speed diesel engine may have an engine speed of 4000-4500 rpm. In certain embodiments, for example, the light duty high speed diesel engine may be sized to produce 200-250 hp. In certain embodiments, for example, the light duty high speed diesel engine may be a 6-cylinder inline engine, a V6 engine, or a V8 engine. In certain embodiments, for example, the vehicle may be a pleasure boat comprising an internal combustion engine having a displacement in the range of 4-20 liters, for example a displacement in the range of 4-8 liters, or the internal combustion engine having a displacement in the range of 8-18 liters.

Certain embodiments may provide, for example, a generator comprising an internal combustion engine and an apparatus for providing HHO gas to the internal combustion engine. In certain embodiments, for example, the apparatus may comprise one of the HHO gas-providing apparatus described herein. In certain embodiments, for example, the engine may be a generator set engine having a displacement in the range of 6-60 liters. In certain further embodiments, for example, the generator set engine may be a V8, V12, V16, or V20 engine having an engine displacement of 2-6 liters per cylinder. In certain embodiments, for example, the generator set engine may be sized to produce more than 1000 hp, for example the generator set engine may be sized to produce 1000-2000 hp.

Certain embodiments may provide, for example, method for reducing one or more emissions (for example regulated emissions, such as emissions of particulate matter or emissions of nitrogen oxides (NOx)) of an internal combustion engine (for example a gas engine or a diesel engine), comprising: controlling a temperature of an HHO gas by exchanging heat with an engine coolant; and delivering the HHO gas at the controlled temperature to at least one intake port of the internal combustion engine. In certain embodiments, for example, one or more engine-out emissions of the internal combustion engine (for example a Heavy-Duty Highway Compression-Ignition Engine) may fall within or meet the regulated emissions limits for the internal combustion engine specified in EURO emission standards and/or Environmental Protection Agency emission standards. In certain embodiments, for example, the engine-out emission levels for purposes of determining compliance with emissions standards (for example Environmental Protection Agency emission standards) may be based on standard test procedures (for example the Environmental Protection Agency Transient Test Procedure, the Not-to-Exceed (NTE) test, the Supplemental Emission Test (SET), or the Urban Dynamometer Driving Schedule (UDDS)). In certain further embodiments, for example, the emission levels may comprise 0.2 g/bhp-hr of nitrogen oxide and non-methane hydrocarbon and 0.01 g/bhp-hr [or other levels] of particulate matter on Environmental Protection Agency Transient Test Procedure. In certain further embodiments, for example, the internal combustion engine may be a nonroad compression-ignition engine and the emission levels may comprise Exhaust Emission Standards for Nonroad Compression-Ignition Engines. In certain further embodiments, for example, the internal combustion engine may be a generator set engine and the emission levels comprise Exhaust Emission Standards for generator sets. In certain further embodiments, for example, one or more emissions of an internal combustion engine (for example a Category M, Category N1-I, Category N1-II, Category N1-III, Category N2, HD Diesel, or non-road mobile machinery internal combustion engine may be reduced according to one or more Euro emission standards (for example one or more of the Euro I, Euro II, Euro III, Euro IV, Euro V, or Euro VI emission standards).

Certain embodiments may provide, for example, a method of improving efficiency of an electrolysis process (for example a process for the electrolysis of water), comprising: selecting a working volume of electrolyte solution whereby the process draws less than 15 amps (for example less than 10 amps, for example between 5 and 12 amps, or 7 and 11 amps) at 24 VDC, configuring the size and number of a plurality of electrolysis plates in an electrolysis cell whereby each of the plurality of plates may be fully submerged in the working volume of electrolyte solution, and optionally cooling the electrolyte solution to a temperature of 80° C. or less. In certain embodiments, one or more than one (including for instance all) of the following embodiments may comprise each of the other embodiments or parts thereof. In certain embodiments, for example, the method may further comprise storing a product of electrolysis (for example a gas) within the electrolysis cell. In certain embodiments, for example, each of the plurality of electrolysis plates form a parallel stack having 1-3 mm spacing between neighboring plates. In certain embodiments, for example, the method may further comprise warming the electrolysis cell to a temperature of greater than 80° C. (for example greater than 90° C.). In certain embodiments, for example, the cooling may comprise removing heat from the electrolyte solution to an engine coolant with a heat exchanger. In certain embodiments, for example, the cooling may comprise removing heat from the electrolyte solution to an engine coolant. In certain embodiments, for example, the cooling may be assisted by intermittent interruptions of the electrolysis process. In certain embodiments, for example, electrolyte solution may comprise an aqueous electrolyte solution of sulfuric acid.

Certain embodiments may provide, for example, a method of delivering HHO gas to a combustion chamber of an internal combustion engine, comprising: delivering the HHO gas at a controlled temperature within 20° C. (for example within 10° C.) of an engine coolant temperature, pressurizing the HHO gas to a pressure within 500 kPa (for example within 400 kPa or 250 kPa) of an air intake port of the combustion chamber, and injecting the HHO gas into the air intake port.

Certain embodiments may provide, for example, a method of delivering HHO gas to a plurality of combustion chambers of an internal combustion engine, comprising: delivering the HHO gas at a controlled temperature within 10° C. of an engine coolant temperature, pressurizing the HHO gas to a pressure within 500 kPa (for example within 400 kPa or 250 kPa) of an air intake port of at least one combustion chamber of a plurality of combustion chambers, and delivering at least one portion of the HHO gas to within 3 inches of the intake valve of the at least one combustion chamber of the plurality of combustion chambers. In certain further embodiments, for example, the method may further comprise delivering at least a second portion of the HHO gas to within 3 inches of an intake valve of at least a second combustion chamber of the plurality of combustion chambers, and further delivering at least a third portion of the HHO gas to within 3 inches of an intake valve of at least a third combustion chamber of the plurality of combustion chambers.

Certain embodiments may provide, for example, a method of delivering HHO gas to a plurality of combustion chambers of an internal combustion engine, comprising: delivering the HHO gas at a controlled temperature within 10° C. (for example, within 5° C.) of engine coolant temperature, pressurizing the HHO gas to a pressure within 500 kPa (for example within 400 kPa or 250 kPa) of a first air intake port of at least one of the plurality of combustion chambers, and delivering the HHO gas directly into a plurality of air intake ports (for example, in the range of 4-12 intake ports, for example 6 or 8 intake ports).

Certain embodiments may provide, for example, a method of delivering HHO gas to a combustion chamber of an internal combustion engine, comprising: delivering the HHO gas at a controlled temperature within 10° C. of engine coolant temperature, pressurizing the HHO gas to a pressure within 500 kPa (for example within 400 kPa or 250 kPa) of an air intake port of the combustion chamber, and delivering a portion of the HHO gas into the intake port.

Certain embodiments may provide, for example, an electrolysis unit for supplying HHO gas as a boost fuel for a vehicle, comprising: a high pressure container comprising: a gas storage portion and a gas generation portion (for example the gas generation portion may comprise an electrolysis cell). In certain further embodiments, for example, the gas generation portion may be capable of generating a quantity of gas greater than the average demand for the vehicle. In certain further embodiments, for example, the gas storage portion may be sufficiently sized to store a quantity of gas that exceeds 90% of a peak demand (for example the average peak demand for a specified period of time) for the vehicle. In certain embodiments, one or more than one (including for instance all) of the following embodiments may comprise each of the other embodiments or parts thereof.

In certain embodiments, for example, the gas storage portion may have a fixed volume. In certain embodiments, for example, the gas storage portion may comprise a head space above the gas generation portion. In certain embodiments, for example, the average demand may be in the range of 1-4 liters (or 2-5 liters) of HHO gas per hour or per 120,000 crankshaft rotations, based on a gas temperature of within 20° C. of the temperature of engine coolant and a pressure of in the range of 40-50 psia. In certain embodiments, for example, the average peak demand may be in the range of 20-30 liters of HHO gas per hour or per 120,000 crankshaft rotations, based on a gas temperature of within 20° C. of the temperature of engine coolant and a pressure of in the range of 40-50 psia. In certain embodiments, for example, the gas generation portion may produce HHO gas intermittently (for example for less than 20 minutes before pausing). In certain embodiments, for example, HHO gas generation may be for less than 12 minutes per hour or per 120,000 crankshaft rotations. In certain embodiments, for example, HHO gas generation may be regulated to maintain the electrolysis unit at a temperature below 80° C. In certain embodiments, for example, the average demand may be based on an average 100 hp, 200 hp, 400 hp, 800 hp, 1400 hp, or 2000 hp output of the internal combustion engine.

Certain embodiments may provide, for example, a method to operate an electrolysis unit comprising a variable pressure zone, comprising: selecting a first pressure and a second pressure of the variable pressure zone whereby HHO gas initially at the first pressure may be discharged to meet a peak energy demand for a specified period without falling to a pressure below the second pressure, generating HHO gas until the variable pressure zone reaches the first pressure; separately generating HHO gas at a rate sufficient to meet an average energy demand. In certain embodiments, for example, the first pressure may be 50 psia and the second pressure may be 40 psia.

Certain embodiments may provide, for example, a method of improving a fuel economy of an internal combustion engine, comprising: injecting into each cylinder of the engine less than 1 liter (for example less than 0.3 liter) of the HHO gas per liter of cylinder displacement at a pressure of less than 500 kPa; and achieving a fuel economy improvement of more than 10% (for example more than 15%). Certain embodiments may provide, for example, a method of reducing one or more engine-out emissions (for example PM and/or NOx emissions) of an internal combustion engine, comprising: injecting into each cylinder of the engine less than 1 liter (for example less than 0.3 liter) of the HHO gas per liter of cylinder displacement at a pressure of less than 500 kPa; and achieving a reduction in the one or more engine-out emissions of at least 25% (for example a reduction of at least 50%). In certain further embodiments, for example, at least one of the one or more engine-out emissions may be reduced below corresponding regulatory limits, for example 2002, 2004, 2007, 2010, 2014 Environmental Protection Agency emission limits and/or Euro I, Euro II, Euro III, and or Euro VI emission limits].

Certain embodiments may provide, for example, a method of improving a fuel economy of a vehicle or generator set engine (genset) powered by an internal combustion engine, comprising: injecting a portion of an onboard-generated HHO gas into at least one cylinder of a plurality of cylinders of the internal combustion engine at a pressure greater than 30 psi and at a temperature within 10° C. of the operating temperature of a coolant for the internal combustion engine, and at a distance within 3 inches of an air intake valve of the at least one cylinder of the plurality of cylinders, wherein the HHO gas may be generated by an on-board electrolysis cell that may be powered by the internal combustion engine. In certain further embodiments, for example, the method may further comprise injecting a second portion of the onboard-generated HHO gas into at least a second cylinder of the plurality of cylinders at a pressure greater than 30 psi and at a temperature within 10° C. of the operating temperature of a coolant for the internal combustion engine, and at a distance within 3 inches of an air intake valve of the at least a second cylinder of the plurality of cylinders, and injecting a third portion of the onboard-generated HHO gas into at least a third cylinder of the plurality of cylinders at a pressure greater than 30 psi and at a temperature within 10° C. of the operating temperature of a coolant for the internal combustion engine, and at a distance within 3 inches of an air intake valve of the at least a third cylinder. In certain further embodiments, for example, injecting the portion, the second portion, and the third portion may be sequenced. In certain further embodiments, for example, the sequencing may be relative to a position of a first piston of a plurality of pistons (for example a piston for the first cylinder), a second piston of the plurality of pistons, and/or a third piston of the plurality of pistons. In certain embodiments, for example, the electrolysis cell may be further powered by battery, wherein the battery may be recharged by a charging unit that is powered by the combustion engine. In certain embodiments, for example, the vehicle's fuel economy may be increased by at least 5% on a miles per gallon of fuel combusted basis, relative to identical conditions where the HHO gas is not injected (for example where the HHO gas is not generated).

Certain embodiments may provide, for example, a method of improving a fuel economy of a vehicle powered by an internal combustion engine, comprising: injecting a portion of an onboard-generated HHO gas into at least one cylinder of a plurality of cylinders of the internal combustion engine at a pressure greater than 30 psi and at a temperature within 10° C. of the operating temperature of a coolant for the internal combustion engine, and at a distance within 3 inches of a first air intake valve of the at least one cylinder of the plurality of cylinders, wherein the HHO gas may be generated by an on-board electrolysis cell that may be powered by the internal combustion engine. In certain further embodiments, for example, the method may further comprise injecting a second portion of the onboard-generated HHO gas into at least a second cylinder of the plurality of cylinders at a pressure greater than 30 psi and at a temperature within 10° C. of the operating temperature of a coolant for the internal combustion engine, and at a distance within 3 inches of an air intake valve of the at least a second cylinder of the plurality of cylinders, and injecting a third portion of the onboard-generated HHO gas into at least a third cylinder of the plurality of cylinders at a pressure greater than 30 psi and at a temperature within 10° C. of the operating temperature of a coolant for the internal combustion engine, and at a distance within 3 inches of an air intake valve of the at least a third cylinder of the plurality of cylinders. In certain further embodiments, for example, injecting the portion, the second portion, and the third portion may be sequenced. In certain further embodiments, for example, the sequencing may be relative to a position of a first piston of a plurality of pistons (for example a piston for the first cylinder), a second piston of the plurality of pistons, and/or a third piston of the plurality of pistons. In certain embodiments, for example, the electrolysis cell may be further powered by battery, wherein the battery may be recharged by a charging unit that is powered by the combustion engine. In certain embodiments, for example, the vehicle's fuel economy may be increased by at least 5% on a miles per gallon of fuel combusted basis, relative to identical conditions where the HHO gas is not injected (for example where the HHO gas is not generated).

In certain further embodiments, for example, at least one of the one or more engine-out emissions (for example one or more of the emissions specified in the 2002, 2004, 2007, 2010, 2014 Environmental Protection Agency emission limits and/or Euro I, Euro II, Euro III, and or Euro VI emission limits) may be reduced by at least 5% (for example at least 10%) relative to identical conditions and duration where the HHO gas is not injected (for example where the HHO gas is not generated).

Certain embodiments may provide, for example, a second fuel injection system for an internal combustion engine, comprising a source of a second fuel, an injection system in fluid communication with said source of the second fuel, comprising at least one injector configured to control delivery of the second fuel, a line having an inlet in fluid communication with the outlet of said at least one injector and an outlet proximate at least one intake valve of the engine.

Certain embodiments may provide, for example, a booster gas injection system for an internal combustion engine, comprising a source of said booster gas, an injection system in fluid communication with said source of booster gas, comprising at least one booster gas injector configured to control delivery of at least a portion of said booster gas to a location proximate at least one intake valve of the engine.

Certain embodiments may provide, for example, a method for improving performance of an internal combustion engine, comprising multi-point variably injecting a second fuel directly into at least one intake port of the engine, wherein the second fuel is a product of electrolysis (for example electrolysis of an aqueous electrolyte solution).

Certain embodiments may provide, for example, apparatus, methods, or systems to improve the performance of an internal combustion engine. In certain embodiments, one or more than one (including for instance all) of the following embodiments may comprise each of the other embodiments or parts thereof. Certain embodiments may provide, for example, apparatus, methods, or systems to improve the fuel economy of an internal combustion engine. Certain embodiments may provide, for example, apparatus, methods, or systems to reduce the emissions of an internal combustion engine. Certain embodiments may provide, for example, apparatus, methods, or systems to improve the efficiency of aftertreatment devices of an internal combustion engine.

Certain embodiments may provide, for example, apparatus, methods, or systems to reduce the fuel consumption of an internal combustion engine.

Certain embodiments may provide, for example, apparatus, methods, or systems to improve the brake thermal efficiency of an internal combustion engine. Certain embodiments may provide, for example, apparatus, methods, or systems to reduce particulate matter (for example particulate matter) emissions. Certain embodiments may provide, for example, apparatus, methods, or systems to reduce the amount of fine and ultra-fine particulates.

Certain embodiments may provide, for example, apparatus, methods, or systems to improve the performance of an internal combustion engine (for example a gasoline engine, a diesel engine, a marine engine, or a 2-stroke engine). In certain embodiments, for example, internal combustion engines may realize a fuel economy increase of at least 1% (for example at least 2%, at least 5%, or at least 20%).

Certain embodiments may provide, for example, apparatus, methods, or systems to achieve substantially complete combustion, or at least more complete combustion, within the internal combustion engine (for example greater combustion of at least more than 10%, for example more than 20%).

Certain embodiments may provide, for example, apparatus, methods, or systems to improve the operation of the internal combustion engine. In certain embodiments, one or more than one (including for instance all) of the following embodiments may comprise each of the other embodiments or parts thereof. In certain embodiments, for example, the internal combustion engine may operate at a cooler temperature and/or may run cleaner. In certain embodiments, for example, the internal combustion engine may generate more power or more consistent or even power output for the same or lower amount of fuel. In certain embodiments, for example, the internal combustion engine may generate exhaust temperatures more suitable for efficient operation of exhaust aftertreatment systems. In certain embodiments, for example, the internal combustion engine may generate exhaust temperatures more suitable for efficient operation of diesel particulate filter (DPF). In certain embodiments, for example, the internal combustion engine may generate exhaust temperatures more suitable for efficient operation of selective catalytic reactor (SCR). In certain embodiments, for example, the internal combustion engine may generate exhaust temperatures more suitable for efficient operation of diesel oxidation catalyst (DOC). In certain embodiments, for example, the internal combustion engine may generate exhaust temperatures more suitable for efficient operation of NOx trap. In certain embodiments, for example, the exhaust temperature of the combustion engine may be reduced by at least 10° F. relative due to introduction of an ultra low quantity of HHO gas according to the methods, systems, and apparatus described herein, for example by at least 10° F., by at least 20° F., by at least 30° F., by at least 40° F., by at least 50° F., by at least 60° F., by at least 70° F., by at least 70° F., by at least 80° F., by at least 90° F., or the exhaust temperature may be reduced by at least 100° F. In certain embodiments, for example, the exhaust temperature of the combustion engine may be reduced by in the range of 5 to 125° F., for example in the range of in the range of 5 to 125° F., in the range of 10 to 100° F., in the range of 25 to 100° F., in the range of 50 to 100° F., in the range of 70 to 95° F., in the range of 10 to 40° F., in the range of 10 to 30° F., or the exhaust temperature may be reduced in the range of 75 to 85° F.

In certain internal combustion engine applications (for example heavy duty, over-the-road diesel trucks) the exhaust may be equipped with an aftertreatment system to address environmental regulations. The system often consists of diesel particulate filters, for example, wall-flow diesel particulate filters (DPFs) to remove or trap particular from within the passing exhaust stream. These DPF's are regenerated by burning off the accumulated particulate in a process called regeneration. Diesel particulate matter burns when exposed to temperatures above 600 degrees Celsius. A typical DPF burner employs diesel fuel as an energy source. Diesel fuel may be injected into the evaporator portion of the burner, where it is atomized and then provided to the combustor. There, combustion of atomized fuel releases heat, which may be transferred through a heat transfer element to the engine exhaust, raising its temperature to the level sufficient to burn off accumulated material trapped by the DPF. This regeneration combustion may be assisted by the introduction of HHO. In certain embodiments, for example, HHO may be introduced on a controlled basis to aid the regeneration combustion. In certain embodiments, for example, this may be accomplished by positioning an HHO injector proximate the combustion site as a second fuel for the regeneration combustion. In certain embodiments, for example, this injector may deliver stored HHO, stored hydrogen or be fed HHO from an on-board HHO generator. In certain embodiments, for example, the engine may be equipped with a HHO generator and a series of HHO injectors to distribute HHO about the intake ports of the engine and a further injector to distribute HHO proximate the combustion site of the DPF regeneration burner to aid as a second fuel for the regeneration combustion.

Certain embodiments may provide, for example, apparatus, methods, or systems to introduce a second fuel (for example a second fuel exclusive of a petroleum-derived fuel) into an internal combustion engine. In certain embodiments, for example, the second fuel (also referred to as booster gas or enhancement gas or HHO gas throughout this application, unless specifically defined otherwise) may comprise hydrogen, oxygen and/or mixtures thereof derived from electrolysis of an aqueous electrolyte solution comprising ions, for example an electrolysis solution. In certain embodiments, for example, the second fuel may substantially comprise hydrogen, oxygen and/or mixtures thereof. In certain embodiments, for example, the second fuel may predominantly comprise hydrogen, oxygen and/or mixtures thereof. In certain embodiments, for example, the second fuel may be a product of electrolysis. In certain embodiments, for example, the second fuel or components of the second fuel, for example hydrogen may benefit the combustion reaction by serving as a catalyst.

Certain embodiments may provide, for example, apparatus, methods, or systems to produce an oxygen-hydrogen gas mixture (for example an oxygen-hydrogen gas mixture for use as a second fuel in an internal combustion engine). In certain embodiments, for example, the gas mixture may be an oxygen-rich or hydrogen-rich a gas mixture. In certain embodiments, for example, the gas mixture may comprise one or more of aqueous electrolyte solution electrolysis components (for example monatomic oxygen and/or monatomic hydrogen).

Certain embodiments may provide, for example, apparatus, methods, or systems to produce a gas mixture that is approximately two parts hydrogen to one part oxygen (for example 2:1) or less than 2:1 (for example 1.75:1, 1.5:1, 1.25:1, 1:1, 0.75:1, or 0.5:1). In certain embodiments, for example, the gas mixture produced may be modified before being delivered to the internal combustion engine. In certain embodiments, for example, the gas mixture may be combined with an additive and/or the composition of the gas mixture may be modified by adding, recycling or removing portions of the gas mixture. In certain embodiments, for example, an apparatus, method, or system may generate hydrogen and oxygen at a hydrogen to oxygen ratio of 2:1, but some of the hydrogen or oxygen, for example oxygen, may be trapped in bubbles, and the apparatus, method, or system may be configured to release the trapped oxygen to effectively deliver more oxygen to the internal combustion engine.

Certain embodiments may provide, for example, apparatus, methods, or systems to result in a more reliably controlled gas mixture generation process. In certain embodiments, for example, the current provided to the system for gas generation may be continually or continuously regulated or controlled, for example, in real time (or substantially real time), so as to provide predetermined or controlled quantity of gas, for example, in relation to the engine speed and/or demand.

Certain embodiments may provide, for example, apparatus, methods, or systems to utilize a substantially closed-loop system that recycles a water-reagent (or water-electrolyte or aqueous electrolyte solution electrolysis component) mixture to reduce its consumption.

Certain embodiments may provide, for example, apparatus, methods, or systems to alter combustion (for example diesel combustion) chemistry to reduce particulate formation, for example reduce particulate formation by greater than 5% (for example greater than 10%).

Certain embodiments may provide, for example, apparatus, methods, or systems to increase the concentration of an oxidizer in an internal combustion engine, for example increase the amount of oxidizers by at least 5% (for example by at least 20%).

Certain embodiments may provide, for example, apparatus, methods, or systems that serve as a mechanism for distributing the oxidizer for more even air/fuel mixture.

Certain embodiments may provide, for example, apparatus, methods, or systems to generate a gas mixture that is an accelerant to speed combustion, enhance combustion, and/or increase the extent of combustion.

Certain embodiments may provide, for example, apparatus, methods, or systems to displace air with oxygen and/or hydrogen within the engine's intake system. In certain embodiments, one or more than one (including for instance all) of the following embodiments may comprise each of the other embodiments or parts thereof. In certain embodiments, for example, an apparatus, method, or system may displace air within the engine's intake system with the gas mixture, resulting from the gas mixture generator system. In certain embodiments, for example, an apparatus, method, or system may be used to create a shorter combustion process that lowers the engine temperature thereby reducing the formation of nitrogen oxides. In certain embodiments, for example, an apparatus, method, or system may generate a gas mixture resulting from electrolysis of an aqueous electrolyte solution and introducing at least a portion of the gas mixture into the engine's intake for improved combustion. In certain embodiments, for example, an apparatus, method, or system may generate a gas mixture resulting from electrolysis of an aqueous electrolyte solution and introducing a substantial portion (for example greater than 95 wt. %), of the gas mixture into the engine's intake for improved combustion. In certain embodiments, for example, an apparatus, method, or system may generate a gas mixture resulting from electrolysis of an aqueous electrolyte solution and storing the gas mixture in a storage tank instead of introducing the gas mixture into the engine's intake. In certain embodiments, for example, an apparatus, method, or system may generate an optimized or partially optimized quantity of a gas mixture, such as a gas mixture having one or more aqueous electrolyte solution electrolysis components, into the engine's intake for improved combustion. In certain embodiments, for example, an apparatus, method, or system may be configured to produce in the range of between 1-7.5 liters of gas per minute and/or produce in the range of between 0.08-0.75 liters of gas per minute per liter of engine displacement. In certain embodiments, for example, an apparatus, method, or system may be configured to produce in the range of between 4.8-45 liters of gas per hour per liter of engine displacement. In certain embodiments, for example, an apparatus, method, or system may be configured to produce in the range of between 1.25-15 liters of gas per hour per liter of engine displacement, for example in the range of 1.5-10 liters of gas per hour per liter of engine displacement, in the range of 2-8 liters of gas per hour per liter of engine displacement, in the range of 2-5 liters of gas per hour per liter of engine displacement, in the range of 1.5-4 liters of gas per hour per liter of engine displacement, in the range of 2-4 liters of gas per hour per liter of engine displacement, in the range of 1.5-2 liters of gas per hour per liter of engine displacement, in the range of 2-3 liters of gas per hour per liter of engine displacement, in the range of 3-4 liters of gas per hour per liter of engine displacement, in the range of 4-5 liters of gas per hour per liter of engine displacement, in the range of 5-7 liters of gas per hour per liter of engine displacement, in the range of 7-9 liters of gas per hour per liter of engine displacement, or the apparatus, method, or system may be configured to produce in the range of between 9-15 liters of gas per hour per liter of engine displacement.

Certain embodiments may provide, for example, a system or apparatus to generate a gas mixture for use with an internal combustion engine, the system or apparatus comprising a tank (for example an at least partially non-conductive tank) configured to store an aqueous electrolyte solution consisting essentially of water and a predetermined quantity of electrolyte (for example the electrolyte may comprise KOH, $K_2CO_3$, NaOH, $Na_2CO_3$, and/or $H_2SO_4$). In certain embodiments, for example, one or more than one (including for instance all) of the following embodiments of the system or apparatus may comprise each of the other embodiments or parts thereof. In certain embodiments, for example, the system or apparatus may further comprise a cell (i.e., an electrolytic cell) configured for aiding in the electrolysis of the aqueous electrolyte solution. In certain further embodiments, for example, the cell may comprise a plurality of plates arranged substantially parallel to one another and be spaced substantially equidistant from an adjacent one of the plurality of plates, and at least one seal located between the plurality of plates. In certain embodiments, for example, the at least one seal may produce a substantially watertight seal between adjacent ones of the plurality of plates. In certain embodiments, for example, the system or apparatus may further comprise a controller configured to apply a pulse width modulated voltage to the cell to generate the gas mixture within the cell. In certain further embodiments, for example, the controller may be configured to regulate the current provided to the cell by controlling the duty cycle of the pulse width modulated voltage. In certain embodiments, for example, the duty cycle may be controlled in real time and/or substantially real time.

In certain embodiments, for example, the controller may provide electrical power to the electrolysis cell according to a timed on/off sequence. In certain embodiments, for example, the timed on/off sequence may be in the range of 10-120 seconds on followed by in the range of 30-240 seconds off, for example 20-90 seconds on followed by in the range of 45-120 seconds office, or the timed on/off sequence may be in the range of 30-60 seconds on followed by in the range of 60-90 seconds off. In certain embodiments, for example, the electrolysis timed sequence may be interrupted when the pressure of a stored supply of HHO gas exceeds a first pressure, and restarted when the pressure of the stored supply of HHO gas falls below a second pressure, the first pressure greater than the second pressure. In certain embodiments, for example, the difference between the first pressure and the second pressure may be at least 2 psi, at least 4 psia, or the difference between the first pressure and the second pressure. at least 8 psi. In certain embodiments, for example, the difference between the first pressure and the second pressure may be less than 8 psi, less than 4 psi or the difference between the first pressure and the second pressure may be 2 psi or less. In certain embodiments, for example, the difference between the first pressure and the second pressure may be in the range of 1-8 psi, for example in the range of 2-4 psi. In certain embodiments, for example, the first pressure may be in the range of 40-100 psig, for example in the range of 40-60 psig, or in the range of 48-52 psig.

In certain embodiments, for example, the system or apparatus may further comprise an output for outputting the gas mixture to the internal combustion engine. In certain embodiments, for example, the gas mixture may be input into the tank prior to being output to the internal combustion engine. In certain embodiments, for example, the gas mixture may be output to the internal combustion engine without being input into the tank. In certain embodiments, for example, the gas mixture may be stored in the tank without being output to the internal combustion engine under certain operating conditions. In certain embodiments, for example, the gas generation system or apparatus may be integral with the gas storage tank. In certain embodiments, for example, the size of the tank may be selected such that the aqueous electrolyte solution occupies less than ⅔ (for example less than ¼) the volume of the tank during operation. In certain embodiments, for example, the system or apparatus may comprise multiple tanks. In certain embodiments, for example, the cell may comprise at least two plates (for example at least 7 plates or at least 15 plates), a first plate configured to be coupled to a positive terminal of a voltage source and a second plate configured to be coupled to a negative terminal of the voltage source. In certain embodiments, for example, the cell may further comprise at least one neutral plate configured in a series relationship to the first plate and the second plate.

Certain embodiments may provide, for example, apparatus, methods, or systems to realize a fuel economy increase of at least 1%, (for example at least 5%, or for example between 8 and 12%, or at least 10%, 15% or from 1% to up to 20%).

Certain embodiments may provide, for example, apparatus, methods, or systems to improve the operation of an internal combustion engine. In certain embodiments, for example, the internal combustion engine may operate at a cooler temperature and/or may run cleaner.

Certain embodiments may provide, for example, apparatus, methods, or systems to produce an oxygen-hydrogen gas mixture, such as an oxygen-rich, oxygen-hydrogen gas mixture, or a hydrogen-rich oxygen-hydrogen gas mixture. In certain embodiments, one or more than one (including for instance all) of the following embodiments of the system or apparatus may comprise each of the other embodiments or parts thereof.

Certain embodiments may provide, for example, apparatus, methods, or systems to more reliably controlled gas mixture generation process. In certain embodiments, for example, the current provided for gas generation may be continually or continuously regulated or controlled, for example, in real time (or substantially real time), so a predetermined quantity of gas is consistently produced.

Certain embodiments may provide, for example, apparatus, methods, or systems to utilize a substantially closed-loop method of electrolysis that recycles a water-reagent (or water-electrolyte or aqueous electrolyte solution electrolysis component) mixture in an effort to reduce its consumption.

Certain embodiments may provide, for example, apparatus, methods, or systems capable of altering combustion (for example diesel combustion) chemistry to reduce particulate formation (for example reduce particulate formation by greater than 5%, for example between 8% and 15% or by greater than 10%). In certain embodiments, for example, the concentration of an oxidizer in an internal combustion engine may be increased (for example increased by at least 5%, for example by at least 20%).

Certain embodiments may provide, for example, apparatus, methods, or systems to distribute the oxidizer for more even air/fuel mixture.

Certain embodiments may provide, for example, apparatus, methods, or systems to generate a gas mixture that is an accelerant to speed combustion and/or increase combustion completion.

Certain embodiments may provide, for example, apparatus, methods, or systems to displace air with oxygen and/or hydrogen within the engine's intake system.

Certain embodiments may provide, for example, apparatus, methods, or systems to create a shorter combustion process that lowers the engine temperature thereby reducing the formation of nitrogen oxides.

Certain embodiments may provide, for example, apparatus, methods, or systems to reduce the particulate emissions of an internal combustion engine. In certain embodiments, for example, a method may comprise the steps of generating a gas mixture for use within the internal combustion engine and providing the gas mixture to the internal combustion engine during operation of the internal combustion engine. In certain embodiments, for example, a method may comprise: generating a gas mixture for use within the internal combustion engine, and providing the gas mixture to the internal combustion engine during operation of the internal combustion engine. In certain embodiments, for example, the gas mixture may be generated in substantially real time relative to the consumption of the gas mixture. In certain embodiments, for example, the gas mixture may be generated onboard the vehicle during operation of the internal combustion engine.

Certain embodiments, may provide, for example, a booster gas injection system for an internal combustion engine, comprising: a source of said booster gas, an injection system in fluid communication with said source of booster gas. In certain further embodiments, for example, the injection system may comprise at least one booster gas injector configured to control delivery of at least a portion of said booster gas to a location proximate at least one intake valve of the engine. In certain embodiments, one or more than one (including for instance all) of the following embodiments of the system or apparatus may comprise each of the other embodiments or parts thereof. In certain embodiments, for example, the booster gas may be a gas mixture of hydrogen and oxygen. In certain embodiments, for example, the source of the booster gas may be a gas mixture generation system comprising: an electrolyte solution storage tank, an electrolysis cell, and a gas mixture storage, wherein the electrolyte solution storage tank, the electrolysis cell, and the gas mixture storage are integrated into a single unit. In certain embodiments, for example, delivery of the booster gas by each booster gas injector may occur during the opening of a cylinder intake valve of the internal combustion engine. In certain embodiments, for example, the injection system may further comprise a controller configured to input signals from at least one sensor, and configured to output a command to at least one actuator. In certain further embodiments, for example, the at least one sensor may comprise a throttle position sensor and/or a manifold pressure sensor. In certain further embodiments, for example, the at least one actuator may comprise an injector solenoid.

Certain embodiments may provide, for example, a second fuel injection system for an internal combustion engine, comprising: a source of a second fuel, and an injection system in fluid communication with said source of the second fuel. In certain further embodiments, for example, the injection system may comprise: at least one injector configured to control delivery of the second fuel, and a line having an inlet in fluid communication with the outlet of said at least one injector and an outlet proximate at least one intake valve of the engine. In certain embodiments, for example, the second fuel may be may be a gas mixture of hydrogen and oxygen. In certain embodiments, for example, the source of the second fuel may be a gas mixture generation system comprising: an electrolyte solution storage tank, an electrolysis cell, and a gas mixture storage, wherein the electrolyte solution storage tank, the electrolysis cell, and the gas mixture storage are integrated into a single unit.

Certain embodiments may provide, for example, a method for improving performance of an internal combustion engine, comprising: multi-point variably injecting a second fuel directly into at least one intake port of the engine, wherein the second fuel is a product of electrolysis of water and optionally one or more electrolytes and/or excipients. In certain embodiments, for example, the electrolysis may be accomplished in a batch process comprising: filling a tank with an electrolyte solution, applying electrical power to an electrolysis cell inside the tank, generating gas mixture in the electrolysis cell, storing gas mixture inside the tank (for example storing the gas mixture inside the tank at a pressure greater than atmospheric pressure), and releasing at least a portion of the gas mixture from the tank when requested by a controller. In certain embodiments, for example, the injecting may be controlled by a controller. In certain further embodiments, for example, the controller may be configured to input signals from at least one sensor, and the controller may be further configured to output a command to at least one actuator. In certain embodiments, for example, the variably injecting may comprise changing pressure or flow rate of the second fuel. In certain embodiments, for example, the injecting may comprise injecting the second fuel by a plurality of second fuel injectors. In certain further embodiments, for example, the number of the plurality of second fuel injectors may be the number of engine cylinders present in the internal combustion engine.

Certain embodiments may provide, for example, a gas mixture generation system, comprising: a tank, one or more sets of plates inside the tank, a gap between top edges of the plates and the bottom wall of the tank, electrical connections passing through the tank, insulating spacers between each pair of neighboring plates within each set of plates, an electrolyte solution filling a portion of the tank from the bottom wall to a level below a top edge of the plates, and at least one hole in each plate to allow a flow of the electrolyte solution. In certain further embodiments, for example, the tank may comprise a top wall, a plurality of side walls, and a bottom wall. In certain further embodiments, for example, each of the one or more sets of plates may comprise a left side plate, a right side plate, and one or more middle plates, wherein all plates of each set are substantially parallel to each other and substantially perpendicular to the top and bottom walls of the tank. In certain further embodiments, for example, the electrical connections may pass through the tank to each left side plate and to each right side plate Certain embodiments may provide, for example, a gas mixture generation system, comprising: an electrolyte solution storage tank, an electrolysis cell, and a gas mixture storage, wherein the electrolyte solution storage tank, the electrolysis cell, and the gas mixture storage are integrated into a single unit.

Certain embodiments may provide, for example, a gas mixture generation system, comprising: a housing, a bottom internal portion inside the housing, comprising an electrolysis cell, and a top internal portion inside the housing, comprising a gas mixture storage.

Certain embodiments may provide, for example, a batch process for generating a gas mixture, comprising: filling a tank with an electrolyte solution, applying electrical power to an electrolysis cell inside the tank, generating gas mixture in the electrolysis cell, storing gas mixture inside the tank, and releasing gas mixture from the tank when requested by a controller.

Certain embodiments may provide, for example, a tank for generating and storing a gas mixture, comprising: an external housing, an electrolyte solution inside the external housing, and a hole in the external housing for filling the tank with the electrolyte solution, an electrolysis cell inside the external housing comprising a plurality of substantially parallel plates including two side plates, at least one hole in each of the plurality of substantially parallel plates, a positive electrode connected to one of the two side plates and a negative electrode connected to the other of the two side plates, holes in the external housing for the positive electrode and for the negative electrode, a gas mixture storage above the electrolysis cell, and a hole in the external housing for gas mixture outlet. In certain embodiments, for example, the electrolysis cell may be immersed in the electrolyte solution such that a top portion of the electrolysis cell is above the level of the electrolyte solution.

Certain embodiments may provide, for example, a retrofitted internal combustion engine configured to utilize an HHO gas, comprising: an internal combustion engine comprising a plurality of combustion chambers, a retrofitted multi-point HHO gas distribution system, a retrofitted multi-point HHO gas distribution control system, and a multiplate electrolysis cell. In certain embodiments, for example, the retrofitted multi-point HHO gas distribution system may comprise an HHO gas distribution harness comprising an HHO gas pressure regulator, a plurality of injectors, and a plurality of lances connected to the plurality of injectors. In certain embodiments, for example, the HHO gas pressure regulator may comprise a heat exchanger that is integrated with a retrofitted engine coolant line. In certain embodiments, for example, the retrofitted multi-point HHO gas distribution control system may be configured to control the actuation of the injectors based on timing parameters of the internal combustion engine (for example based on the timing of air intake strokes of the plurality of combustion chambers). In certain embodiments, for example, the electrolysis cell may be integrated with a retrofitted power supply powered at least partially by the internal combustion engine.

DETAILED DESCRIPTION OF THE INVENTION

Figure 1:
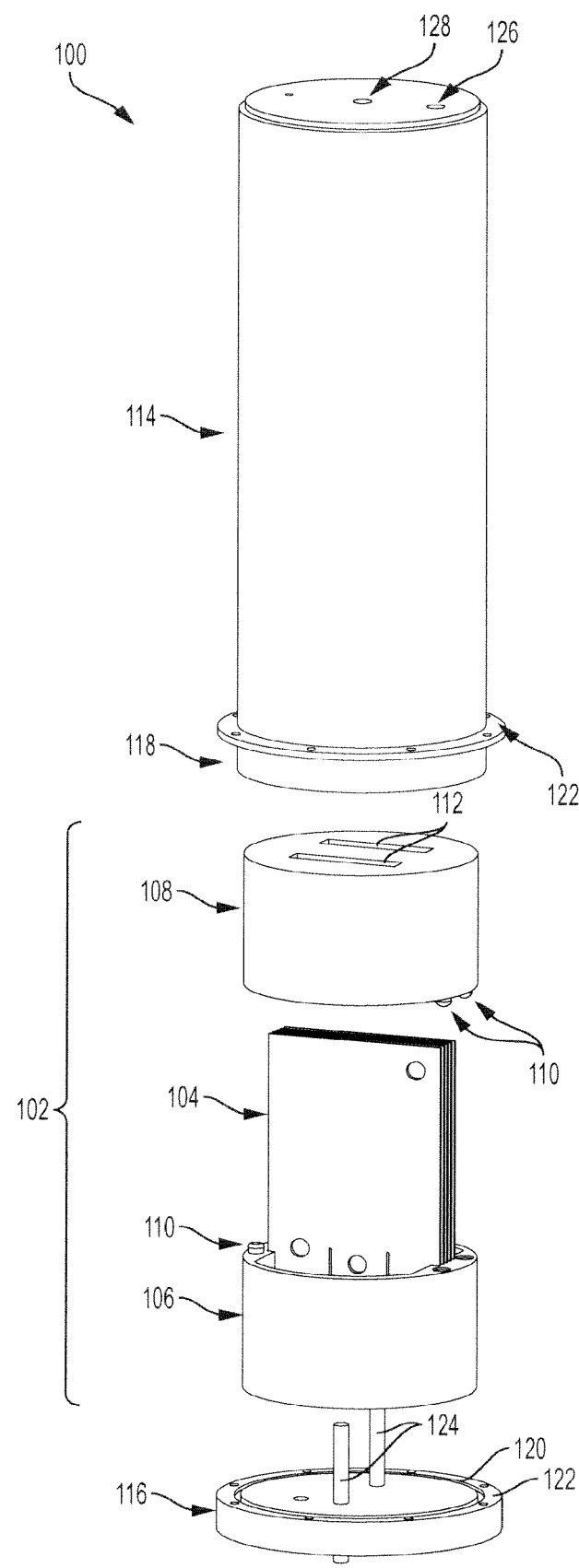
FIG. 1 is a schematic exploded view of a high pressure container housing an n HHO gas production apparatus.

Certain embodiments may provide, for example, a method for increasing fuel economy of an internal combustion engine. In certain embodiments, for example, the method may comprise introducing in the range of 1.25-30 liters (for example in the range of 2-5 liters) of HHO gas per hour per liter of displacement of the internal combustion engine in operation. In certain embodiments, for example, the method may comprise introducing for example in the range of 1.25-30 liters of HHO gas per hour per liter of displacement of the internal combustion engine per 100 hp average output of the internal combustion engine, in the range of 1.25-30 liters of HHO gas per hour per liter of displacement of the internal combustion engine per 200 hp average output of the internal combustion engine, in the range of 1.25-30 liters of HHO gas per hour per liter of displacement of the internal combustion engine per 400 hp average output of the internal combustion engine, in the range of 1.25-30 liters of HHO gas per hour per liter of displacement of the internal combustion engine per 800 hp average output of the internal combustion engine, in the range of 1.25-30 liters of HHO gas per hour per liter of displacement of the internal combustion engine per 1400 hp average output of the internal combustion engine, or in the range of 1.25-30 liters of HHO gas per hour per liter of displacement of the internal combustion engine per 2000 hp average output of the internal combustion engine. In certain embodiments, for example, the liters of HHO gas introduced per hour per liter of displacement of the internal combustion engine per 100 hp (or per 200 hp, per 400 hp, per 800 hp, per 1400 hp, or per 2000 hp) average output of the internal combustion engine may be in the range of 1.25-10 liters of HHO gas, in the range of 1.25-5 liters of HHO gas, in the range of 2-5 liters of HHO gas, in the range of 2-4 liters of HHO gas, in the range of 1.25-4 liters of HHO gas, in the range of 1.5-3 liters of HHO gas, in the range of 3-5 liters of HHO gas, in the range of 5-10 liters of HHO gas, in the range of 10-15 liters of HHO gas, in the range of 15-20 liters of HHO gas, or in the range of 20-30 liters of HHO gas. In certain embodiments, for example, the method may comprise introducing for example in the range of 2-5 liters of HHO gas per hour per liter of displacement of the internal combustion engine per 100 hp average output of the internal combustion engine, in the range of 2-5 liters of HHO gas per hour per liter of displacement of the internal combustion engine per 200 hp average output of the internal combustion engine, in the range of 2-5 liters of HHO gas per hour per liter of displacement of the internal combustion engine per 400 hp average output of the internal combustion engine, in the range of 2-5 liters of HHO gas per hour per liter of displacement of the internal combustion engine per 800 hp average output of the internal combustion engine, in the range of 2-5 liters of HHO gas per hour per liter of displacement of the internal combustion engine per 1400 hp average output of the internal combustion engine, or in the range of 2-5 liters of HHO gas per hour per liter of displacement of the internal combustion engine per 2000 hp average output of the internal combustion engine.

In certain embodiments, for example, the method may comprise electrolysis of in the range of 2-25 ounces of an electrolyte solution per liter of engine displacement per 100 hours of operation of the internal combustion engine per 100 hp average output of the internal combustion engine. In certain embodiments, for example, the method may comprise electrolysis of in the range of 2-25 ounces of an electrolyte solution per liter of engine displacement per 100 hours of operation of the internal combustion engine per 200 hp average output of the internal combustion engine. In certain embodiments, for example, the method may comprise electrolysis of in the range of 2-25 ounces of an electrolyte solution per liter of engine displacement per 100 hours of operation of the internal combustion engine per 400 hp average output of the internal combustion engine. In certain embodiments, for example, the method may comprise electrolysis of in the range of 2-25 ounces of an electrolyte solution per liter of engine displacement per 100 hours of operation of the internal combustion engine per 800 hp average output of the internal combustion engine. In certain embodiments, for example, the method may comprise electrolysis of in the range of 2-25 ounces of an electrolyte solution per liter of engine displacement per 100 hours of operation of the internal combustion engine per 1400 hp average output of the internal combustion engine. In certain embodiments, for example, the method may comprise electrolysis of in the range of 2-25 ounces of an electrolyte solution per liter of engine displacement per 100 hours of operation of the internal combustion engine per 2000 hp average output of the internal combustion engine. In certain embodiments, for example, the ounces of electrolyte solution electrolyzed per liter of engine displacement per 100 hours of operation of the internal combustion engine per 100 hp (or per 200 hp, per 400 hp, per 800 hp, per 1400 hp, or per 2000 hp) average output of the internal combustion engine may be in the range of 3-15 ounces of electrolyte solution, in the range of 3-10 ounces of electrolyte solution, in the range of 5-9 ounces of electrolyte solution, in the range of 6-8 ounces of electrolyte solution, in the range of 5-20 ounces of electrolyte solution, in the range of 5-10 ounces of electrolyte solution, in the range of 10-15 ounces of electrolyte solution, or in the range of 15-25 ounces of electrolyte solution. In certain embodiments, for example, the method may comprise electrolysis of in the range of 5-10 ounces of an electrolyte solution per liter of engine displacement per 100 hours of operation of the internal combustion engine per 100 hp average output of the internal combustion engine. In certain embodiments, for example, the method may comprise electrolysis of in the range of 5-10 ounces of an electrolyte solution per liter of engine displacement per 100 hours of operation of the internal combustion engine per 200 hp average output of the internal combustion engine. In certain embodiments, for example, the method may comprise electrolysis of in the range of 5-10 ounces of an electrolyte solution per liter of engine displacement per 100 hours of operation of the internal combustion engine per 400 hp average output of the internal combustion engine. In certain embodiments, for example, the method may comprise electrolysis of in the range of 5-10 ounces of an electrolyte solution per liter of engine displacement per 100 hours of operation of the internal combustion engine per 800 hp average output of the internal combustion engine. In certain embodiments, for example, the method may comprise electrolysis of in the range of 5-10 ounces of an electrolyte solution per liter of engine displacement per 100 hours of operation of the internal combustion engine per 1400 hp average output of the internal combustion engine. In certain embodiments, for example, the method may comprise electrolysis of in the range of 5-10 ounces of an electrolyte solution per liter of engine displacement per 100 hours of operation of the internal combustion engine per 2000 hp average output of the internal combustion engine.

Certain embodiments may provide, for example, an HHO gas production apparatus to provide a second fuel to an internal combustion engine. FIG. 1 is a schematic exploded view of a high pressure container housing an HHO gas production apparatus 100. The apparatus comprises an electrolysis cell 102 comprising a spaced stack of electrolysis plates 104 seated within an insulated plate holder comprising a lower portion 106 and an upper portion 108. The lower portion of the insulated plate holder 106 and the upper portion of the insulated plate holder 108 are oriented with respect to each other via alignment pegs 110. Electrolyte solution can be introduced and HHO gas removed from the electrolysis cell through slots 112 in the upper portion of the insulated plate holder 108. The electrolysis cell 102 is contained within a pressure resistant container comprising a top housing 114 and an insulated bottom cover 116. When assembled, the lower rim 118 of the top housing is seated in a groove 120 of the insulated bottom cover 116. The pressure resistant container is assembled and sealed with flange assembly 122. The top housing further comprises an electrolyte solution addition port 126 and gas removal port 128. The bottom cover 116 further comprises power terminals 124 used to supply electricity to the electrolysis cell.

Figure 2:
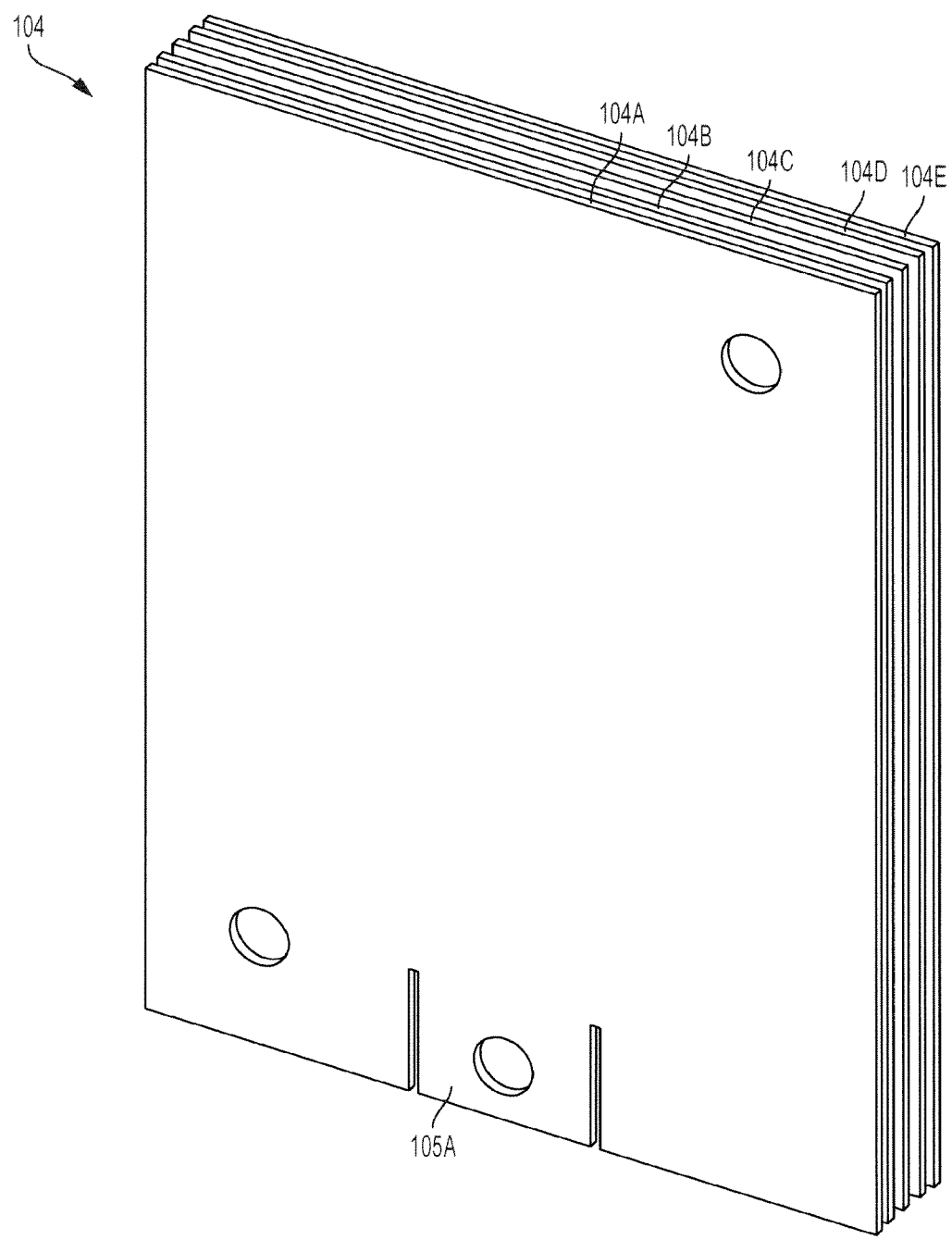
FIG. 2 is a schematic view of an electrolysis plate stack

FIG. 2 depicts an electrolysis plate stack 104 comprising five spaced-apart substantially parallel electrolysis plates 104A, 104B, 104C, 104D, and 104E. The terminal connector 105A may be connected to a power terminal.

Figure 3:
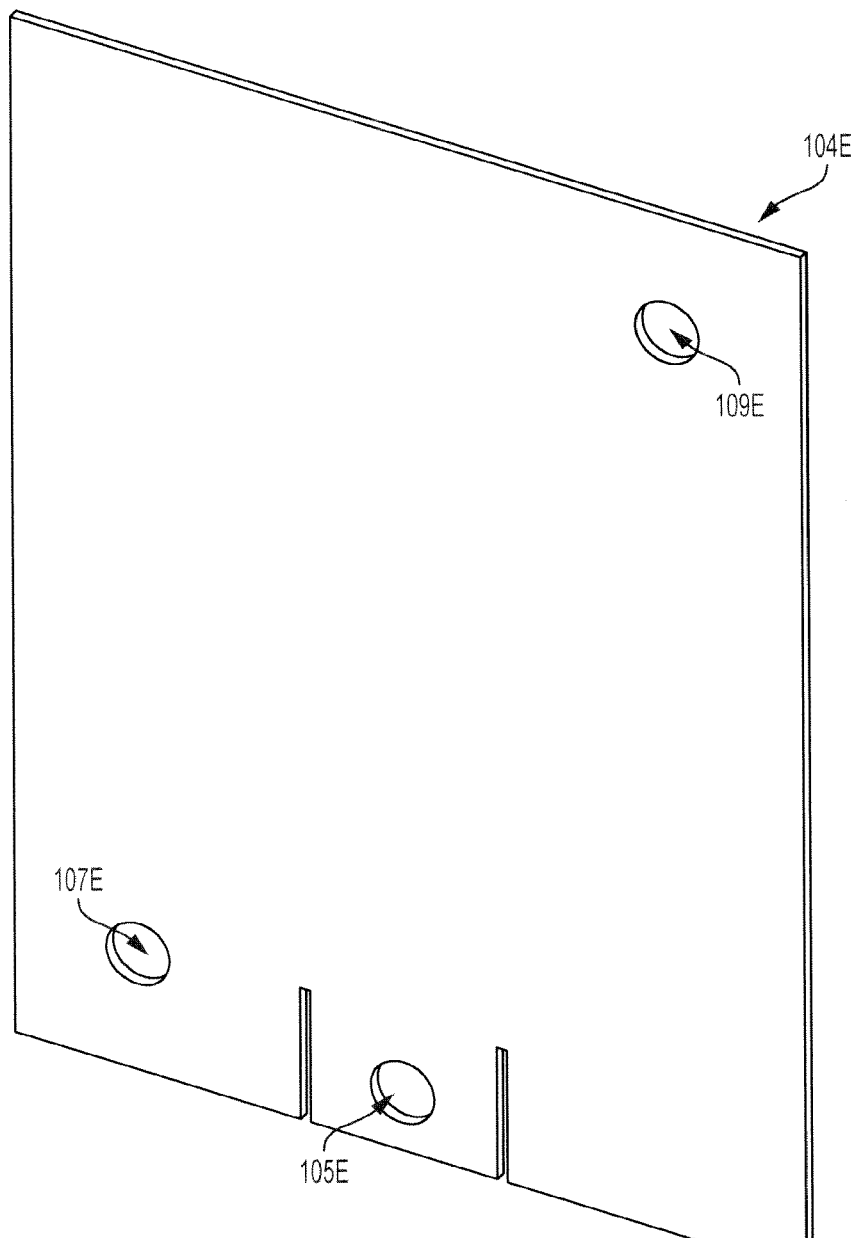
FIG. 3 is a schematic view of an electrolysis plate.

FIG. 3 depicts an electrolysis plate 104E comprising an electrolyte solution flow port 107E, an electrolyte solution flow and gas removal port 109E, and optional power terminal connector 105E.

Figure 4:
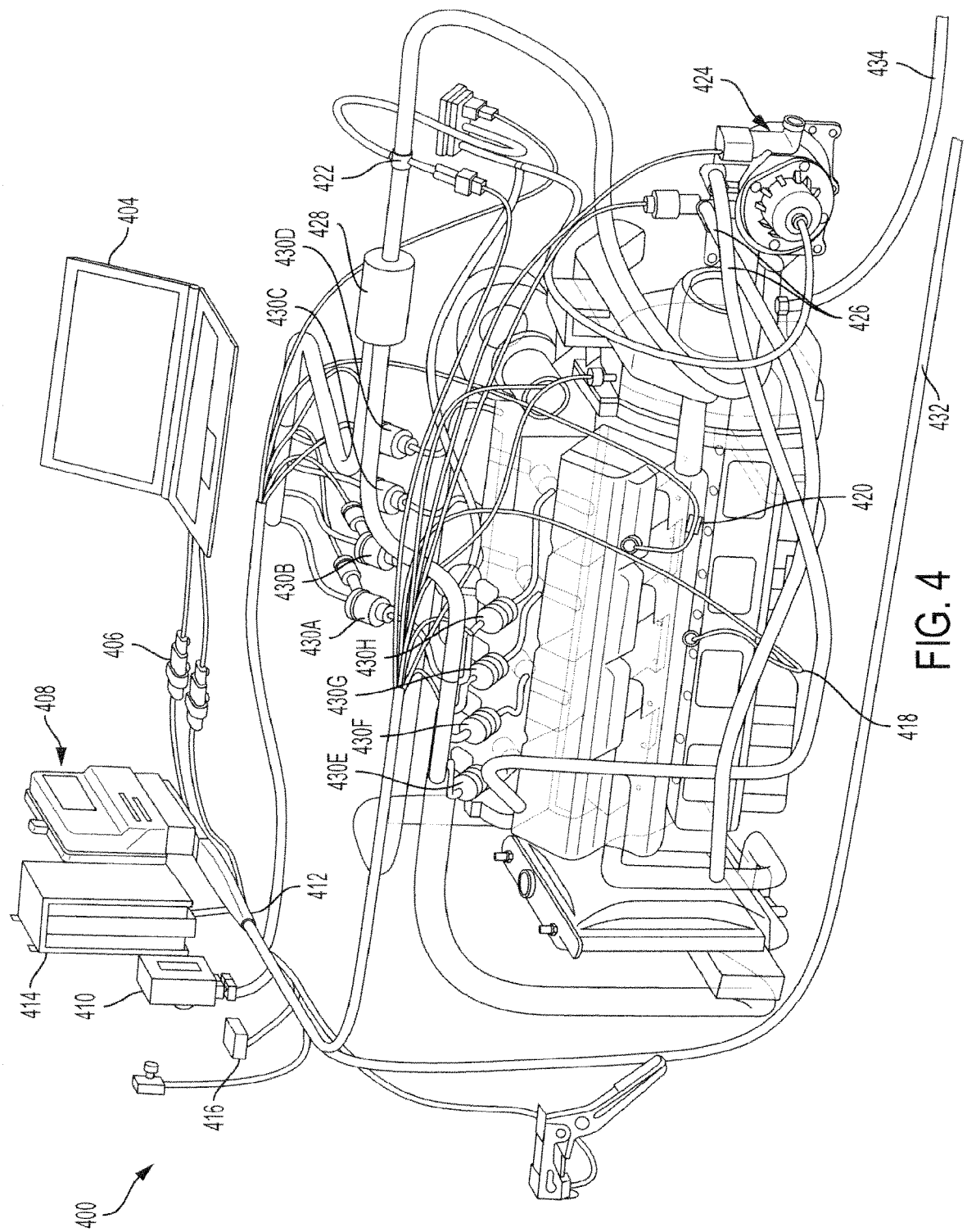
FIG. 4 is a schematic view of an HHO gas distribution harness with control wiring.

FIG. 4 is a schematic view of an HHO gas distribution harness with control wiring 400. The HHO gas distribution harness is shown with a communication line 412, a voltage inverter 414 an audible alarm 416 and a programmable electronic control system (ECS) 410 in communication with a programming unit 404 by the programming lines 406. The ECS 410 optionally communicates with an engine control unit (ECU) 408. The ECS 410 is in communication with several sensors, including a knock sensor 418, an exhaust temperature sensor 420, and an HHO gas temperature sensor 422. In operation, HHO gas is introduced to a regulator 424 via supply line 434 and cooled with engine coolant circulated through engine coolant lines 426. Cooled HHO gas is passed through optional HHO line filter 428 and portions of the HHO gas are introduced to HHO gas injectors 430A-H. The ECS is in electrical communication with the control wiring of the HHO production apparatus, not shown, via line 432.

Figure 5:
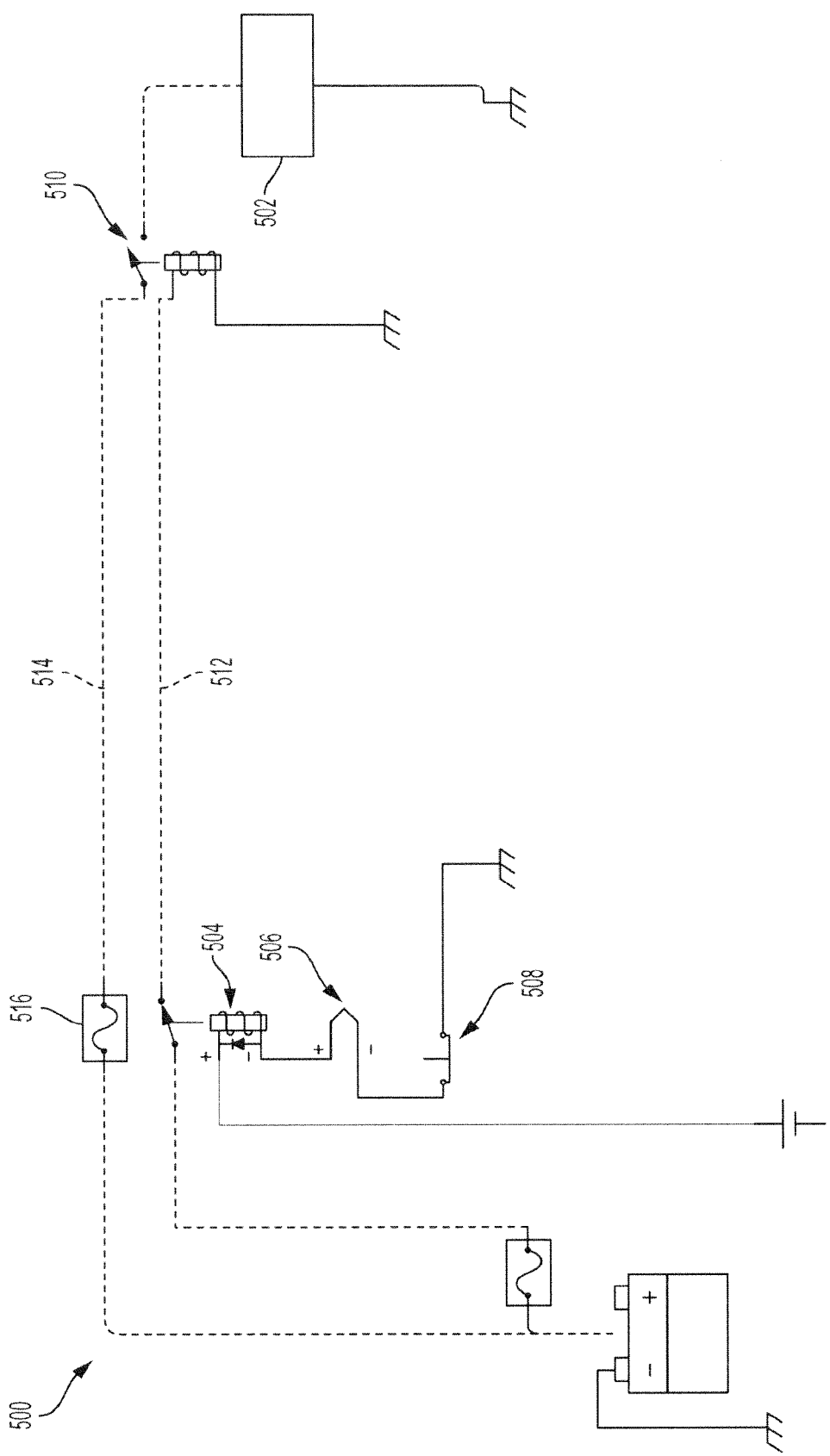
FIG. 5 is a schematic view of a control circuit for a HHO gas production apparatus.

FIG. 5 is a schematic view of a control circuit 500 for a HHO gas production apparatus 502. Control relay 504 is controlled by temperature switch 506 and pressure switch 508. Control relay 504 controls, via control line 512, power relay 510 configured to regulate power to the HHO gas production apparatus 502. Power to the apparatus is passed through a hi-amp breaker 516 and power relay 510 via power line 514.

Figure 6:
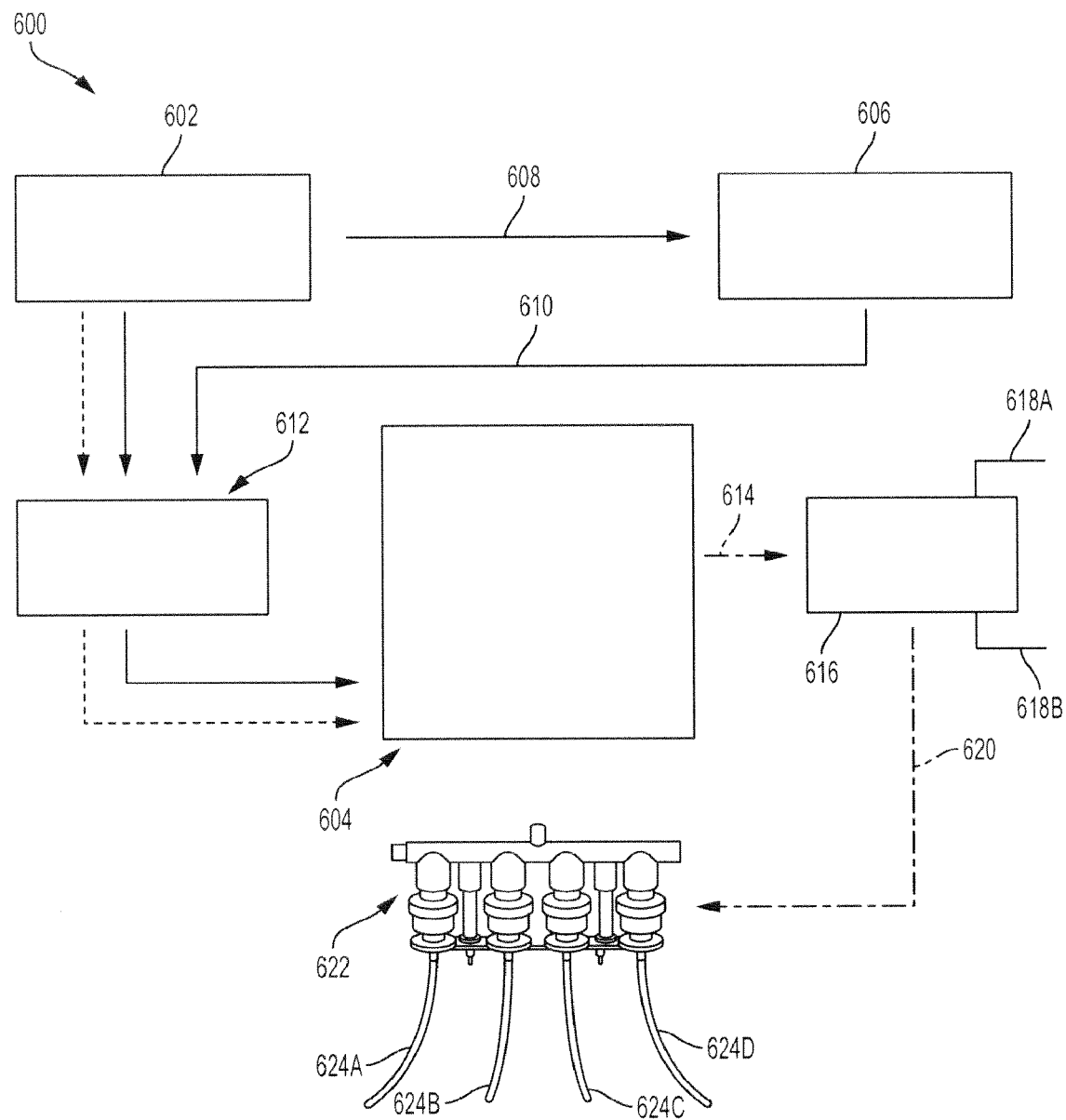
FIG. 6 is a schematic view of an HHO gas delivery system.

FIG. 6 is a schematic view of an HHO gas delivery system 600. In operation, a power source 602 provides power to an HHO gas production apparatus 604 and a central processing unit (CPU) 606. The CPU 606 receives power through an ignition switch controlled line 608. The CPU 606 provides a control signal through a control signal line 610 to a power relay 612 to regulate power to the apparatus 604. HHO gas exits the apparatus 604 through an HHO gas outlet tubing 614 and is passed through the regulator 616 and cooled with engine coolant circulated through engine coolant lines 618 (A&B). Cooled HHO gas is then transmitted through a pressure regulated tubing 620 to an HHO gas injector manifold 622. The HHO gas injector manifold 622 distributes portions of the HHO gas through the set of injectors fitted with injector lances 624A, 624B, 624C, and 624D.

Figure 7:
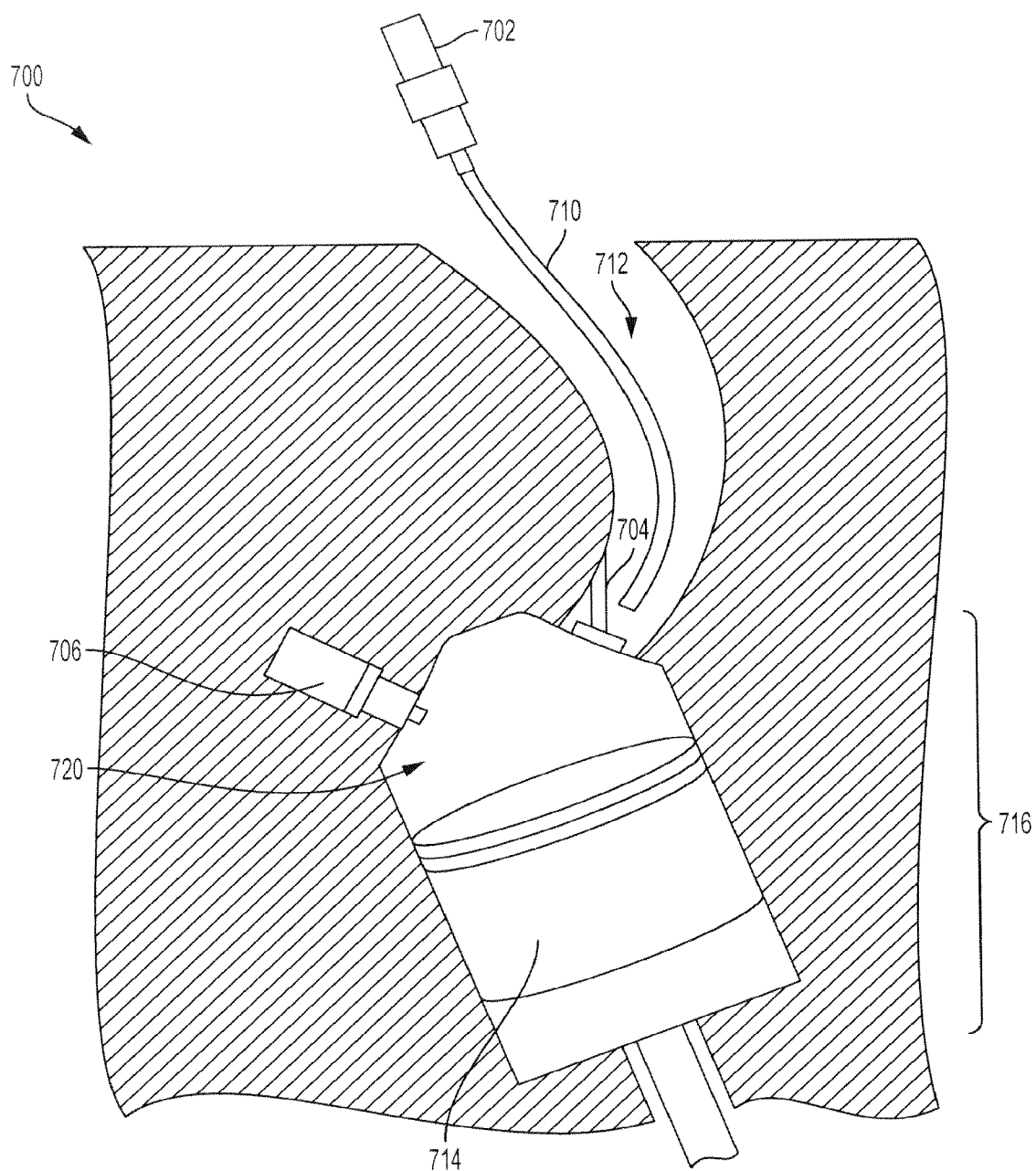
FIG. 7 is a partial cross-sectional view of an intake port equipped with a HHO gas injector and lance.

FIG. 7 is a partial cross-sectional view of an intake port 700. In operation, an HHO injector 702 delivers HHO gas proximate an intake valve 704 of a cylinder 716 through an HHO injector lance 710 positioned in an intake port 712 for the cylinder 716. The primary fuel, for example diesel or gasoline, is fed into the combustion chamber 720 via the fuel injector 706. HHO gas injection is timed relative to the position of the piston 714.

Figure 8:
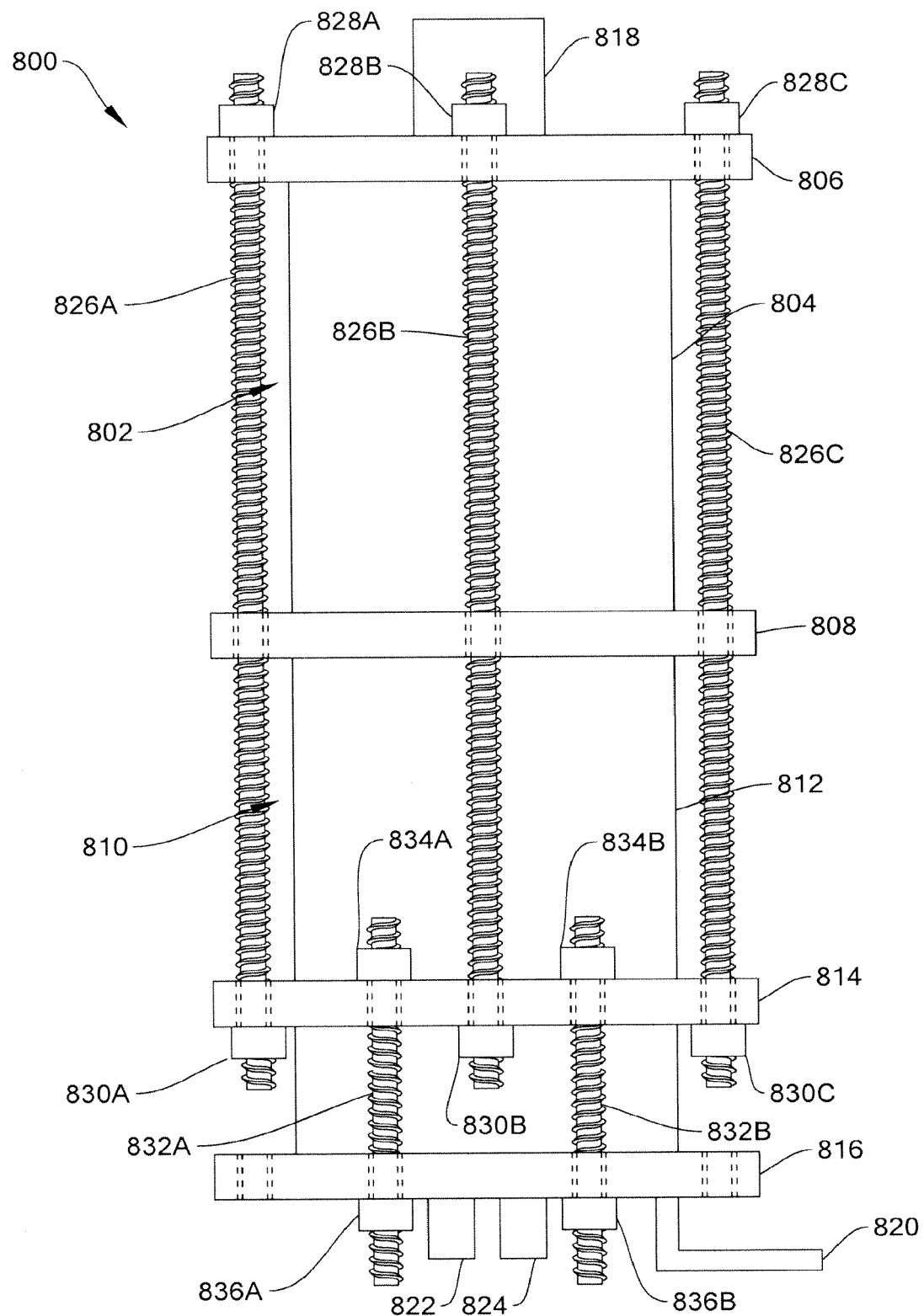
FIG. 8 is a schematic of a dual-chamber HHO gas production apparatus.

FIG. 8 is a schematic of a dual-chamber HHO gas production apparatus 800. An upper chamber 802 configured to contain electrolyte and an HHO vapor space (not shown) comprises a cylindrical member 804 bounded by a top plate 806 and a middle plate 808. A lower chamber 810 configured to contain an electrolysis cell and electrolyte (not shown) comprises a cylindrical member 812 (with a flange member 814) bounded by the middle plate 808 and a bottom plate 816. The top plate comprises an HHO gas collection port 818. The bottom plate 816 comprises an electrolyte inlet/removal port 820 and positive and negative power terminal ports (822 and 824, respectively). First uniform retaining members (or allthreads or all-thread rods) 826A-C are passed through first apertures (not shown) in the top plate 806, middle plate 808, and flange member 814, and fastened with lock nuts 828A-C and 830A-C. Second allthreads or all-thread rods 832A-B are passed through second apertures (not shown) in the flange member 814 and the bottom plate 816 and fastened with lock nuts 834A-B and 836A-B. Not all all-thread rods and lock nuts are shown.

Figure 9:
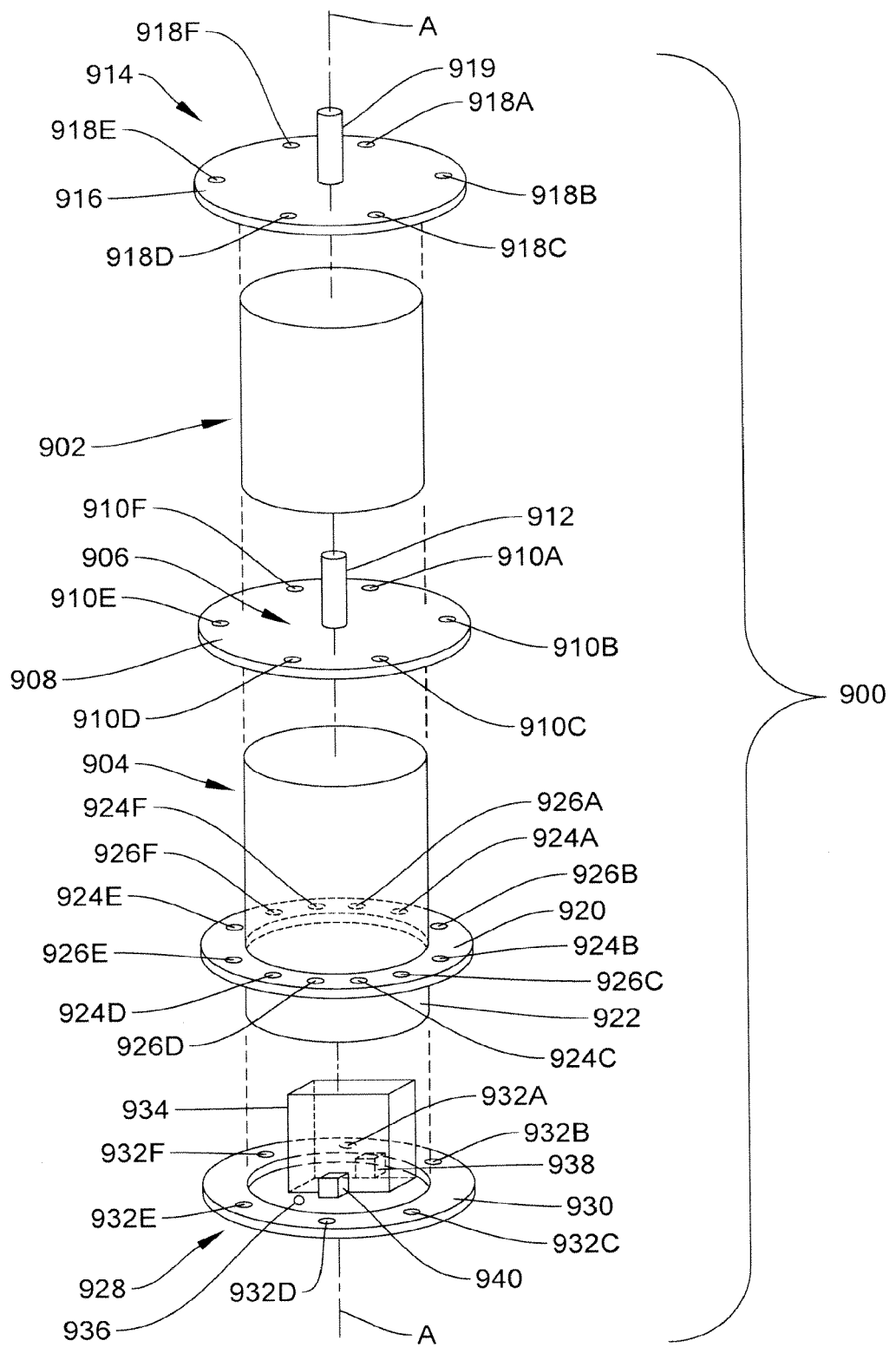
FIG. 9 is a schematic exploded view of a dual-chamber HHO gas production apparatus.

FIG. 9 is a schematic of an exploded view of a dual-chamber HHO gas production apparatus 900. Upper and lower cylindrical members (902 and 904, respectively) are aligned along a central axis A and, when the dual-chamber HHO gas production apparatus is assembled, removably connected to a separator plate 906 comprising a flange 908, the flange 908 having a series of threaded, spaced apart apertures 910A-F configured to receive a first series of allthreads or all-thread rods (not shown). The separator plate 906 has a necked port 912 to provide fluid communication between an upper volume contained by the upper cylindrical member 902 and a lower volume contained by the lower cylindrical member 904. The upper cylindrical member 902 is, when the dual-chamber HHO gas production apparatus is assembled, removably connected to a top plate 914 comprising a flange 916, the flange 916 having a series of threaded, spaced apart apertures 918A-F configured to receive the first series of allthreads or all-thread rods (not shown) and a port 919 for collection of HHO gas. The lower cylindrical member 904 comprises an integral flange 920 and a lower rim 922. The integral flange 920 has a first series of threaded, spaced apart apertures 924A-F configured to receive the first series of allthreads or all-thread rods (not shown). The integral flange 920 also has a second series of threaded, spaced apart apertures 926A-F configured to receive a second series of allthreads or all-thread rods (not shown). The lower rim 922 is, when the dual-chamber HHO gas production apparatus is assembled, removably connected to a bottom plate 928 comprising a flange 930, the flange 930 having a series of threaded, spaced apart apertures 932A-F configured to receive the second series of allthreads or all-thread rods (not shown). An electrolysis cell 934 is secured to the flanged bottom plate 928. The bottom plate 928 is configured with an electrolyte inlet/removal port 936 and positive and negative power terminal ports (938 and 940, respectively). When the dual-chamber HHO gas production apparatus is assembled, spaced apart apertures 918A-F, 910A-F, and 924A-F are aligned to receive the first series of allthreads (or all-thread rods); and spaced apart apertures 926A-F and 932A-F are aligned to receive the second series of allthreads (or all-thread rods).

In certain embodiments, for example, the dual-chamber HHO gas production apparatus may comprise an electrolysis cell having 3 to 10 electrolysis cell plates, for example 5 cell plates. In certain embodiments, for example, each cell plate may be between 20 sq. in. to 30 sq. in. in area, for example 24 sq. in. In certain embodiments, for example, each cell plate may be 4" by 6" in size. In certain embodiments, for example, a housing (a plate holder) may hold the cell plates. In certain embodiments, for example, the housing may be made of a plastic material, for example of nylon 66. In certain embodiments, for example, nylon material may completely surround the cell plates, for example cell plates may be completely enclosed.

In certain embodiments, for example, the electrolysis cell may have holes for aqueous electrolyte solution ingress. In certain embodiments, for example, the HHO gas production apparatus may have 3 to 10 holes, for example 4 holes, or 6 holes. In certain embodiments, for example, each hole may be 0.2" to 1" in diameter, for example 0.5" in diameter.

In certain embodiments, for example, there may be an O-ring seal in a flange of an electrolysis cell. In certain embodiments, for example, the O-ring may be made of elastic material, for example Delrin 400 or a generic acetal.

In certain embodiments, for example, generated HHO gas bubbles may be collected into an orifice extending into a nozzle in the upper chamber of the dual-chamber HHO gas production apparatus. In certain embodiments, for example, the nozzle may be made of corrosion resistant material, for example of stainless steel. In certain embodiments, for example, the nozzle may be designed to direct bubbles into the upper chamber. In certain embodiments, for example, the nozzle may remain below the aqueous electrolyte solution line during operation. In certain embodiments, for example, contact between HHO gas and plate surface (for example contact with platinum coated on the plates) may be avoided. In certain embodiments, for example, aqueous electrolyte solution may flow back down through the nozzle.

In certain embodiments, for example, electrolyte may be added every 3 to 10 months of operation, for example every 6 months of operation. In certain embodiments, for example, electrolyte may be added every 5,000 to 20,000 miles during on-road operation, for example every 10,000 miles.

In certain embodiments, for example, the dual-chamber HHO gas production apparatus may hold electric charge for a long time after shut-off, for example for up to 2 hours after shut-off. In recognition of presence of hydrogen in the HHO gas, in certain embodiments, for example, the dual-chamber HHO gas production apparatus is designed to mitigate damages resulting from any fast pressure rise event, for example from an explosion. In certain embodiments, for example, the system may be equipped with a fool-proof check valve, for example the entire dual-chamber HHO gas production apparatus may cooperate to provide a, minimally destructive, or non-destructive controlled pressure relief system.

In certain embodiments, for example, O-rings in upper and lower chambers and elongated retaining members may be part of the minimally destructive, non-destructive, controlled pressure-relief system. In certain embodiments, for example, one or more of the elongated retaining members (for example, tie rods) may be yielding elongated members, for example one, or two, or all tie rods may be yielding elongated members. In certain embodiments, for example, the yielding elongated members may yield and/or stretch by a large amount, for example by at least $3/16$ of an inch if HHO gas pressure rises quickly (for example to a pressure of 1500 psig or more). In certain embodiments, for example, the yielding elongated members may yield and/or stretch by at least % inch, for example at least % inch, at least % inch, at least 1 inch, at least 2 inches, or the yielding elongated members may stretch by at least 2.5 inches. In certain embodiments, for example, the yielding elongated members may stretch by less than 3 inches, for example less than 2 inches, less than 1 inch, less than % inch, less than % inch, or the yielding elongated members may stretch by less than % inch. In certain embodiments, for example, stretching with the yielding elongated members may create an opening with an area of 2 to 10 sq. inches, for example an area of 2 to 5 sq. inches or 5-10 square inches. In certain embodiments, for example, there may be 2 to 10 yielding elongated members, for example six yielding elongated members. In certain embodiments, for example, the yielding elongated members may be made of steel, for example of 316L stainless steel. In certain embodiments, for example, pressure relief may occur during a period in the range of 0.05 to 2 milliseconds to relieve pressure, for example in the range of 0.05 to 0.075 milliseconds, in the range of 0.075 to 0.1 milliseconds, in the range of 0.1 to 0.25 milliseconds, in the range of 0.25 to 1 milliseconds, or pressure relief may occur during a period of 1 to 2 milliseconds.

In certain embodiments, for example, the yielding elongated members may be forged metal rods with a thread cut into them. In certain embodiments, for example, the thread may be applied along the full length the yielding elongated members. In certain embodiments, for example, the yielding elongated members may be designed to avoid stress risers, for example designed to ensure that the yielding elongated members stretch uniformly. In certain embodiments, for example, the yielding elongated members may be equipped with a washer and a nyloc nut on each end. In certain embodiments, for example, nyloc nuts may be made of stainless steel. In certain embodiments, for example, the yielding elongated members may be assembled with 50 to 100 lb-in of torque, for example 75 lb-in of torque. In certain embodiments, for example, a lubricant may be used on the threads to achieve the correct torque.

In certain embodiments, for example, the upper chamber and the lower chamber may be in fluid communication with each other. In certain embodiments, for example, an ignition source may be in the lower chamber. In certain embodiments, for example, the dual-chamber HHO gas production apparatus may be designed so that no components leave the HHO gas production system during a fast pressure rise. In certain embodiments, for example, the dual-chamber HHO gas production apparatus may be designed so that the weakest links in the system are the yielding elongated members, for example all other components are tougher that the yielding elongated members. In certain embodiments, for example, the HHO gas production system may be designed to accommodate HHO gas pressure of up to 2000 psig, up to 1500 psig, up to 1000 psig, up to 500 psig, or up to 300 psig.

In certain embodiments, for example, the vessel may be used for carrying other liquids and/or munitions besides aqueous electrolyte solution for electrolysis.

In certain embodiments, for example, the system may be scalable. In certain embodiments, for example, the system may be scaled up by increasing a number of the yielding elongated members. In certain embodiments, for example, the system may be scaled up by increasing diameter of the yielding elongated members.

In certain embodiments, for example, the top plate may be 0.2 to 1 inch think, for example 3/8 of an inch thick. In certain embodiments, for example, the top plate may be made of steel, for example of 304 stainless steel. In certain embodiments, for example, the top plate may be made of the same material as the side wall of the electrolysis cell. In certain embodiments, for example, the HHO gas production system may be equipped with one or more O-rings to seal top plate above the side wall. In certain embodiments, for example, there may be a ball valve in the center of the top plate.

In certain embodiments, for example, the middle plate may be dished at an angle to enhance collection of the HHO gas.

In certain embodiments, for example, the HHO gas production system may have a float switch. In certain embodiments, for example, the float switch may open when orientation of the HHO gas production system deviates from vertical by a large amount, for example by 5° off the vertical, or by 10° off the vertical, or by 20° off the vertical, by 30° off the vertical, or by 45° off the vertical or in a range of between 10° to 45° off the vertical, for example, in a range of between 10° to 25° off the vertical. In certain embodiments, for example, the float switch may operate like a Hall Effect switch. In certain embodiments, for example, the float switch may have wires attached to it, for example three wires. In certain embodiments, for example, the wires may include one voltage in wire, and two voltage out wires (i.e., wires for thermal and float). In certain embodiments, for example, an anti-slosh device may hold the float. In certain embodiments, for example, the float switch may be guided by a centering rod.

In certain embodiments, for example, the HHO gas production system may be equipped with a controller. In certain embodiments, for example, the controller may have a touch-screen display. In certain embodiments, for example, the controller may have 100 to 1000 wire plugs, for example 237 wire plugs. In certain embodiments, for example, the controller may be able to communicate with the engine control module (ECM). In certain embodiments, for example, the controller may use OEM sensors, for example a flywheel based OEM sensor for rpm measurement.

In certain embodiments, for example, the HHO gas production system may generate very little power drop on the ECM side (for example the ECM may not notice a presence of the system). In certain embodiments, for example, the controller may connect directly to the OEM sensors. In certain embodiments, for example, sensors may include a fuel injector sensor, an rpm (crank) sensor, and MAP (manifold air pressure) sensor.

In certain embodiments, for example, the HHO gas production system may be used as a retrofit device. In certain embodiments, for example, the HHO gas production system may have fuel maps. In certain embodiments, for example, the HHO gas production system optionally may connect to the ECM. In certain embodiments, for example, the HHO gas production system may not require modification of factory computer software. In certain embodiments, for example, the HHO gas production system may be designed to inject only a small amount of HHO gas into an engine, for example so small that the ECM does not notice system's presence. In certain embodiments, for example, a limit for amount of HHO gas injection may be 10% to 30% of HHO gas, for example 18% of HHO gas, or 26% of HHO gas.

Figure 10:
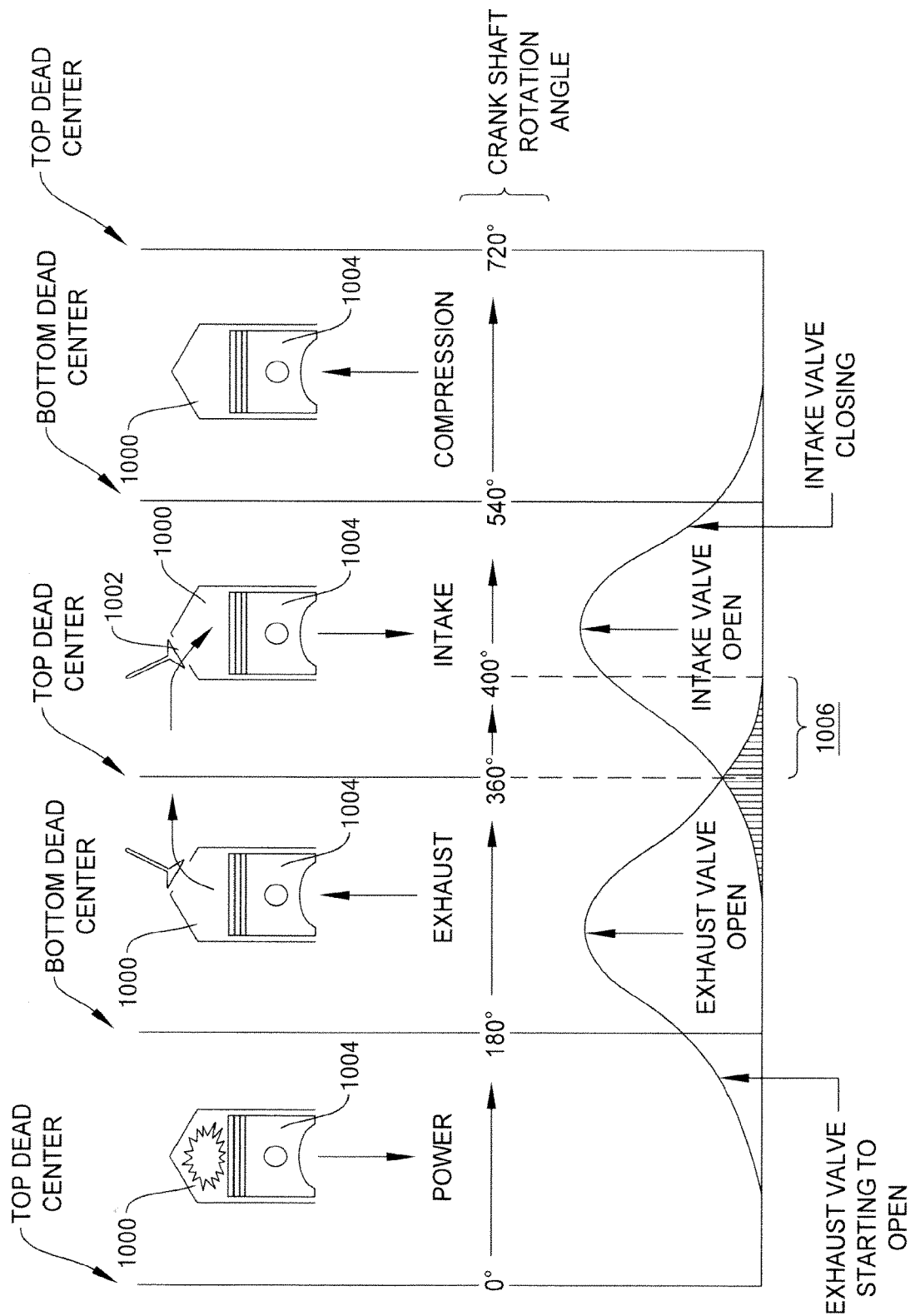
FIG. 10 is a schematic depiction of a combustion cycle.

FIG. 10 schematically depicts a combustion cycle within a combustion chamber 1000 of a representative cylinder of a four-stroke internal combustion engine. At the start of the cycle, the piston 1004 is at approximately Top Dead Center of a crankshaft rotation, and compressed fuel ignites in the presence of HHO gas and expands in a power stroke to drive the piston 1004 downward until the crankshaft rotates through 180° and brings the piston to Bottom Dead Center as shown. At the bottom of the power stroke, the exhaust valve opens and the upward stroke of the piston 1004 drives the exhausted fuel out of the combustion chamber 1000, bringing the crankshaft to a rotation of 360°. During the intake stroke, the piston moves downward and the crankshaft rotates from 360° to 540°, drawing a fresh charge of air through an air intake valve 1002. During a 1-3 ms portion of the intake stroke when the crankshaft rotates through a stroke range of between 360° to 400° 1006, HHO gas is injected with the fresh charge of air. The HHO gas injection may be continuous over the stroke range or may be pulsed. The 1-3 ms portion of the intake stroke may be in the range of 1-1.5 ms, 1.5-2 ms, or 2-3 ms). Once the intake stroke is completed, the HHO gas and air are compressed until the crankshaft rotates through 720°, followed by a new power cycle.

While FIG. 10 describes an embodiment of the invention, other variations fall within scope of the disclosure. In certain embodiments, for example, HHO gas may be injected when the crankshaft rotates through a stroke range of between 360° to 540°, for example between 360° to 500°, between 360° to 450°, between 360° to 425°, between 360° to 395°, between 360° to 390°, between 360° to 380°, between 365° to 500°, between 365° to 450°, between 365° to 425°, between 365° to 395°, between 365° to 390°, between 365° to 380°, between 380° to 500°, between 380° to 450°, between 380° to 425°, between 380° to 395°, between 380° to 390°, between 400° to 500°, between 400° to 450°, or between 400° to 425°, between 425° to 500°, between 425° to 450°, or HHO gas may be injected when the crankshaft rotates through a stroke range of between 450° to 500°. In certain embodiments, for example, the HHO gas injection may be continuous throughout the stroke range. In certain embodiments, for example, the HHO gas injection may be pulsed throughout the stroke range.

In certain embodiments, for example, HHO gas injectors may have metal tubes, for example copper tubes, to carry HHO gas to the engine. In certain embodiments, for example, the ends of tubes may be soldered shut. In certain embodiments, for example, an orifice may be drilled in the soldered end of the tube. In certain embodiments, for example, the orifice diameter may be 10 to 50 thousands of an inch in diameter (for example 16 thousands of an inch in diameter).

In certain embodiments, for example, HHO gas injectors may be connected in a daisy chain on the power side. In certain embodiments, for example, HHO gas injectors may take 1 to 20 milliamps of electric current, for example 5 milliamps of electric current. In certain embodiments, for example, the power may be turned on for 1 to 3 milliseconds every engine cylinder cycle, for example for 1.35 milliseconds. In certain embodiments, for example, HHO gas injection may be timed with respect to the engine intake valve opening.

In certain embodiments, for example, copper tubes may be passed through the wall of the intake manifold. In certain embodiments, for example, copper tubes may be free floating inside the intake manifold. In certain embodiments, for example, one or more openings may be drilled in an intake manifold or in a valve cover of the engine, for example to assist with an installation of the tubes. In certain embodiments, for example, each opening may be 5 to 50 mm in diameter, for example 10 mm in diameter.

Figures 11A, 11B, 11C:
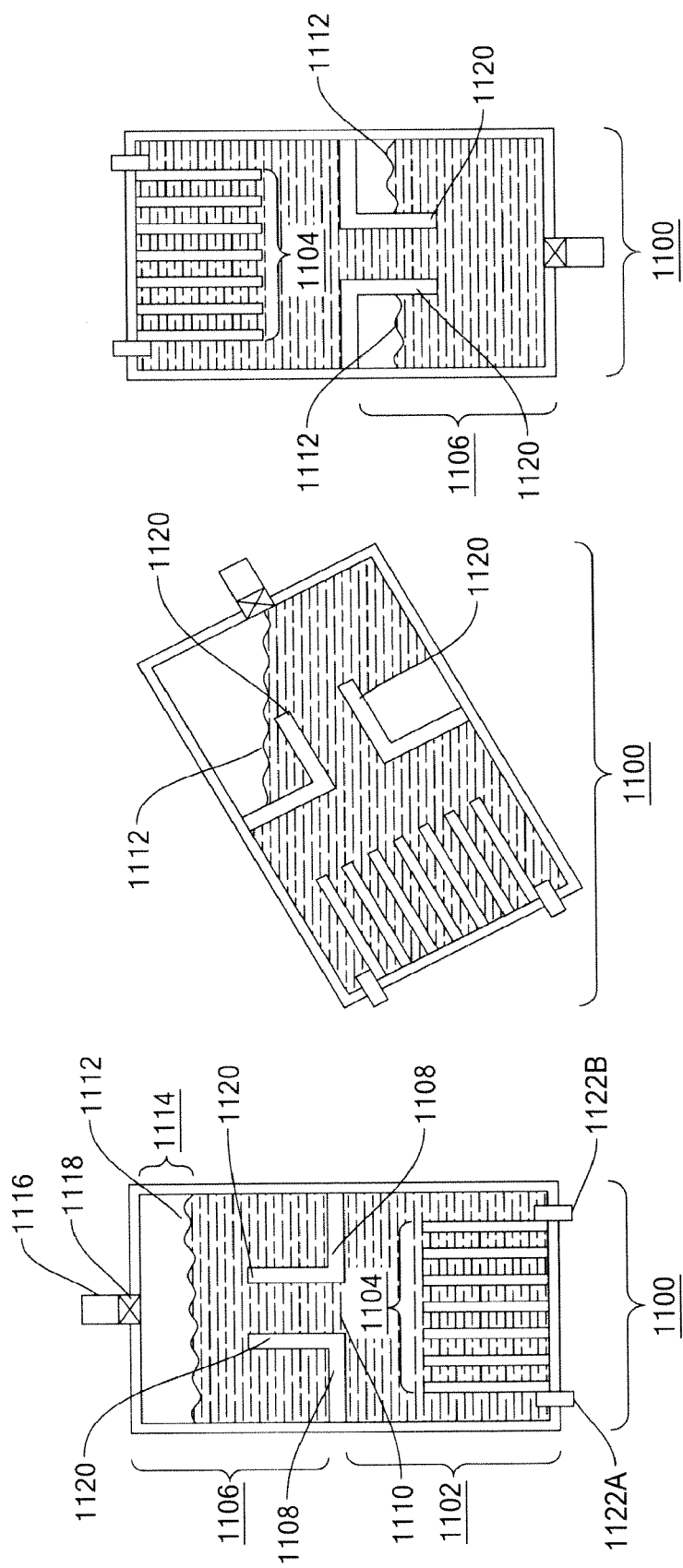
FIGS. 11(A-C) are a schematic depiction of a rollover-safe electrolysis unit in various orientations.

FIGS. 11(A-C) schematically depict a cylindrical dual chamber vessel in various orientations, the dual chamber vessel having a rollover abatement system. FIG. 11A depicts the vessel 1100 in an upright orientation. A lower chamber 1102 is completely filled with electrolyte and has electrolysis plates 1104 with power connectors 1122A and 1122B disposed therein. The lower chamber 1102 and an upper chamber 1106 are separated by a middle plate 1108, the middle plate 1108 defining an orifice 1110 though which electrolyte and HHO gas may be communicated between the chambers. The upper chamber 1106 is filled with electrolyte up to a predetermined level above the middle plate 1108, and at the predetermined level the electrolyte defines a free surface 1112 that contacts HHO gas in a vapor space 1114 above the electrolyte. HHO gas is released from the vapor space 1114 under controlled conditions through an outlet 1116 equipped with a check valve 1118. The middle plate 1108 is equipped with a rollover abatement nozzle 1120 configured to provide a liquid seal to the lower chamber 1102 under any orientation of the dual chamber vessel 1100, provided that the predetermined level of electrolyte in the upper chamber 1106 is maintained at a minimum height above the nozzle 1120 in the upright orientation as described further herein. FIG. 11B shows the vessel 1100 tilted at an approximately 45° angle to the right. As shown, the free surface 1112 remains above a distal end of the nozzle 1120, and the lower chamber remains under liquid seal. FIG. 11C shows the vessel 1100 fully inverted. As shown, the distal end of the nozzle 1120 now penetrates the free surface 1112, thereby maintaining a liquid seal of the lower chamber. Of note, the electrolysis plates 1104 are immersed in electrolyte and isolated from the HHO gas, which HHO gas is retained in the upper chamber 1106 above the free surface 1112 as shown.

Certain embodiments may provide, for example, a second fuel for improving the performance of an internal combustion engine. In certain embodiments, for example, the internal combustion engine may be a light duty high speed diesel engine, a light heavy-duty diesel engine, a medium duty diesel engine, a medium heavy-duty diesel engine, a heavy heavy-duty diesel engine, a nonroad engine, a stationary engine, a locomotive engine, a marine engine, an aircraft engine, a generator set engine, a spark-ignition engine, a compression-ignition engine, nonroad compression-ignition engine, a naturally aspirated engine, a turbocharged engine, a turbocompound engine, a supercharged engine, a direct injection engine, an indirect injection engine, a port injection engine, a gasoline engine, a diesel engine, an ethanol engine, a methanol engine, a biofuel engine, a natural gas engine, a propane engine, or an alternative fuel engine.

In certain embodiments, for example, the internal combustion engine may provide power to one or more vehicles or gensets. In certain embodiments, for example, one of the one or more vehicles may be a passenger car, a light duty vehicle, a medium duty passenger vehicle, a truck (for example a passenger truck or a delivery truck), a light duty truck, a medium duty truck, a heavy duty truck, an urban bus, a motorcycle, a passenger car, a four tire single unit vehicle, a bus, a two axle six tire single unit vehicle, a three axle single unit vehicle, a four or more axle single unit vehicle, a four or less axle single trailer vehicle, a five axle tractor semitrailer, a six or more axle singe trailer, a five or less axle multi-trailer, a six axle multi-trailer, a seven or more axle multi-trailer, a Class 1 vehicle, a Class 2 vehicle, a Class 3 vehicle, a Class 4 vehicle, a Class 5 vehicle, a Class 6 vehicle, a Class 7 vehicle, a Class 8 vehicle (for example a Class 8 truck), a Class 9 vehicle, a Class 10 vehicle, a Class 11 vehicle, a Class 12 vehicle, a Class 13 vehicle a Category M vehicle, a Category M1 vehicle, a Category M2 vehicle, a Category M3 vehicle, a Category N1-I vehicle, a Category N1-II vehicle, a Category N1-III vehicle, a Category N2 vehicle, a Category N3 vehicle, a road vehicle, an offroad vehicle, a vessel, a boat, a marine vehicle (for example a pleasure boat), or an aircraft. In certain embodiments, for example, the one of many gensets may be a residential genset or a commercial genset or an industrial genset or a genset equipped with a 4-cylinder engine, or a 6-cylinder engine or between a 6-20 cylinder engine, or a 8-cylinder engine or from an 8- to 12-cylinder engine and the engine may be a mixed fuel engine, a diesel engine, a gasoline engine, and/or a natural gas engine.

In certain embodiments, for example, the vehicle may be a Class 8 truck comprising a heavy duty diesel engine. In certain further embodiments, for example, the heavy duty diesel engine may have a displacement in the range of 11-16 liters, for example in the range of 14-15 liters. In certain further embodiments, for example, the heavy duty diesel engine may have an engine speed of at least 1800 rpm, for example 2100 rpm. In certain further embodiments, for example, the heavy duty diesel engine may provide 1600-2000 ft-lb peak torque. In certain further embodiments, for example, the heavy duty diesel engine may be sized to produce 430-500 hp.

In certain embodiments, for example, the vehicle may be a delivery truck comprising a medium duty diesel engine. In certain further embodiments, for example, the medium duty diesel engine may be a 6 cylinder inline engine. In certain embodiments, for example, the medium duty diesel engine may have a displacement in the range of 6-11 liters.

In certain embodiments, for example, the vehicle (for example a Dodge Ram truck or a Ford F150 truck) may be a light truck comprising a light duty high speed diesel engine. In certain further embodiments, for example, the light duty high speed diesel engine may have a displacement in the range of 2-6 liters. In certain embodiments, for example, the light duty high speed diesel engine may have an engine speed of 4000-4500 rpm. In certain embodiments, for example, the light duty high speed diesel engine may be sized to produce 200-250 hp. In certain embodiments, for example, the light duty high speed diesel engine may be a 6-cylinder inline engine, a V6 engine, or a V8 engine.

In certain embodiments, for example, the vehicle may be a pleasure boat comprising an internal combustion engine having a displacement in the range of 4-20 liters, for example a displacement in the range of 4-8 liters, or the internal combustion engine having a displacement in the range of 8-18 liters.

In certain embodiments, for example, the engine may be a generator set engine having a displacement in the range of 6-60 liters. In certain further embodiments, for example, the generator set engine may be a V8, V12, V16, or V20 engine having an engine displacement of 2-6 liters per cylinder. In certain embodiments, for example, the generator set engine may be sized to produce more than 1000 hp, for example the generator set engine may be sized to produce 1000-2000 hp.

Certain embodiments may provide, for example, an electrolysis cell. In certain embodiments, for example, the electrolysis cell may comprise a pressure-resistant container. In certain further embodiments, for example, the pressure-resistant container may be configured and optionally rated to maintain a pressure in excess of 25 psig, for example a pressure in excess of 50 psig, in excess of 75 psig, in excess of 100 psig, or the pressure-resistant container may be configured and optionally rated to maintain a pressure in excess of 150 psig. In certain embodiments, for example, the pressure-resistant container may be configured and optionally rated to maintain a pressure of up to 100 psig, a pressure of up to 125 psig, up to 150 psig, or the pressure-resistant container may be configured and optionally rated to maintain a pressure of up to 200 psig.

In certain embodiments, for example, the electrolysis cell may further comprise a pressure relief valve configured to open when a pressure of gas inside the container exceeds 25 psig, for example a pressure in excess of 50 psig, in excess of 80 psig, in excess of 100 psig, in excess of 150 psig, or the electrolysis cell may further comprise a pressure relief valve configured to open when a pressure of gas inside the container exceeds 200 psig.

In certain embodiments, for example, the electrolysis cell may further comprise a first defined space may be configured to hold a volume of an aqueous electrolyte solution. In certain embodiments, for example, the first defined space may be configured to hold a volume of the electrolyte solution to supply a sufficient amount of HHO gas for at least 1 day of operation of a host engine (i.e., an engine or engines the electrolysis cell is supplying second fuel to), for example at least 2 days of operation, at least 1 week of operation, at least 2 weeks of operation, at least 3 weeks of operation, at least 1 month of operation, at least 2 months of operation, at least 3 months of operation, or the first defined space may be configured to hold a volume of the electrolyte solution to supply a sufficient amount of HHO gas for at least 6 months of operation of the host engine.

In certain embodiments, for example, the first defined space may be configured to hold a volume of electrolyte solution to supply HHO gas to a truck for at least 200 miles of driving, for example at least 400 miles of driving, at least 800 miles of driving, at least 1,200 miles of driving, at least 5,000 miles of driving, at least 10,000 miles of driving, at least 20,000 miles of driving, or the first defined space may be configured to hold a volume of electrolyte solution to supply HHO gas to a truck for at least 30,000 miles of driving. In certain embodiments, for example, the first defined space may be configured to hold a volume of electrolyte solution to supply HHO gas to a truck for at least 400,000 crankshaft rotations, for example at least 800,000 crankshaft rotations, at least 1,600,000 crankshaft rotations, at least 2,400,000 crankshaft rotations, at least 10,000,000 crankshaft rotations, at least 20,000,000 crankshaft rotations, at least 40,000,000 crankshaft rotations, or the first defined space may be configured to hold a volume of electrolyte solution to supply HHO gas to a truck for at least 60,000,000 crankshaft rotations.

In certain embodiments, for example, the second defined space may not be integrated into the high-pressure container where the HHO gas generator is housed. The second defined space may be a separate high-pressure housing configured to receive HHO gas or be detachably connected to the HHO generator (for example for remote or portable delivery). In certain embodiments, for example, the separate second defined space may serve as an additional storage of HHO gas, a primary storage or secondary storage for HHO gas. In certain embodiments, for example, the solution may comprise water and one or more electrolytes. In certain further embodiments, for example, the one or more electrolytes may comprise a metal salt, such as a metal salt at least partially soluble in water. In certain embodiments, for example, the one or more electrolytes may be selected from the group consisting of: KOH, NaOH, $Na_2CO_3$, $NaHCO_3$, NaCl, $K_2CO_3$, $KHCO_3$, $H_2SO_4$, $CH_3COOH$, and a combination of two or more thereof.

In certain embodiments, for example, the first defined space may be configured to hold at least 1-quart of the electrolyte solution, for example at least ½ gallon, at least 1 gallon, or the first defined space may be configured to hold at least 5 gallons of the electrolyte solution.

In certain embodiments, for example, the electrolyte solution may comprise an aqueous electrolyte solution with a concentration of one or more electrolytes of less than 5 vol. % (in total) relative to the total volume of the electrolyte solution, for example less 4 vol. %, less than 3 vol. %, less than 2 vol. %, less than 1 vol. %, less than 0.5 vol. %, less than 0.4 vol. %, less than 0.35 vol. %, less than 0.3 vol. %, less than 0.25 vol. %, less than 0.2 vol. %, or the electrolyte solution may comprise an aqueous electrolyte solution with a concentration of one or more electrolytes of less than 0.1 vol. % (in total) relative to the total volume of the electrolyte solution. In certain embodiments, for example, the electrolyte solution may comprise an aqueous electrolyte solution with a concentration of one or electrolytes in the range of 0.1-5 vol. %, for example in the range of 0.5-3 vol. %, in the range of 1.5-3 vol. %, in the range of 0.1-1 vol. %, in the range of 0.1-0.5 vol. %, in the range of 0.2-0.4 vol. %, or the electrolyte solution may comprise an aqueous electrolyte solution with a concentration of electrolyte in the range of 0.25-0.35 vol. % (in total) relative to the total volume of the aqueous electrolyte solution. In certain embodiments, for example, the aqueous electrolyte solution may comprise an aqueous electrolyte solution with a concentration of one or more electrolytes of less than 5 wt. % (in total) relative to the total weight of the aqueous electrolyte solution, for example less 4 wt. %, less than 3 wt. %, less than 2 wt. %, less than 1 wt. %, less than 0.5 wt. %, less than 0.4 wt. %, less than 0.35 wt. %, less than 0.3 wt. %, less than 0.25 wt. %, less than 0.2 wt. %, or the aqueous electrolyte solution may comprise an aqueous electrolyte solution with a concentration of one or more electrolytes of less than 0.1 wt. % (in total) relative to the total weight of the aqueous electrolyte solution. In certain embodiments, for example, the aqueous electrolyte solution may comprise an aqueous electrolyte solution with a concentration of one or electrolytes in the range of 0.1-5 wt. %, for example in the range of 0.5-3 wt. %, in the range of 1.5-3 wt. %, in the range of 0.1-1 wt. %, in the range of 0.1-0.5 wt. %, in the range of 0.2-0.4 wt. %, or the aqueous electrolyte solution may comprise an aqueous electrolyte solution with a concentration of electrolyte in the range of 0.25-0.35 wt. % (in total) relative to the total weight of the aqueous electrolyte solution.

In certain embodiments, for example, the aqueous electrolyte solution may have a pH in the range of 3-11, for example a pH in the range of 4-10, in the range of 5-9, in the range of 6-9, in the range of 7-9, in the range of 3-4, in the range of 4-5, in the range of 5-6, in the range of 6-7, in the range of 7-8, in the range of 8-9, or the aqueous electrolyte solution may have a pH in the range of 7.75-8.25.

In certain embodiments, for example, the one or more electrolytes may be selected from the group consisting of: KOH, NaOH, $Na_2CO_3$, $NaHCO_3$, NaCl, $K_2CO_3$, $KHCO_3$, $H_2SO_4$, $CH_3COOH$, and a combination of two or more thereof. In certain further embodiments, for example, the electrolysis cell may comprise an electrolyte solution, wherein the concentration of one or more electrolytes present in the aqueous electrolyte solution may be selected, maintained, and/or adjusted to provide an average (or maximum) current draw of less than 20 amps (for example less than 10 amps) at the operating voltage and temperature of the electrolysis cell. In certain further embodiments, for example, the electrolyte concentration may be lower than the concentration of electrolyte a conventional electrolysis cell. In certain embodiments, for example, the aqueous electrolyte solution may be exclusive of sulfuric acid. In certain embodiments, for example, the electrolysis cell may be operated continuously (for example without pulsed width modulation) for a period of time (for example at least 10 minutes, at least 30 minutes, at least 1 hour, or indefinitely) without overheating, for example without heating to a temperature in excess of 65° C. In certain further embodiments, for example, an ability to operate the electrolysis cell continuously without overheating may be due at least in part to a low electrolyte concentration in the aqueous electrolyte solution and/or a current draw of less than 15 amps (for example less than 10 amps). In certain embodiments, for example, the aqueous electrolyte solution may comprise a low quantity of potassium carbonate (for example 0.3 wt. % potassium carbonate) and have a pH in the range of 7-8.

In certain embodiments, for example, the electrolysis cell may further comprise a plurality of electrolysis plates. In certain further embodiments, for example, the plurality of electrolysis plates may comprise in the range of 5-15 plates, for example in the range of 7-12 plates, or the plurality of electrolysis plates may comprise in the range of 5-8 plates.

In certain embodiments, for example, each of the plurality of electrolysis plates may have a thickness in the range of 0.25-3 mm, for example in the range of 0.5-2.5 mm, or the plurality of electrolysis plates may have a thickness in the of 1-2 mm.

In certain embodiments, for example, a first one of the plurality of electrolysis plates may be disposed at a distance in the range of 0.25-8 mm from a second adjacent one of the plurality of plates, for example a first one of the plurality of electrolysis plates may be disposed at a distance in the range of 0.5-3 mm from a second adjacent one of the plurality of plates.

In certain embodiments, for example, the plates may comprise (for example be composed of or be partially or completely coated with) a material that is composed of or comprises a highly conductive and low corrosivity material, for example a material with a higher conductivity higher than 304 stainless steel and a corrosivity in the electrolyte environment of about the same or less than 304 stainless steel. In certain embodiments, for example, at least a portion of at least one surface of at least one of the plurality of electrolysis plates may comprise platinum, titanium, iridium, brass, gold, nickel alloy, silver, graphene or a combination of one or more thereof. In certain embodiments, for example, at least one of the electrode plates (for example all of the electrode plates) may comprise a first material coated on a second material. In certain embodiments, for example, the first material may comprise platinum, titanium, iridium, brass, gold, nickel alloy, silver, steel (for example stainless steel), or graphene and the second material may comprise platinum, titanium, iridium, brass, gold, nickel alloy, silver, steel (for example stainless steel), or graphene. In certain embodiments, for example, the at least one of the electrode plates (for example all of the electrode plates) may comprise iridium coated on titanium (or stainless steel). In certain embodiments, for example, the at least one of the electrode plates (for example all of the electrode plates) may comprise graphene coated on titanium (or stainless steel).

In certain embodiments, for example, the plurality of plates may be configured as a stack of approximately parallel plates in fixed relation comprising two end plates and remaining plates spaced an approximately equal distance between adjacent plates. In certain further embodiments, for example, the positive terminal may be attached to one of the end plates and the negative terminal may be attached to the other of the end plates. In certain embodiments, for example, the plurality of electrolysis plates may be fully immersed in the aqueous electrolyte solution. In certain embodiments, for example, the positive terminal and the negative terminal may be in electrical and or electrochemical communication only or at least substantially through the plurality of plates and electrolyte solution present in the regions between adjacent plates. In certain embodiments, for example, electrical and/or electrochemical communication through the plurality of plates and electrolyte solution present in the regions between adjacent plates may be increased (for example maximized) by insulating a portion of the plurality of plates, for example by seating the stack of plates in a slot of the pressurized container and/or at least partially isolating the fluid situated between adjacent plates in a plate stack with spacers, gaskets, and or sealants between the adjacent plates.

In certain embodiments, for example, the electrolysis cell may comprise cooling coils in the first defined space, whereby heat may be removed from the aqueous electrolyte solution.

In certain embodiments, for example, the electrolysis cell may store air-free HHO gas and/or air-free HHO gas may be injected at one or more points about an internal combustion engine. In certain embodiments, for example the stored and/or injected air-free HHO gas may contain less than 5 wt. % air, less than 1 wt. % air, less than 1000 ppm air, less than 500 ppm air, less than 250 ppm air, or less than 100 ppm air.

In certain embodiments, for example, the electrolysis cell may comprise a second defined space provisioned to contain and/or store HHO gas. In certain further embodiments, for example, the second defined space may contain and/or store air-free HHO gas. In certain embodiments, for example, the second defined space may have a volume of at least 1 quart, at least 2 quarts, at least 1 gallon, at least 2 gallons, at least 5 gallons, at least 10 gallons, or the second defined space may have a volume of at least 25 gallons. In certain embodiments, for example, the second defined space may have a volume of less than 1 gallon, less than 5 gallons, less than 10 gallons, or the second defined space may have a volume of less than 25 gallons. In certain embodiments, for example, the HHO gas may degrade, be changed, and/or be less effective (for example be at least partially reacted or quenched) by exposure to air. In certain embodiments, for example, the HHO may be stored air-free (or at least substantially air-free) for at least 2 weeks (for example at least 1 month) without any noticeable change in performance when used as a second fuel in the internal combustion engine. In certain embodiments, Certain embodiments may provide, for example, an apparatus for providing HHO gas for an internal combustion engine, comprising: an electrolysis cell for generating the HHO gas, and a gas flow regulator configured to start and stop a flow of the HHO gas from the electrolysis cell to a plurality of injectors of the internal combustion engine. In certain further embodiments, for example, a gas exiting the gas pressure regulator may be controlled to have a temperature of greater than 35° C., for example of greater than 40° C., of greater than 50° C., of greater than 60° C., or the gas exiting the gas pressure regulator may be controlled to have a temperature of greater than 70° C.

In certain further embodiments, for example, a gas exiting the gas pressure regulator may be controlled to have a temperature of less than 90° C., for example less than 80° C., less than 70° C., less than 60° C., or the gas exiting the gas pressure regulator may be controlled to have a temperature less than 45° C. In certain further embodiments, for example, a gas exiting the gas pressure regulator may be controlled to have a temperature in the range of 5-80° C., for example in the range of 10-80° C., in the range of 5-75° C., in the range of 10-70° C., in the range of 10-60° C., in the range of 10-55° C., in the range of 20-80° C., in the range of 10-80° C., of less than 90° C., for example less than 80° C., less than 70° C., less than 60° C., or the gas exiting the gas pressure regulator may be controlled to have a temperature less than 45° C.

Certain embodiments may provide, for example, an apparatus for providing HHO gas for an internal combustion engine, comprising: an electrolysis cell for generating the HHO gas, and a gas distribution harness comprising a plurality of lances configured to deliver the HHO gas to a plurality of intake ports of the internal combustion engine. In certain embodiments, for example, the number of the plurality of lances may be equal to a number of the plurality of the injectors. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of a an air flow port of a cylinder of a plurality of cylinders of the internal combustion engine, the at least a second outlet may be positioned within 3 inches (for example within 1.5 inches, within 1 inch, within 0.5 inches, within 0.25 inches, within 0.125 inches, or the at least second outlet may be positioned within 0.1 inches) of an air flow port of a second cylinder of the plurality of cylinders, and the at least a third outlet may be positioned within 3 inches (for example within 1.5 inches, within 1 inch, within 0.5 inches, within 0.25 inches, within 0.125 inches, or the at a least third outlet may be positioned within 0.1 inches) of an air flow port of a third cylinder of the plurality of cylinders. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of an engine valve seat of a plurality of engine valve seats of the internal combustion engine, the at least a second outlet may be positioned within 3 inches (for example within 1.5 inches, within 1 inch, within 0.5 inches, within 0.25 inches, within 0.125 inches, or the at least a second outlet may be positioned within 0.1 inches) of a second engine valve seat of the plurality of engine valve seats, and the at least a third outlet may be positioned within 3 inches (for example within 1.5 inches, within 1 inch, within 0.5 inches, within 0.25 inches, within 0.125 inches, or the at least a third outlet may be positioned within 0.1 inches) of a third engine valve seat of the plurality of engine valve seats. In certain embodiments, for example, the at least one outlet may be positioned within 3 inches (for example within 1.5 inches, within 1 inch, within 0.5 inches, within 0.25 inches, within 0.125 inches, or the at least one outlet may be positioned within 0.1 inches) of an orifice of an intake value of a cylinder of a plurality of cylinders of the internal combustion engine, the at least a second outlet may be positioned within 3 inches (for example within 1.5 inches, within 1 inch, within 0.5 inches, within 0.25 inches, within 0.125 inches, or the at least second outlet may be positioned within 0.1 inches) of an orifice of an intake valve of a second cylinder of the plurality of cylinders, and the at least a third outlet may be positioned within 3 inches (for example within 1.5 inches, within 1 inch, within 0.5 inches, within 0.25 inches, within 0.125 inches, or the at least a third outlet may be positioned within 0.1 inches) of an orifice of an intake valve of a third cylinder of the plurality of cylinders.

Certain embodiments may provide, for example, an apparatus for providing HHO gas for an internal combustion engine, comprising: an electrolysis cell for generating the HHO gas, and a gas distribution harness comprising a plurality of lances configured to deliver the HHO gas to a plurality of intake ports of the internal combustion engine. In certain embodiments, for example, the number of the plurality of lances may be equal to a number of the plurality of the injectors. In certain embodiments, for example, at least one lance of the plurality of lances may comprise at least one outlet, at least a second lance of the plurality of lances may comprise at least a second outlet, and at least a third lance of the plurality of lances may comprise at least a third outlet. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an air flow port of a cylinder of a plurality of cylinders of the internal combustion engine, the at least a second outlet may be positioned within 3 cm (for example within 1.5 cm, within 1 cm, within 0.5 cm, within 0.25 cm, within 0.125 cm, or the at least second outlet may be positioned within 0.1 cm) of an air flow port of a second cylinder of the plurality of cylinders, and the at least a third outlet may be positioned within 3 cm (for example within 1.5 cm, within 1 cm, within 0.5 cm, within 0.25 cm, within 0.125 cm, or the at a least third outlet may be positioned within 0.1 cm) of an air flow port of a third cylinder of the plurality of cylinders. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an engine valve seat of a plurality of engine valve seats of the internal combustion engine, the at least a second outlet may be positioned within 3 cm (for example within 1.5 cm, within 1 cm, within 0.5 cm, within 0.25 cm, within 0.125 cm, or the at least a second outlet may be positioned within 0.1 cm) of a second engine valve seat of the plurality of engine valve seats, and the at least a third outlet may be positioned within 3 cm (for example within 1.5 cm, within 1 cm, within 0.5 cm, within 0.25 cm, within 0.125 cm, or the at least a third outlet may be positioned within 0.1 cm) of a third engine valve seat of the plurality of engine valve seats. In certain embodiments, for example, the at least one outlet may be positioned within 3 cm (for example within 1.5 cm, within 1 cm, within 0.5 cm, within 0.25 cm, within 0.125 cm, or the at least one outlet may be positioned within 0.1 cm) of an orifice of an intake value of a cylinder of a plurality of cylinders of the internal combustion engine, the at least a second outlet may be positioned within 3 cm (for example within 1.5 cm, within 1 cm, within 0.5 cm, within 0.25 cm, within 0.125 cm, or the at least second outlet may be positioned within 0.1 cm) of an orifice of an intake valve of a second cylinder of the plurality of cylinders, and the at least a third outlet may be positioned within 3 cm (for example within 1.5 cm, within 1 cm, within 0.5 cm, within 0.25 cm, within 0.125 cm, or the at least a third outlet may be positioned within 0.1 cm) of an orifice of an intake valve of a third cylinder of the plurality of cylinders.

Certain embodiments may provide, for example, a system for on-demand delivery of HHO gas for an internal combustion engine, comprising: an electrolysis cell for generating the HHO gas, a controller, and an HHO injection apparatus. In certain further embodiments, for example, the controller may adjust the injection of HHO gas when an exhaust temperature of the internal combustion engine exceeds one or more pre-determined temperatures. In certain further embodiments, the controller may adjust the injection of HHO gas when an exhaust temperature of the internal combustion engine exceeds 50° C., for example when the exhaust temperature excess 75° C., 100° C., 150° C., 175° C., or the controller may adjust the injection of HHO gas when an exhaust temperature of the internal combustion engine exceeds 200° C. In certain further embodiments, for example, the controller may increase the injection of HHO gas by in the range of 1-5 wt. % when an exhaust temperature of the internal combustion engine exceeds one or more of the foregoing pre-determined temperatures, for example the controller may increase the injection of HHO gas by in the range of 5-10 wt. %, increase the injection of HHO gas by in the range of 10-20 wt. %, increase the injection of HHO gas by in the range of 20-50 wt. %, increase the injection of HHO gas by in the range of 50-100 wt. %, increase the injection of HHO gas by in the range of 100-150 wt. %, or the controller may increase the injection of HHO gas by in the range of 150-200 wt. % when an exhaust temperature of the internal combustion engine exceeds one or more of the foregoing pre-determined temperatures Certain embodiments may provide, for example, a system for onboard, on-demand delivery of an HHO gas for an internal combustion engine (for example for a vehicle), comprising: an electrolysis cell configured to produce a required amount of HHO gas; and an HHO gas delivery system configured to distribute the HHO gas to the internal combustion engine. In certain embodiments, for example, distribution of the HHO gas may comprise delivering a portion of the required amount of HHO gas from the electrolysis cell to a position proximate an orifice (for example within 3 inches of the at least one orifice) of a combustion chamber intake valve, wherein said portion of the HHO gas is not introduced to or mixed with combustion intake air until said portion reaches said position and delivering a pre-determined amount of a portion of the HHO gas at a pre-determined time relative to the position of the piston operating within the combustion chamber and/or firing of that combustion chamber. In certain embodiments, for example, the internal combustion engine may provide power to a vehicle and the pre-determined amount of HHO gas may be generated by electrolyzing in the range of 2-30 ounces of electrolyte solution per 10,000 miles or per 20,000,000 crankshaft revolutions, for example in the range of 3-16 ounces of electrolyte solution, in the range of 4-10, or the required amount of HHO gas may be generated by electrolyzing in the range of 5-7 ounces (for example 6 ounces) of electrolyte solution per 10,000 miles or per 20,000,000 crankshaft revolutions. In certain embodiments, for example, the internal combustion engine may provide power to a vehicle and the required amount of HHO gas may be in the range of 300-1000 liters per 10,000 miles or per 20,000,000 crankshaft revolutions, based on a gas temperature of 25° C. and pressure of 1 atmosphere, for example in the range of 300-900 liters, in the range of 400-800 liters, in the range of 500-700 liters, or the required amount of HHO gas may be in the range of 600-700 liters per 10,000 miles or per 20,000,000 crankshaft revolutions, based on a gas temperature of 25° C. and pressure of 1 atmosphere.

In certain embodiments, for example, the required amount of HHO gas may be in the range of 1-10 liters per hour or per 120,000 crankshaft rotations, based on a gas temperature of 25° C. and pressure of 1 atmosphere, for example in the range of 2-7 liters, in the range of 3-4.5 liters, or the required amount of HHO gas may be in the range of 3.5-4.5 liters per hour or per 120,000 crankshaft rotations, based on a gas temperature of 25° C. and pressure of 1 atmosphere. In certain embodiments, for example, the foregoing ranges of the required amount of HHO gas may correspond to an average hourly requirement over typical driving conditions, for example an average hourly requirement over 10,000 miles or over 20,000,000 crankshaft rotations under typical driving conditions applicable to the vehicle.

In certain embodiments, for example, the required amount of HHO gas may be in the range of 1-10 liters per hour or per 120,000 crankshaft rotations, based on a gas temperature of within 20° C. of the temperature of engine coolant and a pressure of in the range of 40-50 psia, for example in the range of 1.5-6 liters, in the range of 2-4 liters, or the required amount of HHO gas may be in the range of 2-3 liters per hour or per 120,000 crankshaft rotations, based on a gas temperature of within 20° C. of the temperature of engine coolant and a pressure of in the range of 40-50 psia. In certain embodiments, for example, the foregoing ranges of the required amount of HHO gas may correspond to an average hourly requirement over typical driving conditions, for example an average hourly requirement over 10,000 miles or over 20,000,000 crankshaft rotations under typical driving conditions applicable to the vehicle.

Certain embodiments may provide, for example, a system for onboard, on-demand delivery of an HHO gas for an internal combustion engine for a vehicle, comprising: an electrolysis cell capable of delivering a required amount of HHO gas of at least 1 liter of HHO. In certain embodiments, for example, the electrolysis cell may be capable of delivering at least 1.5 liters of HHO gas for every 120,000 revolutions of the crankshaft of the engine, for example at least 2 liters, at least 3 liters, at least 4 liters, at least 5 liters, at least 6 liters, at least 7 liters, at least 10 liters, at least 20 liters, or the electrolysis cell may be capable of delivering at least 30 liters of HHO gas for every 120,000 revolutions of the crankshaft of the engine. In certain embodiments, for example, the electrolysis cell may be capable of delivering in the range of 1-10 liters of HHO gas for every 120,000 revolutions of the crankshaft of the engine, for example in the range of 1-8 liters of HHO gas, in the range of 2-7 liters of HHO gas, or the electrolysis cell may be capable of delivering in the range of 2-5 liters of HHO gas for every 120,000 revolutions of the crankshaft of the engine. In certain embodiments, for example, any of the above values and/or ranges of the required amount may be based on the volume of HHO gas delivered from an electrolysis cell at the outlet pressure of the electrolysis cell (for example 45-50 psia). In certain embodiments, for example, any of the above values and/or ranges of the required amount may be based on a volume of HHO gas as calculated at a standard temperature and pressure (for example, a standard temperature of 25° C. and a standard pressure of 1 atmosphere). In certain embodiments, for example, any of the above values and/or ranges of the required amount may be based on the volume of the HHO gas at the outlet temperature and pressure of an engine coolant-cooled flow regulator in communication with at least one HHO gas injector (for example an outlet temperature within 20° C. of the temperature of engine coolant entering the flow regulator and a pressure of 45 psi above an inlet air pressure of the internal combustion engine.

In certain embodiments, for example, the electrolysis cell may store a volume of HHO gas sufficient to deliver the required amount of HHO gas for at least 5,000 crankshaft revolutions of the internal combustion engine, for example at least 10,000 crankshaft revolutions, 15,000 crankshaft revolutions, 20,000 crankshaft revolutions, or the electrolysis cell may store a volume of HHO gas sufficient to deliver the required amount of HHO gas for at least 50,000 crankshaft revolutions of the internal combustion engine. In certain further embodiments, for example, the temperature of the electrolysis cell may not exceed 80° C. during operation, for example the temperature of the electrolysis cell may not exceed may not exceed 65° C. during operation. In certain embodiments, for example, the temperature of the electrolysis cell may not exceed 25° C. above ambient temperature.

In certain embodiments, for example, the electrolysis cell may be powered by a DC power source having a voltage in the range of 11-30 VDC, for example 11-14 VDC, the electrolysis cell may be powered by a DC power source having a voltage in the range of 20-28 VDC. In certain embodiments, for example, the electrolysis cell may be powered by a DC power source having a voltage of 24 VDC, or the electrolysis cell may be powered by a DC power source having a voltage of 28 VDC.

In certain further embodiments, for example, the electrolysis cell may comprise an electrolyte solution, wherein the concentration of electrolyte present in the aqueous electrolyte solution may be selected, maintained, and/or adjusted to provide an average (or maximum) current draw of less than 20 amps, 15 amps, or less than 10 amps at the operating temperature of the electrolysis cell. In certain embodiments, for example, the electrolysis cell may be configured to operate on less than 250 watts of DC power, for example the electrolysis cell may be configured to operate on less than 150 watts of DC power. In certain embodiments, for example, the electrolysis cell may be configured to have less than 20 ohm of resistance, for example less than 10 ohm, less than 5 ohm, or the electrolysis cell may be configured to have less than 3 ohm of resistance. In certain embodiments, for example, the electrolysis cell may be configured to have at least 1 ohm of resistance, for example at least 2 ohm, at least 3 ohm, at least 5 ohm, at least 10 ohm, at least 20 ohm, or the electrolysis cell may be configured to have at least 30 ohm of resistance.

Certain embodiments may provide, for example, a method, apparatus, or system to deliver HHO gas into one or more cylinders of an internal combustion engine. In certain embodiments, for example, less than 0.05 liter of the HHO gas per liter of cylinder displacement may be delivered to each of the one or more cylinders at a pressure of less than 300 kPa (for example less than 200 kPa, less than 150 kPa, or less than 110 kPa), less than 0.025 liter of the HHO gas per liter of cylinder displacement may be delivered to each of the one or more cylinders at a pressure of less than 300 kPa (for example less than 200 kPa, less than 150 kPa, or less than 110 kPa), less than 0.01 liter of the HHO gas per liter of cylinder displacement may be delivered to each of the one or more cylinders at a pressure of less than 300 kPa (for example less than 200 kPa, less than 150 kPa, or less than 110 kPa), or less than 0.005 liter of the HHO gas per liter of cylinder displacement may be delivered to each of the one or more cylinders at a pressure of less than 300 kPa (for example less than 200 kPa, less than 150 kPa, or less than 110 kPa).

Certain embodiments may provide, for example, method for reducing one or more emissions of an internal combustion engine, comprising: controlling a temperature of an HHO gas by exchanging heat with an engine coolant; and delivering an HHO gas at the controlled temperature to at least one intake port of the internal combustion engine. In certain embodiments, one or more than one (including for instance all) of the following embodiments may comprise each of the other embodiments or parts thereof. In certain embodiments, for example, one or more engine-out emissions of the internal combustion engine may fall within or meet one or more regulated emission limits for the internal combustion engine according to one or more emission standards specified in Europe (for example the Euro I, Euro II, Euro III, Euro IV, Euro V, or Euro VI emission standards) and/or by the Environmental Protection Agency (for example the 2002, 2004, 2007, 2010, or 2014 Environmental Protection Agency emission standards).

In certain embodiments, for example, the one or more engine-out emissions may be particulate matter (PM) emissions, nitrogen oxide (NOx) emissions, nitric oxide (NO) emissions, nitrogen dioxide ($NO_2$) emissions, hydrocarbon (HC) emissions, total hydrocarbon (THC) emissions, non-methane hydrocarbon (NMHC) emissions, hydrocarbon and nitrogen oxide (HC+NOx) emissions, nitrogen oxide and non-methane hydrocarbon (NOx+NMHC) emissions, carbon oxide (CO) emissions, carbon dioxide ($CO_2$) emissions, fine particle ($PM_{2.5}$) emissions, ultrafine particle ($PM_{0.1}$) emissions, number of particles (PN) emissions, non-methane organic gases (NMOG) emissions, formaldehyde (HCHO) emissions, or a combination of one or more of the foregoing emissions.

In certain embodiments, for example, one of the one or more regulated emission limits may be based on one or more test procedures. In certain embodiments, for example, the one or more test procedures may be the Federal Test Procedure (FTP), the Environmental Protection Agency Transient Test Procedure, the Not-to-Exceed (NTE) test, the Supplemental Emission Test (SET), the Urban Dynamometer Driving Schedule (UDDS), the FTP 72 cycle, the FTP 75 cycle, the Urban Dynamometer Driving Schedule (UDDS), the US06 test or Supplemental Federal Test Procedure (SFTP), the LA92 "Unified" Dynamometer Driving Schedule, the New European Driving Cycle test (NEDC), the Extra Urban Driving Cycle (EUDC), the ECE Urban Driving Cycle, the Common Artemis Driving Cycles (CADC), the ADAC Highway Cycle, the RTS 95 Cycle, the ECE R49 cycle, the ESC (OICA) cycle, the ELR cycle, the ETC (FIGE) cycle, the Exhaust Emission Standards for Nonroad Compression-Ignition Engines, according to 40 C.F.R. Part 89 Subpart E, according to 40 C.F.R. Part 1039 Subpart F, or a combination of two or more thereof.

In certain embodiments, for example, one of the one or more regulated emission limits may be a PM level of less than 1.0 grams per kilowatt-hour (g/kW-hr), for example a PM level of less than 0.02 g/kW-hr. In certain embodiments, for example, one of the one or more regulated emission limits may be a PM level of less than 0.25 grams per kilometer (g/km), for example a PM level of less than 0.005 g/km. In certain embodiments, for example, one of the one or more regulated emission limits may be a NOx level of less than 15.8 g/kWh, for example a NOx level of less than 0.268 g/kWh. In certain embodiments, for example, one of the one or more regulated emission limits may be a NOx level of less than 0.78 g/km, for example a NOx level of less than 0.012 g/km. In certain embodiments, for example, one of the one or more regulated emission limits may be an HC level of less than 2.6 g/kWh, for example an HC level of less than 0.13 g/kWh. In certain embodiments, for example, one of the one or more regulated emission limits may be a THC level of less than 0.29 g/km a THC level of less than 0.10 g/km. In certain embodiments, for example, one of the one or more regulated emission limits may be an NMHC level of less than 1.3 g/kW-hr, for example an NMHC level of less than 0.19 g/kW-hr. In certain embodiments, for example, one of the one or more regulated emission limits may be an NMHC level of less than 0.108 g/km, for example an NMHC level of less than 0.068 g/km. In certain embodiments, for example, one of the one or more regulated emission limits may be an NMHC+NOx level of less than 21.4 g/kW-hr, for example an NMHC+NOx level of less than 4.0 g/kW-hr. In certain embodiments, for example, one of the one or more regulated emission limits may be an HC+NOx level of less than 1.7 g/km, for example an HC+NOx level of less than 0.170 g/km. In certain embodiments, for example, one of the one or more regulated emission limits may be a CO level of less than 53.6 g/kW-hr, for example a CO level of less than 1.0 g/kW-hr. In certain embodiments, for example, one of the one or more regulated emission limits may be a CO level of less than 6.9 g/km, for example a CO level of less than 0.50 g/km. In certain embodiments, for example, one of the one or more regulated emission limits may be a NMOG level of less than 0.28 g/mi, for example a NMOG level of less than 0.01 g/mi. In certain embodiments, for example, one of the one or more regulated emission limits may be an HCHO level of less than 0.032 g/mi, for example an HCHO level of less than 0.004 g/mi. In certain embodiments, for example, one of the one or more regulated emission limits may be a PN level of less than $6*10^{12}$, for example a PN level of less than $6*10^{11}$.

In certain embodiments, for example, the methods, systems, and/or apparatus of the present disclosure may comprise a heat exchanger configured to receive an HHO gas stream. In certain embodiments, for example, the heat exchanger may be configured to heat the HHO gas stream. In certain embodiments, for example, the heat exchanger may be configured to cool the HHO gas stream. In certain embodiments, for example, the heat exchanger may be configured to receive a heat transfer medium to heat or cool the HHO gas stream. In certain embodiments, for example, the rate of heat transfer medium passed through the heat exchanger may be controlled to maintain the HHO gas stream at a temperature within a predetermined range or proximate a temperature set point (for example within ±2° F., within ±5° F., within ±10° F., within ±15° F., or within ±20° F. of the a temperature set point). In certain embodiments, for example, the heat transfer medium may be an engine coolant stream. In certain embodiments, for example, the heat transfer medium may be an engine exhaust stream. In certain embodiments, for example, the heat transfer medium may be a diesel particulate filter (DPF) burner exhaust stream. In certain embodiments, for example, the heat exchanger may be integral with an HHO gas generation system. In certain embodiments, for example, the heat exchanger may be part of an HHO gas distribution system.

The heat exchanger may be any suitable heat exchanger. In certain embodiments, for example, the heat exchanger may be a shell and tube heat exchanger wherein the HHO gas stream enters a first end of a tube portion of the heat exchanger through an inlet, passes thorough an inner channel defined by the tube portion, and exits the heat exchanger through a second end of the tube. In this embodiment, for example, the heat transfer medium (for example engine exhaust gas and/or engine coolant) may flow through an outer channel defined by a shell portion of the heat exchanger. In certain other embodiments, for example, the heat transfer medium may flow through the inner channel and the HHO gas may flow through the outer channel. In certain embodiments, for example, the shell and tube heat exchanger may be operated in a parallel flow configuration. In certain embodiments, for example, the shell and tube heat exchanger may be operated in a countercurrent flow configuration. In certain embodiments, for example, the tube portion may be a straight tube (for example a ⅛ inch thick copper or steel tube having a working length in the range of 3-8 inches). Other types of heat exchangers are contemplated. In certain embodiments, for example, the heat exchanger may be in a spiral configuration. In certain embodiments, for example, the heat exchanger may a plate-and-frame heat exchanger. In certain embodiments, for example, the heat exchanger may be a rotating bed heat exchanger.

Certain embodiments may provide, for example, a method of delivering HHO gas to a combustion chamber of an internal combustion engine. In certain embodiments, for example, the HHO gas may be delivered at a controlled temperature. In certain further embodiments, for example, the controlled temperature may be within 20° C. of an engine coolant temperature (for example the temperature of an inlet coolant supplied to an inlet side of a heat exchanger positioned upstream of the combustion chamber, such as positioned proximate a regulator for HHO gas flow into the combustion chamber), for example the temperature may be within 15° C., within 10° C., or the controlled temperature may be within 5° C. of an engine coolant temperature. In certain further embodiments, for example, the controlled temperature may be no more than 20° C. above an engine coolant temperature (for example the temperature of an inlet coolant supplied to an inlet side of a heat exchanger), for example the temperature may be no more than 15° C., no more than 10° C., or the controlled temperature may be no more than 5° C. above an engine coolant temperature. In certain further embodiments, for example, the controlled temperature may be no more than 20° C. below an engine coolant temperature (for example the temperature of an inlet coolant supplied to an inlet side of a heat exchanger), for example the temperature may be no more than 15° C., no more than 10° C., or the controlled temperature may be no more than 5° C. below an engine coolant temperature.

In certain embodiments, for example, the HHO gas may be under pressure when introduced to an internal combustion engine. In certain embodiments, for example, the HHO gas may be introduced at a pressure in the range of 50-500 kPa above the pressure of an intake port of the combustion chamber of the internal combustion engine, for example in the range of 50-300 kPa above the pressure of an intake port, in the range of 100-200 kPa, in the range of 45-50 psi, or the HHO gas may be introduced at a pressure in the range of 100-150 kPa above the pressure of an intake port of the combustion chamber.

In certain embodiments, for example, the HHO gas may be introduced at a pressure in the range of 45-50 psi above the pressure of an intake port combustion chamber and at a temperature within 30° C. of an inlet coolant supplied to an inlet side of a heat exchanger. In certain embodiments, for example, use of the engine coolant to control the temperature of the HHO gas and/or controlling the introduction pressure of the HHO gas (for example by using a pressure regulator) may allow pre-determined amounts of the HHO gas to be introduced to the internal combustion engine. In certain embodiments, for example, the aforesaid temperature and/or pressure controls may provide more precise control over the amount of HHO gas introduced into the internal combustion engine in comparison to a system lacking said controls (for example a traditional system for introducing electrolysis gases into an internal combustion engine).

Certain embodiments may provide, for example, apparatus, methods, or systems to improve the performance of an internal combustion engine. In certain embodiments, for example, the internal combustion engine may include gasoline engines, diesel engines, turbocharged diesel engines, supercharged diesel engines, direct injection diesel engines, trunk-piston diesel engines, crosshead diesel engines, marine diesel engines, locomotive diesel engines, low-speed diesel engines, medium-speed diesel engines, high-speed diesel engines, double-acting diesel engines, 2-stroke engines, 4-stroke engines and combinations thereof. In certain embodiments, for example, internal combustion engines may realize a fuel economy increase of at least 1%, for example at least 2%, at least 3%, at least 4%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

In certain embodiments, for example, internal combustion engines may realize a fuel economy increase of at least 1%, for example at least 2%, at least 3%, at least 4%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Certain embodiments may provide, for example, apparatus, methods, or systems to achieve substantially complete combustion, or at least more complete combustion, within the internal combustion engine. In certain embodiments, for example, more complete combustion may be more than 10%, for example more than 20%, more than 30%, more than 40%, more than 50%, more than 60%, more than 70%, more than 80%, more than 90%, or more than 99% combustion of the hydrocarbon fuel provided to the internal combustion engine. In certain embodiments, for example, substantially complete combustion may be more than 80%, for example more than 85%, more than 90%, more than 95%, more than 96%, more than 97%, more than 98%, or more than 99% combustion of the hydrocarbon fuel provided to the internal combustion engine.

Certain embodiments may provide, for example, apparatus, methods, or systems to improve the operation of the internal combustion engine. In certain embodiments, one or more than one (including for instance all) of the following embodiments may comprise each of the other embodiments or parts thereof. In certain embodiments, for example, the internal combustion engine may operate at a cooler temperature and/or may run cleaner. In certain embodiments, for example, the internal combustion engine may generate more power for the same or lower amount of fuel. In certain embodiments, for example, the internal combustion engine may generate exhaust temperatures more suitable for efficient operation of exhaust aftertreatment systems. In certain embodiments, for example, the internal combustion engine may generate exhaust temperatures more suitable for efficient operation of diesel particulate filter (DPF). In certain embodiments, for example, the internal combustion engine may generate exhaust temperatures more suitable for efficient operation of selective catalytic reactor (SCR). In certain embodiments, for example, the internal combustion engine may generate exhaust temperatures more suitable for efficient operation of diesel oxidation catalyst (DOC). In certain embodiments, for example, the internal combustion engine may generate exhaust temperatures more suitable for efficient operation of NOx trap.

Certain embodiments may provide, for example, apparatus, methods, or systems to introduce a second fuel (for example a second fuel exclusive of a petroleum-derived fuel) into an internal combustion engine. In certain embodiments, for example, the second fuel (or booster gas or enhancement gas) comprises hydrogen, oxygen and/or mixtures thereof. In certain embodiments, for example, the second fuel may substantially comprise hydrogen, oxygen and/or mixtures thereof. In certain embodiments, for example, the second fuel may predominantly comprise hydrogen, oxygen and/or mixtures thereof. In certain embodiments, for example, the second fuel may be a product of electrolysis.

Certain embodiments may provide, for example, apparatus, methods, or systems to produce an oxygen-hydrogen gas mixture (for example an oxygen-hydrogen gas mixture for use as a second fuel in an internal combustion engine). In certain embodiments, for example, the gas mixture may be an oxygen-rich or hydrogen-rich a gas mixture. In certain embodiments, for example, the gas mixture may comprise at least one or more of the following aqueous electrolyte solution electrolysis components: monatomic oxygen, diatomic oxygen, monatomic hydrogen, diatomic hydrogen, hydrogen ions, oxygen ions, mononuclear oxygen, mononuclear ozone, singlet oxygen, hydroxide ions, hydronium ions, superoxide, hydrogen superoxide, hydroxide radical, peroxide radical, ionic peroxide, combinations of one or more of these and/or mixtures of the same. In certain embodiments, for example, in exemplary embodiments, the gas mixture may be a gas mixture comprising at least hydrogen ions and oxygen ions, or diatomic oxygen and diatomic hydrogen, or oxygen ion and diatomic oxygen, etc.

Certain embodiments may provide, for example, apparatus, methods, or systems to produce a gas mixture that is approximately two parts hydrogen to one part oxygen (for example 2:1) or less than 2:1 (for example 1.75:1, 1.5:1, 1.25:1, 1:1, 0.75:1, or 0.5:1). In certain embodiments, for example, the gas mixture produced may be modified before being delivered to the internal combustion engine. In certain embodiments, for example, the gas mixture may be combined with an additive and/or the composition of the gas mixture may be modified by adding, recycling or removing portions of the gas mixture. In certain embodiments, for example, the electrolysis process may generate a hydrogen to oxygen ratio of between 1.8:1 to 2.3:1, for example a hydrogen to oxygen ratio of 2:1 and the system may be configured to deliver a gas mixture having a hydrogen to oxygen ratio of less than 2:1, for example a hydrogen to oxygen ratio of 1.8:1 or less, such as 1.7:1 or less, 1.5:1 or less, 1.3:1 or less, by removing, or recycling, a portion of the hydrogen from the gas mixture prior to delivery. Alternatively, in certain embodiments, for example, an apparatus, method, or system may generate hydrogen and oxygen at a hydrogen to oxygen ratio of 2:1, but some of the hydrogen or oxygen, for example oxygen, may be trapped in bubbles, and the apparatus, method, or system may be configured to release the trapped oxygen to effectively deliver more oxygen to the internal combustion engine.

Certain embodiments may provide, for example, apparatus, methods, or systems to produce a gas mixture that is approximately two parts oxygen to one part hydrogen (for example 2:1) or less than 2:1 (for example 1.75:1, 1.5:1, 1.25:1, 1:1, etc.). In certain embodiments, for example, the electrolysis process may generate an oxygen to hydrogen ratio of between 1.8:1 to 2.3:1, for example an oxygen to hydrogen ratio of 2:1 ratio, and the system may be configured to deliver a gas mixture having an oxygen to hydrogen ratio of less than 2:1, for example an oxygen to hydrogen ratio of 1.8:1 or less, 1.7:1 or less, 1.5:1 or less, 1.3:1 or less by removing, adding or recycling a portion of the hydrogen or oxygen from the gas mixture prior to delivery. In certain embodiments, for example, the system may generate an oxygen to hydrogen ratio of less than 3.5:1, less than 3:1, less than 2.75:1, less than 2.5:1.

Certain embodiments may provide, for example, apparatus, methods, or systems to result in a more reliably controlled gas mixture generation process. In certain embodiments, for example, the current provided to the system for gas generation may be continually or continuously regulated or controlled, for example, in real time (or substantially real time), so as to provide predetermined or controlled quantity of gas, for example, in relation to the engine speed and/or demand.

Certain embodiments may provide, for example, apparatus, methods, or systems to utilize a substantially closed-loop system that recycles a water-reagent (or water-electrolyte or aqueous electrolyte solution electrolysis component) mixture in an effort to reduce its consumption.

Certain embodiments may provide, for example, apparatus, methods, or systems to alter combustion (for example diesel combustion) chemistry to reduce particulate formation. In certain embodiments, for example, internal combustion engines may realize a reduction in particulate formation of greater than 5%, greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%.

Certain embodiments may provide, for example, apparatus, methods, or systems to increase the concentration of an oxidizer in an internal combustion engine. In certain embodiments, for example, the increase in the amount of oxidizers may be at least 5%, at least 10%, at least 15%, at least 20%, at least 25%, at least 30%, at least 35%, at least 40%, at least 45%, or at least 50%. In certain embodiments, for example, the increase in the amount of oxidizers may be between 5-50%, such as between 10-20%, between 15-25%, between 20-30%, between 25-35%, between 30-40%, between 35-45%, or between 40-50%.

Certain embodiments may provide, for example, apparatus, methods, or systems that serve as a mechanism for distributing the oxidizer for more even air/fuel mixture.

Certain embodiments may provide, for example, apparatus, methods, or systems to generate a gas mixture that is an accelerant to speed combustion, enhance combustion, and/or increase the extent of combustion.

Certain embodiments may provide, for example, apparatus, methods, or systems to displace air with oxygen and/or hydrogen within the engine's intake system. In certain embodiments, one or more than one (including for instance all) of the following embodiments may comprise each of the other embodiments or parts thereof. In certain embodiments, for example, an apparatus, method, or system may displace air within the engine's intake system with the gas mixture, resulting from the gas mixture generator system. In certain embodiments, for example, an apparatus, method, or system may be used to create a shorter combustion process that lowers the engine temperature thereby reducing the formation of nitrogen oxides. In certain embodiments, for example, an apparatus, method, or system may generate a gas mixture resulting from electrolysis of an aqueous electrolyte solution and introducing at least a portion of the gas mixture into the engine's intake for improved combustion. In certain embodiments, for example, an apparatus, method, or system may generate a gas mixture resulting from electrolysis of an aqueous electrolyte solution and introducing a substantial portion (for example greater than 95 wt. %), of the gas mixture into the engine's intake for improved combustion. In certain embodiments, for example, an apparatus, method, or system may generate a gas mixture resulting from electrolysis of an aqueous electrolyte solution and storing the gas mixture in a storage tank instead of introducing the gas mixture into the engine's intake. In certain embodiments, for example, an apparatus, method, or system may generate an optimized or partially optimized quantity of a gas mixture, such as a gas mixture having one or more aqueous electrolyte solution electrolysis components, into the engine's intake for improved combustion. In certain embodiments, for example, an apparatus, method, or system may be configured to produce in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In certain embodiments, for example, an apparatus, method, or system may be configured to produce in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, between 2.5-3 liters of gas per minute.

Certain embodiments may provide, for example, a system or apparatus to generate a gas mixture for use with an internal combustion engine, the system or apparatus comprising a tank configured to store an aqueous electrolyte solution consisting essentially of water and a predetermined quantity of electrolyte (reagent). In certain embodiments, one or more than one (including for instance all) of the following embodiments of the system or apparatus may comprise each of the other embodiments or parts thereof. In certain embodiments, for example, the system or apparatus may further comprise a cell (i.e., an electrolytic cell) configured for aiding in the electrolysis of the aqueous electrolyte solution. In certain further embodiments, for example, the cell may comprise a plurality of plates arranged substantially parallel to one another and be spaced substantially equidistant from an adjacent one of the plurality of plates, and at least one seal located between the plurality of plates. In certain embodiments, for example, the at least one seal may comprise a relatively hard plastic portion with a first thickness for maintaining the predetermined distance between adjacent plates, and a relatively soft sealing portion, typically, a soft, often rubber or rubber-like portion, with a second thickness for maintaining the substantially airtight and substantially watertight seal between adjacent ones of the plurality of plates.

In certain embodiments, for example, the system or apparatus may further comprise a controller configured to apply a pulse width modulated voltage to the cell to generate the gas mixture within the cell. In certain further embodiments, for example, the controller may be configured to regulate the current provided to the cell by controlling the duty cycle of the pulse width modulated voltage. In certain embodiments, for example, the duty cycle may be controlled in real time and/or substantially real time.

In certain embodiments, for example, the system or apparatus may further comprise an output for outputting the gas mixture to the internal combustion engine.

In certain embodiments, for example, the gas mixture may be input into the tank prior to being output to the internal combustion engine. In certain embodiments, for example, the gas mixture may be output to the internal combustion engine without being input into the tank. In certain embodiments, for example, the gas mixture may be stored in the tank without being output to the internal combustion engine under certain operating conditions. In certain embodiments, for example, the gas generation system or apparatus may be integral with the gas storage tank.

In certain embodiments, for example, the tank may be manufactured of a material that is non-conductive.

In certain embodiments, for example, the electrolyte may be a metal salt, such as a metal salt at least partially soluble in water. In certain embodiments, for example, the electrolyte solution (for example an aqueous electrolyte solution) may comprise a salt selected from the group consisting of: KOH, NaOH, $Na_2CO_3$, $NaHCO_3$, NaCl, $K_2CO_3$, $KHCO_3$, $H_2SO_4$, $CH_3COOH$, and a combination of two or more thereof.

In certain embodiments, for example, the size of the tank may be selected such that the aqueous electrolyte solution occupies less than ¼, ⅓, ½, ⅔, or ¾, the volume of the tank during operation. In certain embodiments, for example, the tank may have a capacity of 2, 3, 4, 5, 6, 7, 8, 9, or 10 liters. In certain embodiments (for example for larger applications), for example, the tank may be even larger. In certain embodiments, for example, the system or apparatus may comprise multiple tanks.

In certain embodiments, for example, the cell may comprise at least two plates, a first plate configured to be coupled to a positive terminal of a voltage source and a second plate configured to be coupled to a negative terminal of the voltage source. In certain embodiments, for example, the cell may further comprise at least one neutral plate configured in a series relationship to the first plate and the second plate. In certain embodiments, for example, the cell may comprise at least 2, at least 3, at least 4, at least 5, at least 6, at least 7, at least 8, at least 9, at least 10, at least 11, at least 12, at least 13, at least 14, or at least 15 neutral plates. In certain embodiments, for example, the number of neutral plates may be selected to obtain a desired voltage drop between the plates.

In certain embodiments, for example, the soft rubber portion of the at least one seal may be positioned on an inner edge of the hard plastic portion of the seal.

In certain embodiments, for example, the soft rubber portion may be located on the outer edge of hard plastic portion. In certain embodiments, for example, the seal may comprise at least two soft plastic portions—a first soft plastic portion may be located between the interface of the hard plastic portion and a first one of the adjacent plates and a second soft plastic portion may be located between the interface of the hard plastic portion and a second one of the adjacent plates. In certain embodiments, for example, the soft plastic portion may surround the hard plastic portion of the seal. In certain embodiments, for example, the thickness of the soft rubber portion may be larger than the thickness of the hard plastic portion of the seal. In certain embodiments, for example, the hard plastic portion may be 0.002", 0.003", 0.004", 0.005", 0.006" ", 0.007", 0.008", 0.009", 0.010", 0.0125", 0.025", 0.0375", 0.050", 0.0625", or 0.075" thick. In certain embodiments, for example, the soft rubber portion may be 0.002", 0.003", 0.004", 0.005", 0.006", 0.007", 0.008", 0.009", 0.010", 0.011", 0.012", 0.13", 0.014", 0.030", 0.038", 0.055", 0.0675", or 0.080" thick. In certain embodiments, for example, the hard plastic portion may be manufactured from a material selected such that the hard plastic portion does not significantly react with the aqueous electrolyte solution. In certain embodiments, for example, the hard plastic portion may be manufactured from high density polyethylene (HDPE), polyphthalamide (PPA), styrene, nylon, or combinations thereof. In certain embodiments, for example, the soft rubber portion may be manufactured from a material selected such that the soft rubber portion does not significantly react with the aqueous electrolyte solution. In certain embodiments, for example, the soft rubber portion may be manufactured from ethylene propylene diene monomer (EPDM).

In certain embodiments, for example, the internal combustion engine may be a turbocharged diesel engine and the gas mixture may be input into the turbocharged diesel engine up stream of an intake valve or valves. In certain embodiments, for example, the internal combustion engine may comprise a nonroad engine, a stationary engine, a locomotive engine, a marine engine, an aircraft engine, or a generator set engine. In certain embodiments, for example, the internal combustion engine may comprise a spark-ignition engine, a compression-ignition engine, a naturally aspirated engine, a turbocharged engine, a turbocompound engine, a supercharged engine, a direct injection engine, an indirect injection engine, or a port injection engine. In certain embodiments, for example, the internal combustion engine may comprise a gasoline engine, a diesel engine, an ethanol engine, a methanol engine, a biofuel engine, a natural gas engine, a propane engine, or an alternative fuel engine.

In certain embodiments, for example, apparatus, methods, or systems may comprise a scrubber. In certain embodiments, for example, the scrubber may comprise a switch configured to sense excess liquid and/or moisture in the form of foam in the gas stream and shut-off the electrolysis process to prevent the excess moisture from entering the internal combustion engine, and/or the accumulation of the gas mixture. In certain embodiments, for example, the apparatus, methods, or systems may be exclusive of a scrubber. For example, HHO gas may be generated and/or stored at a temperature (for example a temperature in the range of 100-110° F.) that avoids excess and/or moisture and therefore makes a scrubber unnecessary.

Certain embodiments may provide, for example, HHO gas that is generated and distributed moisture-free. Moisture-free HHO gas includes HHO gas free of entrained water droplets wherein the HHO gas is saturated with water at a sufficiently low temperature (and/or high pressure) such that no water condenses from the HHO gas during distribution from an electrolysis unit to an internal combustion engine. In certain embodiments, for example, the moisture-free HHO gas may have no more than $0.062$ $g/cm^3$ (for example no more than $0.06$ $g/cm^3$, no more than $0.05$ $g/cm^3$, or no more than $0.04$ $g/cm^3$) water. In certain embodiments, for example, the moisture-free HHO gas may be saturated with water at a temperature of no more than 120° F. (for example no more than 110° F. or no more than 100° F.) at a pressure in the range of 40-60 psig (for example a pressure in the range of 45-50 psig).

Certain embodiments may provide, for example, apparatus, methods, or systems to realize a fuel economy increase of at least 1%, for example at least 2%, at least 5%, at least 10%, at least 15%, at least 20%, at least 25%, at least 30%, at least 35%, at least 40%, at least 45%, at least 50%, or more. In certain embodiments, for example, the fuel economy increase may be in the range of between 1-50%, for example between 1-5%, between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Certain embodiments may provide, for example, apparatus, methods, or systems to improve the operation of an internal combustion engine. In certain embodiments, for example, the internal combustion engine may operate at a cooler temperature and/or may run cleaner.

Certain embodiments may provide, for example, apparatus, methods, or systems to produce an oxygen-hydrogen gas mixture, such as an oxygen-rich, oxygen-hydrogen gas mixture, or a hydrogen-rich oxygen-hydrogen gas mixture. In certain embodiments, one or more than one (including for instance all) of the following embodiments of the system or apparatus may comprise each of the other embodiments or parts thereof. In certain embodiments, for example, the gas mixture may be a low temperature plasma. In certain embodiments, for example, the plasma may be a cleaner plasma than that produced by other systems and/or methods. In certain embodiments, for example, the plasma may be an oxygen rich plasma. In certain embodiments, for example, the gas mixture may be an oxygen-rich or a hydrogen-rich gas mixture. In certain embodiments, for example, the gas mixture may comprise at least one or more of the following: aqueous electrolyte solution electrolysis components: monatomic oxygen, diatomic oxygen, monatomic hydrogen, diatomic hydrogen, hydrogen ions, oxygen ions, mononuclear oxygen, mononuclear, ozone, singlet oxygen, hydroxide ions, hydronium ions, superoxide, hydrogen superoxide, hydroxide radical, peroxide radical, ionic peroxide, combinations of one or more of these and/or mixtures of the same. In certain embodiments, for example, the gas mixture may be a gas mixture comprising at least hydrogen ions and oxygen ions, or diatomic oxygen and diatomic hydrogen, or oxygen ion and diatomic oxygen, etc. In certain embodiments, for example, the oxygen-hydrogen gas mixture may be an oxygen-rich gas mixture, an oxygen-hydrogen gas mixture, or a hydrogen-rich oxygen-hydrogen gas mixture. In certain embodiments, for example, the gas mixture may comprise approximately two parts hydrogen to one part oxygen (for example a ratio of hydrogen to oxygen of 2:1) or less than 2:1 (for example a ratio of hydrogen to oxygen of less than 1.75:1, less than 1.5:1, less than 1.25:1, less than 1:1, less than 0.75:1, or a ratio of hydrogen to oxygen of less than 0.5:1, etc.). In certain embodiments, for example, the gas mixture produced may be modified before being delivered to the internal combustion engine. In certain embodiments, for example, the gas mixture may be combined with an additive and/or the composition of the gas mixture may be modified by adding or removing portions of the gas mixture. In certain embodiments, for example, an electrolysis process may generate a gas mixture having a hydrogen to oxygen ratio in the range of between 1.8:1 to 2.3:1, for example a hydrogen to oxygen ratio of 2:1, and an apparatus, system, or method may be capable of delivering a gas mixture having a hydrogen to oxygen ratio of less than 2:1, for example a ratio of 1.8:1 or less, 1.7:1 or less, 1.5:1 or less, 1.3:1 or less, by removing, or recycling, a portion of the hydrogen from the gas mixture prior to delivery. Alternatively, in certain embodiments, for example, the apparatus, system, or method may be capable of generating a 2:1 ratio of hydrogen to oxygen but some of the hydrogen or oxygen, for example oxygen, may be trapped in bubbles, and the apparatus, system, or method may be configured to enable the release of the trapped oxygen to effectively deliver more oxygen to the internal combustion engine. Certain embodiments, for example, may comprise methods capable of producing a gas mixture that is approximately two parts oxygen to one part hydrogen (for example 2:1) or less than 2:1 (for example 1.75:1, 1.5:1, 1.25:1, 1:1, etc.). In certain embodiments, for example, an electrolysis process may generate between an oxygen to hydrogen ratio in the range of between 1.8:1 to 2.3:1, for example a 2:1 ratio of oxygen to hydrogen and the apparatus, system, or method may be capable of delivering a gas mixture having an oxygen to hydrogen ratio of less than 2:1, for example an oxygen to hydrogen ratio of 1.8:1 or less, 1.7:1 or less, 1.5:1 or less, 1.3:1 or less. In certain embodiments, for example, the apparatus, system, or method may be capable of delivering a gas mixture having an oxygen to hydrogen ratio of less than 3.5:1, less than 3:1, less than 2.75:1, less than 2.5:1 oxygen to hydrogen.

Certain embodiments may provide, for example, apparatus, methods, or systems to more reliably controlled gas mixture generation process. In certain embodiments, for example, the current provided for gas generation may be continually or continuously regulated or controlled, for example, in real time (or substantially real time), so a predetermined quantity of gas is consistently produced.

Certain embodiments may provide, for example, apparatus, methods, or systems to utilize a substantially closed-loop method of electrolysis that recycles a water-reagent (or water-electrolyte or aqueous electrolyte solution electrolysis component) mixture in an effort to reduce its consumption.

Certain embodiments may provide, for example, apparatus, methods, or systems capable of altering combustion (for example diesel combustion) chemistry to reduce particulate formation. In certain embodiments, for example, the methods may be capable of achieving a reduction in particulate formation from an internal combustion engine of greater than 5%, for example greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%. In certain embodiments, for example, the concentration of an oxidizer in an internal combustion engine may be increased. In certain embodiments, for example, the increase in the amount of oxidizers may be at least 5%, for example at least 10%, at least 15%, at least 20%, at least 25%, at least 30%, at least 35%, at least 40%, at least 45%, or at least 50%. In certain embodiments, for example, the increase in the amount of oxidizers may be in the range of between 5-50%, such as between 5-25%, between 10-20%, between 10-40%, between 15-25%, between 20-30%, between 25-35%, between 25-50%, between 30-40%, between 40-50%, between 35-45%, or between 40-50%.

Certain embodiments may provide, for example, apparatus, methods, or systems to distribute the oxidizer for more even air/fuel mixture.

Certain embodiments may provide, for example, apparatus, methods, or systems to generate a gas mixture that is an accelerant to speed combustion and/or increase combustion completion.

Certain embodiments may provide, for example, apparatus, methods, or systems to displace air with oxygen and/or hydrogen within the engine's intake system.

Certain embodiments may provide, for example, apparatus, methods, or systems to create a shorter combustion process that lowers the engine temperature thereby reducing the formation of nitrogen oxides.

Certain embodiments may provide, for example, apparatus, methods, or systems to generate an optimized or partially optimized quantity of a gas mixture, such as a gas mixture having one or more aqueous electrolyte solution electrolysis components, into the engine's intake for improved combustion. In certain embodiments, for example, the apparatus, methods, or systems may be capable of producing in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In certain embodiments, for example, the apparatus, methods, or systems may be capable of producing in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, between 2.5-3 liters of gas per minute.

Certain embodiments may provide, for example, apparatus, methods, or systems to reduce the particulate emissions of an internal combustion engine. In certain embodiments, for example, a method may comprise the steps of generating a gas mixture for use within the internal combustion engine and providing the gas mixture to the internal combustion engine during operation of the internal combustion engine. In certain embodiments, for example, a method may comprise: generating a gas mixture for use within the internal combustion engine, and providing the gas mixture to the internal combustion engine during operation of the internal combustion engine. In certain embodiments, for example, the gas mixture may be generated in substantially real time relative to the consumption of the gas mixture. In certain embodiments, for example, the gas mixture may be generated onboard the vehicle during operation of the internal combustion engine.

Certain embodiments may provide, for example, apparatus, methods, or systems wherein a tank may be at least partially filled with an aqueous electrolyte solution consisting essentially of water and a predetermined quantity of electrolyte (reagent). In certain embodiments, for example, the apparatus, methods, or systems may perform electrolysis of the aqueous electrolyte solution within a cell (i.e., an electrolytic cell) configured for aiding in the electrolysis of the aqueous electrolyte solution.

EXAMPLES

Example 1: A series of electrolysis cells were studied with different plates. In one cell, uncoated stainless steel plates were used and in a second cell platinum-coated stainless steel plates were used. The electrolyte concentration, of potassium carbonate in water, was adjusted in the cell with uncoated plates such that the current draw was essentially identical. All other conditions were essentially identical. The following table reports the results.

TABLE 1

| Performance Feature | Uncoated versus Coated Plates |
|---|---|
| Electrolyte Concentration | Uncoated plates required approximately 3 times greater concentration. |
| HHO Gas Production | Uncoated plates produced approximately 50% less HHO gas. |
| Current Draw | After 4 hours of testing, the cells with uncoated plates had a noticeably lower electrolyte level resulting in lower current draw. |

Experimental Note:
Iridium-coated plates performed similar to platinum coated plates Example 2: A series of electrolysis cells were studied with different plates. In a first cell, 7 platinum coated stainless steel plates were used and in a second cell 5 platinum coated stainless steel plates were used. The current draw was kept essentially the same for both cells during the test procedure, by adjusting the concentration of the electrolyte in the 7-plate cell to almost twice the concentration of the 5-plate cell. All other conditions were essentially identical. The following table reports the results.

TABLE 2

| Performance Feature | 5 Plates Versus 7 Plates |
|---|---|
| HHO Gas Production | 5 plates produced 20-25% more HHO gas. |

Example 3. A series of experiments was conducted with and without HHO gas injection. In the experimental setup, a vehicle powered by a PACCAR MX-13 diesel engine underwent snap acceleration from 0 to 80 mph in a chassis dynamometer test cell and exhaust emissions measured. Results are recorded in Table 3.

TABLE 3

Emissions Reduction (results in PPM) when HHO Gas Injected Into PACCAR MX-13 Diesel Engine.

| Exhaust Component | With HHO Injection | Without HHO Injection |
|---|---|---|
| $NO_x$ | 40 | 295 |
| CO | 0 | 0 |
| $CO_2$ | 7.6 | 8.8 |
| HC | 0 | 0 |
| $O_2$ | 8.9 | 8.6 |

Example 4. A series of experiments was conducted with and without HHO gas injection. In the experimental setup, a vehicle powered by a PACCAR MX-13 diesel engine was run at a steady state speed of 60 mph for 5 minutes in a chassis dynamometer test cell, and fuel economy and exhaust emissions measured. The experiment was repeated without HHO gas injection. Results are recorded in Table 4.

TABLE 4

Increased Fuel Economy and Emissions Reduction (results in PPM) when HHO Gas Injected Into PACCAR MX-13 Diesel Engine.

|  | With HHO Injection | Without HHO Injection |
|---|---|---|
| Fuel Economy (GPH) | 6.46 | 7.73 |
| $NO_x$ | 5 | 118 |
| CO | 0 | 0 |
| $CO_2$ | 4.5 | 4.9 |
| HC | 0 | 1 |
| $O_2$ | 14.5 | 14.2 |

All publications and patent applications mentioned in this specification are herein incorporated by reference to the same extent as if each individual publication or patent application was specifically and individually indicated to be incorporated by reference.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "both or either or in a series having more than two elements all or a subset of all elements or just one of the elements" Thus, as a non-limiting example, a reference to "A, B and/or C," is understood to include A, B and C, A and B, A and C, B and C, and A or B or C. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included for the ease of reference of the reader and should not be used to limit the subject matter found throughout the disclosure or the claims. The subject headings should not be used in construing the scope of the claims or the claim limitations.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

What is claimed is:

1. A dual-chamber vessel, comprising:
   a cylindrical member that that includes:
   a first endplate that is located at a first end of the cylindrical member;
   a middle plate that is located inside the cylindrical member and that divides an interior of the vessel into a first chamber and a second chamber; and
   a second endplate that is located at a second end of the cylindrical member, and that is configured to release pressure in response to a pressure in the second chamber being greater than a relief pressure;
   wherein a controller is configured to control an electricity supply to an electrolysis cell to maintain a volume of HHO gas in the second chamber within a storage pressure range; and
   wherein the electrolysis cell is located in the first chamber and is configured to generate HHO gas.

2. The vessel of claim 1, wherein the second endplate is configured to open the vessel at least 2%, relative to a surface area of the vessel within 1 ms of contents of the vessel reaching the relief pressure.

3. The vessel of claim 1, wherein the second endplate is configured to retain HHO gas within the storage pressure range.

4. The vessel of claim 3, wherein the second chamber is in continuous fluid communication with the first chamber, the second chamber configured to store at least a portion of the HHO gas.

5. The vessel of claim 4, which is configured for passive transport of HHO gas from the first chamber to the second chamber.

6. The vessel of claim 1, wherein the second chamber is configured to contain less than a 1 hour supply of HHO gas.

7. The vessel of claim 1, wherein the second endplate comprises a pressure release member, the pressure release member sized to release at least a portion of the contents of the vessel when the vessel pressure reaches the relief pressure.

8. The vessel of claim 7, wherein the pressure release member is non-reclosing.

9. The vessel of claim 8, wherein the pressure release member is configured to open the second chamber.

10. The vessel of claim 8, wherein the relief pressure is less than the lowest failure point of the vessel components.

11. The vessel of claim 1, comprising at least one elongated retaining member.

12. The vessel of claim 11, wherein the at least one elongated retaining member comprises an all-thread rod.

13. The vessel of claim 11, wherein the at least one elongated retaining member is configured to open the vessel based on yielding.

14. The vessel of claim 1, wherein the cylindrical member comprises:
    a first hollow outer casing, and
    a second hollow outer casing,
    wherein the middle plate is located between the first hollow outer casing and the second hollow outer casing.

15. The vessel of claim 14, wherein the second endplate is a pressure release member.

16. The vessel of claim 15, wherein the vessel is configured to open the second endplate to form a vent area within 0.1 ms of contents of the vessel reaching the relief pressure.

17. The vessel of claim 1, wherein the second endplate is configured to open the vessel upon detonation of HHO gas in the first chamber and/or the second chamber.

18. The vessel of claim 1, which is adapted for installation onboard a vehicle.

19. The vessel of claim 1, wherein the second endplate is configured to form a vent area at a top of the second chamber.

20. The vessel of claim 1, which is in communication with at least one injector, the at least one injector configured to deliver at least a portion of HHO gas to an internal combustion particulate filter (DPF) regenerator system.

21. The vessel of claim 1, which is in communication with a plurality of injectors, the plurality of injectors configured to introduce at least a portion of the HHO gas to at least one combustion chamber inlet of the internal combustion engine.

22. The vessel of claim 21, wherein the plurality of injectors comprises:
    a first injector configured to deliver a first portion of the HHO gas to within 3 inches of a first combustion chamber inlet of a first combustion chamber of the internal combustion engine;
    a second injector configured to deliver a second portion of the HHO gas to a second combustion chamber inlet of a second combustion chamber of the internal combustion engine; and
    at least a third injector configured to deliver at least a third portion of the HHO gas to at least a third combustion chamber inlet of at least a third combustion chamber of the internal combustion engine.

23. The vessel of claim 22, wherein the first injector is configured to deliver the first portion of the HHO gas during a portion of an intake stroke of a first combustion cylinder, the first combustion cylinder comprising the first combustion chamber.

24. The vessel of claim 23, wherein the during a portion of an intake stroke is when the intake stroke is at an angle in the range of 0-40° from top-dead-center.

25. The vessel of claim 1, which is in communication with a heat exchanger, the heat exchanger configured to receive at least a portion of HHO gas.

26. The vessel of claim 25, wherein the heat exchanger is configured to receive an engine exhaust stream and/or an engine coolant stream.

27. A dual-chamber vessel, comprising:
    a cylindrical member that that includes:
    a first endplate that is located at a first end of the cylindrical member;
    a middle plate that is located inside the cylindrical member and that divides an interior of the vessel into a first chamber and a second chamber; and
    a second endplate that is located at a second end of the cylindrical member, and that is configured to release pressure in response to a pressure in the second chamber being greater than a relief pressure;
    wherein a controller is configured to control an electricity supply to an electrolysis cell to maintain a temperature in the first chamber of less than 65° C.; and
    wherein the electrolysis cell is located in the first chamber and is configured to generate HHO gas.

28. The vessel of claim 27, wherein the relief pressure is less than a lowest failure point of the vessel components.

* * * * *